US008082096B2

(12) United States Patent
Dupray

(10) Patent No.: US 8,082,096 B2
(45) Date of Patent: Dec. 20, 2011

(54) WIRELESS LOCATION ROUTING APPLICATIONS AND ARCHITECTURE THEREFOR

(75) Inventor: Dennis Jay Dupray, Golden, CO (US)

(73) Assignee: TracBeam LLC, Golden, CO (US)

(\*) Notice: Subject to any disclaimer, the term of this patent is extended or adjusted under 35 U.S.C. 154(b) by 849 days.

(21) Appl. No.: 12/021,222

(22) Filed: Jan. 28, 2008

(65) Prior Publication Data

US 2008/0133126 A1 Jun. 5, 2008

Related U.S. Application Data

(63) Continuation of application No. 10/297,449, filed as application No. PCT/US01/17957 on Jun. 4, 2001, now Pat. No. 7,714,778.

(60) Provisional application No. 60/293,094, filed on May 22, 2001.

(51) Int. Cl.
*G01C 21/28* (2006.01)

(52) U.S. Cl. ........................................ 701/207; 701/204

(58) Field of Classification Search .......................... None
See application file for complete search history.

(56) References Cited

U.S. PATENT DOCUMENTS

| 3,646,580 | A | 2/1972 | Fuller et al. |
| 3,886,553 | A | 5/1975 | Bates |
| 4,023,176 | A | 5/1977 | Currie et al. |
| 4,232,313 | A | 11/1980 | Fleishman |
| 4,347,618 | A | 8/1982 | Kavouras et al. |
| 4,438,439 | A | 3/1984 | Shreve |
| 4,475,010 | A | 10/1984 | Huensch et al. |

(Continued)

FOREIGN PATENT DOCUMENTS

EP 0177203 4/1986

(Continued)

OTHER PUBLICATIONS

U.S. Appl. No. 08/191,984, Loomis (Feb. 4, 1994).

(Continued)

*Primary Examiner* — Thomas Black
*Assistant Examiner* — Lin B Olsen
(74) *Attorney, Agent, or Firm* — Dennis J. Dupray

(57) ABSTRACT

A system for wirelessly locating mobile station/units (MS) and using resulting location determinations for providing a product or service is disclosed. The system is useful for routing an MS user to a plurality of desired locations, alerting an MS user to a nearby desired product or service based on satisfaction of user criteria, and providing enhanced security and 911 response. In one embodiment, the system responds to MS location requests via, e.g., Internet communication between a distributed network of location processing sites. A plurality of locating technologies including those based on: (1) TDOA; (2) pattern recognition; (3) timing advance; (5) GPS and network assisted GPS, (6) angle of arrival, (7) super resolution enhancements, and (8) supplemental information from low cost base stations can be activated, in various combinations, by system embodiments. MS location difficulties resulting from poor location accuracy/reliability and/or poor coverage are alleviated via such technologies in combination with automatically adapting and calibrating system performance according to environmental and geographical changes so that the system becomes progressively more comprehensive and accurate. Further, the system can be modularly configured for use in location signaling environments ranging from urban, dense urban, suburban, rural, mountain to low traffic or isolated roadways. Accordingly, the system is useful for 911 emergency calls, tracking, routing, people and animal location including applications for confinement to and exclusion from certain areas.

46 Claims, 28 Drawing Sheets

U.S. PATENT DOCUMENTS

| | | |
|---|---|---|
| RE31,962 E | 7/1985 | Brodeur |
| 4,542,744 A | 9/1985 | Barnes et al. |
| 4,630,057 A | 12/1986 | Martin |
| 4,636,795 A | 1/1987 | Dano |
| 4,651,157 A | 3/1987 | Gray et al. |
| 4,670,758 A | 6/1987 | Campbell |
| 4,700,374 A | 10/1987 | Bini |
| 4,721,958 A | 1/1988 | Jenkin |
| 4,740,792 A | 4/1988 | Sagey et al. |
| 4,742,357 A | 5/1988 | Rackley |
| 4,799,062 A | 1/1989 | Sanderford, Jr. et al. |
| 4,857,840 A | 8/1989 | Lanchais |
| 4,860,352 A | 8/1989 | Laurance et al. |
| 4,864,313 A | 9/1989 | Konneker |
| 4,870,576 A | 9/1989 | Tornetta |
| 4,876,550 A | 10/1989 | Kelly |
| 4,879,713 A | 11/1989 | Ichiyoshi |
| 4,888,593 A | 12/1989 | Friedman et al. |
| 4,914,689 A | 4/1990 | Quade et al. |
| 4,952,772 A | 8/1990 | Zana |
| 4,990,922 A | 2/1991 | Young et al. |
| 4,992,796 A | 2/1991 | Apostolos |
| 5,003,317 A | 3/1991 | Gray et al. |
| 5,008,679 A | 4/1991 | Effland et al. |
| 5,017,926 A | 5/1991 | Ames et al. |
| 5,032,989 A | 7/1991 | Tornetta |
| 5,034,898 A | 7/1991 | Lu et al. |
| 5,043,736 A | 8/1991 | Darnell et al. |
| 5,045,852 A | 9/1991 | Mitchell et al. |
| 5,045,861 A | 9/1991 | Duffett-Smith |
| 5,055,851 A | 10/1991 | Sheffer |
| 5,092,343 A | 3/1992 | Spitzer et al. |
| 5,099,245 A | 3/1992 | Sagey |
| 5,111,209 A | 5/1992 | Toriyama |
| 5,119,102 A | 6/1992 | Barnard |
| 5,119,104 A | 6/1992 | Heller |
| 5,136,686 A | 8/1992 | Koza |
| 5,142,590 A | 8/1992 | Carpenter et al. |
| 5,155,490 A | 10/1992 | Spradley, Jr. et al. |
| 5,163,004 A | 11/1992 | Rentz |
| 5,166,694 A | 11/1992 | Russell et al. |
| 5,177,489 A | 1/1993 | Hatch |
| 5,184,347 A | 2/1993 | Farwell et al. |
| 5,191,342 A | 3/1993 | Alsup et al. |
| 5,193,110 A | 3/1993 | Jones et al. |
| 5,202,829 A | 4/1993 | Geier |
| 5,208,756 A | 5/1993 | Song |
| 5,212,765 A | 5/1993 | Skeirik |
| 5,212,804 A | 5/1993 | Choate |
| 5,214,789 A | 5/1993 | George |
| 5,216,611 A | 6/1993 | McElreath |
| 5,218,367 A | 6/1993 | Sheffer et al. |
| 5,218,618 A | 6/1993 | Sagey |
| 5,218,716 A | 6/1993 | Comroe et al. |
| 5,223,844 A | 6/1993 | Mansell et al. |
| 5,225,842 A | 7/1993 | Brown et al. |
| 5,233,541 A | 8/1993 | Corwin et al. |
| 5,235,633 A | 8/1993 | Dennison et al. |
| 5,243,530 A | 9/1993 | Stanifer et al. |
| 5,251,273 A | 10/1993 | Betts et al. |
| 5,260,711 A | 11/1993 | Sterzer |
| 5,278,892 A | 1/1994 | Bolliger et al. |
| 5,280,295 A | 1/1994 | Kelley et al. |
| 5,280,472 A | 1/1994 | Gilhousen et al. |
| 5,282,261 A | 1/1994 | Skeirik |
| 5,293,642 A | 3/1994 | Lo |
| 5,293,645 A | 3/1994 | Sood |
| 5,295,180 A | 3/1994 | Vendetti et al. |
| 5,311,195 A | 5/1994 | Mathis et al. |
| 5,317,323 A | 5/1994 | Kennedy et al. |
| 5,319,374 A | 6/1994 | Desai et al. |
| 5,325,419 A | 6/1994 | Connolly et al. |
| 5,327,144 A | 7/1994 | Stilp et al. |
| 5,331,550 A | 7/1994 | Stafford et al. |
| 5,343,209 A | 8/1994 | Sennott et al. |
| 5,349,631 A | 9/1994 | Lee |
| 5,359,521 A | 10/1994 | Kyrtsos et al. |
| 5,363,110 A | 11/1994 | Inamiya |
| 5,365,447 A | 11/1994 | Dennis |
| 5,365,450 A | 11/1994 | Schuchman et al. |
| 5,365,516 A | 11/1994 | Jandrell |
| 5,365,544 A | 11/1994 | Schilling |
| 5,373,456 A | 12/1994 | Ferkinhoff et al. |
| 5,373,546 A | 12/1994 | Holzermer |
| 5,379,224 A | 1/1995 | Brown et al. |
| 5,388,147 A | 2/1995 | Grimes |
| 5,388,259 A | 2/1995 | Fleischman et al. |
| 5,389,934 A | 2/1995 | Kass |
| 5,390,339 A | 2/1995 | Bruckert et al. |
| 5,392,052 A | 2/1995 | Eberwine |
| 5,394,158 A | 2/1995 | Chia |
| 5,394,435 A | 2/1995 | Weerackody |
| 5,395,366 A | 3/1995 | D'Andrea et al. |
| 5,398,302 A | 3/1995 | Thrift |
| 5,402,520 A | 3/1995 | Schnitta |
| 5,402,524 A | 3/1995 | Bauman et al. |
| 5,408,586 A | 4/1995 | Skeirik |
| 5,408,588 A | 4/1995 | Ulug |
| 5,410,737 A | 4/1995 | Jones |
| 5,416,712 A | 5/1995 | Geier et al. |
| 5,420,914 A | 5/1995 | Blumhardt |
| 5,422,813 A | 6/1995 | Schuchman et al. |
| 5,426,745 A | 6/1995 | Baji et al. |
| 5,434,927 A | 7/1995 | Brady et al. |
| 5,438,644 A | 8/1995 | Fu |
| 5,438,688 A | 8/1995 | Masaki |
| 5,444,451 A | 8/1995 | Johnson et al. |
| 5,448,754 A | 9/1995 | Ho et al. |
| 5,457,736 A | 10/1995 | Cain et al. |
| 5,461,390 A | 10/1995 | Hoshen |
| 5,465,082 A | 11/1995 | Chaco |
| 5,473,602 A | 12/1995 | McKenna et al. |
| 5,479,397 A | 12/1995 | Lee |
| 5,479,482 A | 12/1995 | Grimes |
| 5,485,163 A | 1/1996 | Singer et al. |
| 5,502,757 A | 3/1996 | Bales et al. |
| 5,506,864 A | 4/1996 | Schilling |
| 5,508,707 A | 4/1996 | LeBlanc et al. |
| 5,508,708 A | 4/1996 | Ghosh et al. |
| 5,510,801 A | 4/1996 | Engelbrecht et al. |
| 5,512,908 A | 4/1996 | Herrick |
| 5,513,111 A | 4/1996 | Wortham |
| 5,513,243 A | 4/1996 | Kage |
| 5,513,246 A | 4/1996 | Jonsson et al. |
| 5,515,285 A | 5/1996 | Garrett, Sr. et al. |
| 5,515,378 A | 5/1996 | Roy, III et al. |
| 5,515,419 A | 5/1996 | Sheffer |
| 5,517,667 A | 5/1996 | Wang |
| 5,519,760 A | 5/1996 | Borkowski et al. |
| 5,526,001 A | 6/1996 | Rose et al. |
| 5,526,357 A | 6/1996 | Jandrell |
| 5,526,466 A | 6/1996 | Takizawa |
| 5,537,460 A | 7/1996 | Holliday, Jr. et al. |
| 5,546,445 A | 8/1996 | Dennison et al. |
| 5,555,257 A | 9/1996 | Dent |
| 5,555,286 A | 9/1996 | Tendler |
| 5,559,520 A | 9/1996 | Barzegar et al. |
| 5,561,704 A | 10/1996 | Salimando |
| 5,561,840 A | 10/1996 | Alvesalo et al. |
| 5,563,611 A | 10/1996 | McGann et al. |
| 5,563,931 A | 10/1996 | Bishop et al. |
| 5,564,079 A | 10/1996 | Olsson |
| 5,570,412 A | 10/1996 | LeBlanc |
| 5,572,218 A | 11/1996 | Cohen et al. |
| 5,574,648 A | 11/1996 | Pilley |
| 5,577,169 A | 11/1996 | Prezioso |
| 5,579,535 A | 11/1996 | Orlen et al. |
| 5,581,490 A | 12/1996 | Ferkinhoff et al. |
| 5,581,596 A | 12/1996 | Hogan |
| 5,583,513 A | 12/1996 | Cohen |
| 5,583,517 A | 12/1996 | Yokev et al. |
| 5,588,038 A | 12/1996 | Snyder |
| 5,592,180 A | 1/1997 | Yokev et al. |
| 5,594,425 A | 1/1997 | Ladner et al. |
| 5,594,740 A | 1/1997 | LaDue |
| 5,594,782 A | 1/1997 | Zicker et al. |
| 5,596,625 A | 1/1997 | LeBlanc |

| Patent No. | Date | Inventor |
|---|---|---|
| 5,600,705 A | 2/1997 | Maenpaa |
| 5,600,706 A | 2/1997 | Dunn et al. |
| 5,602,903 A | 2/1997 | LeBlanc et al. |
| 5,604,765 A | 2/1997 | Bruno et al. |
| 5,608,410 A | 3/1997 | Stilp et al. |
| 5,610,815 A | 3/1997 | Gudat et al. |
| 5,610,972 A | 3/1997 | Emery et al. |
| 5,611,704 A | 3/1997 | Kamizono et al. |
| 5,612,703 A | 3/1997 | Mallinckrodt |
| 5,613,041 A | 3/1997 | Keeler et al. |
| 5,613,205 A | 3/1997 | Dufour |
| 5,614,914 A | 3/1997 | Bolgiano et al. |
| 5,617,565 A | 4/1997 | Augenbraun et al. |
| 5,619,522 A | 4/1997 | Dube |
| 5,619,552 A | 4/1997 | Karppanen et al. |
| 5,621,848 A | 4/1997 | Wang |
| 5,625,668 A | 4/1997 | Loomis et al. |
| 5,625,748 A | 4/1997 | McDonough et al. |
| 5,627,547 A | 5/1997 | Ramaswamy et al. |
| 5,629,707 A | 5/1997 | Heuvel et al. |
| 5,631,469 A | 5/1997 | Carrieri et al. |
| 5,634,051 A | 5/1997 | Thomson |
| 5,638,486 A | 6/1997 | Wang et al. |
| 5,640,103 A | 6/1997 | Petsche et al. |
| 5,646,630 A | 7/1997 | Sheynblat et al. |
| 5,649,065 A | 7/1997 | Lo et al. |
| 5,652,570 A | 7/1997 | Lepkofker |
| 5,657,487 A | 8/1997 | Doner |
| 5,663,734 A | 9/1997 | Krasner |
| 5,673,322 A | 9/1997 | Pepe et al. |
| 5,675,344 A | 10/1997 | Tong et al. |
| 5,675,788 A | 10/1997 | Husick et al. |
| 5,686,924 A | 11/1997 | Trimble et al. |
| 5,701,328 A | 12/1997 | Schuchman et al. |
| 5,710,328 A | 1/1998 | Spivey et al. |
| 5,710,758 A | 1/1998 | Soliman et al. |
| 5,710,918 A | 1/1998 | Lagarde et al. |
| 5,717,406 A | 2/1998 | Sanderford et al. |
| 5,719,584 A | 2/1998 | Otto |
| 5,724,047 A | 3/1998 | Lioio et al. |
| 5,724,648 A | 3/1998 | Shaughnessy et al. |
| 5,724,660 A | 3/1998 | Kauser et al. |
| 5,727,057 A | 3/1998 | Emery et al. |
| 5,729,549 A | 3/1998 | Kostreski et al. |
| 5,732,074 A | 3/1998 | Spaur et al. |
| 5,732,354 A | 3/1998 | MacDonald |
| 5,736,964 A | 4/1998 | Ghosh et al. |
| 5,737,431 A | 4/1998 | Brandstein et al. |
| 5,740,048 A | 4/1998 | Abel et al. |
| 5,742,509 A | 4/1998 | Goldberg et al. |
| 5,742,905 A | 4/1998 | Pepe et al. |
| 5,754,955 A | 5/1998 | Ekbatani |
| 5,764,756 A | 6/1998 | Onweller |
| 5,774,802 A | 6/1998 | Tell et al. |
| 5,774,805 A | 6/1998 | Zicker |
| 5,774,829 A | 6/1998 | Cisneros et al. |
| 5,774,869 A | 6/1998 | Toader |
| 5,786,773 A | 7/1998 | Murphy |
| 5,787,235 A | 7/1998 | Smith et al. |
| 5,787,354 A | 7/1998 | Gray et al. |
| 5,790,953 A | 8/1998 | Wang et al. |
| 5,790,974 A | 8/1998 | Tognazzini |
| 5,799,016 A | 8/1998 | Onweller |
| 5,802,454 A | 9/1998 | Goshay et al. |
| 5,802,492 A | 9/1998 | DeLorme et al. |
| 5,802,518 A | 9/1998 | Karaev et al. |
| 5,805,670 A | 9/1998 | Pons et al. |
| 5,809,415 A | 9/1998 | Rossmann |
| 5,815,538 A | 9/1998 | Grell et al. |
| 5,815,814 A | 9/1998 | Dennison et al. |
| RE35,916 E | 10/1998 | Dennison et al. |
| 5,819,273 A | 10/1998 | Vora et al. |
| 5,819,301 A | 10/1998 | Rowe et al. |
| 5,822,539 A | 10/1998 | van Hoff |
| 5,831,977 A | 11/1998 | Dent |
| 5,832,367 A | 11/1998 | Bamburak et al. |
| 5,835,857 A | 11/1998 | Otten |
| 5,835,907 A | 11/1998 | Newman |
| 5,838,562 A | 11/1998 | Gudat et al. |
| 5,842,130 A | 11/1998 | Oprescu-Surcobe et al. |
| 5,844,522 A | 12/1998 | Sheffer et al. |
| 5,845,198 A | 12/1998 | Bamburak et al. |
| 5,845,267 A | 12/1998 | Ronen |
| 5,857,181 A | 1/1999 | Augenbraun et al. |
| 5,864,313 A | 1/1999 | Speck et al. |
| 5,864,755 A | 1/1999 | King et al. |
| 5,867,495 A | 2/1999 | Elliott et al. |
| 5,867,799 A | 2/1999 | Lang et al. |
| 5,870,029 A | 2/1999 | Otto et al. |
| 5,872,539 A | 2/1999 | Mullen |
| 5,873,040 A | 2/1999 | Dunn et al. |
| 5,873,076 A | 2/1999 | Barr et al. |
| 5,875,394 A | 2/1999 | Daly et al. |
| 5,875,401 A | 2/1999 | Rochkind |
| 5,883,598 A | 3/1999 | Parl et al. |
| 5,890,068 A | 3/1999 | Fattouche et al. |
| 5,892,441 A | 4/1999 | Woolley et al. |
| 5,893,091 A | 4/1999 | Hunt et al. |
| 5,895,436 A | 4/1999 | Savoie et al. |
| 5,901,358 A | 5/1999 | Petty et al. |
| 5,903,844 A | 5/1999 | Bruckert et al. |
| 5,905,455 A | 5/1999 | Heger et al. |
| 5,906,655 A | 5/1999 | Fan |
| 5,913,170 A | 6/1999 | Wortham |
| 5,914,675 A | 6/1999 | Tognazzini |
| 5,917,405 A | 6/1999 | Joao |
| 5,917,449 A | 6/1999 | Sanderford et al. |
| 5,917,866 A | 6/1999 | Pon |
| 5,920,873 A | 7/1999 | Van Huben et al. |
| 5,924,090 A | 7/1999 | Krellenstein |
| 5,926,133 A | 7/1999 | Green, Jr. |
| 5,930,699 A | 7/1999 | Bhatia |
| 5,930,717 A | 7/1999 | Yost et al. |
| 5,933,421 A | 8/1999 | Alamouti et al. |
| 5,933,822 A | 8/1999 | Braden-Harder et al. |
| 5,936,572 A | 8/1999 | Loomis et al. |
| 5,938,721 A | 8/1999 | Dussell et al. |
| 5,943,014 A | 8/1999 | Gilhousen |
| 5,945,948 A | 8/1999 | Buford et al. |
| 5,948,040 A | 9/1999 | DeLorme et al. |
| 5,949,815 A | 9/1999 | Pon |
| 5,952,969 A | 9/1999 | Hagerman et al. |
| 5,959,568 A | 9/1999 | Woolley |
| 5,963,866 A | 10/1999 | Palamara et al. |
| 5,966,658 A | 10/1999 | Kennedy, III et al. |
| 5,969,673 A | 10/1999 | Bickley et al. |
| 5,973,643 A | 10/1999 | Hawkes et al. |
| 5,977,913 A | 11/1999 | Christ |
| 5,978,840 A | 11/1999 | Nguyen et al. |
| 5,982,324 A | 11/1999 | Watters et al. |
| 5,982,891 A | 11/1999 | Ginter et al. |
| 5,983,214 A | 11/1999 | Lang et al. |
| 5,987,329 A | 11/1999 | Yost et al. |
| 5,999,124 A | 12/1999 | Sheynblat |
| 5,999,126 A | 12/1999 | Ito |
| 6,009,334 A | 12/1999 | Grubeck et al. |
| 6,014,102 A | 1/2000 | Mitzlaff et al. |
| 6,021,371 A | 2/2000 | Fultz |
| 6,023,241 A | 2/2000 | Clapper |
| 6,026,304 A | 2/2000 | Hilsenrath et al. |
| 6,028,551 A | 2/2000 | Schoen et al. |
| 6,029,161 A | 2/2000 | Lang et al. |
| 6,031,490 A | 2/2000 | Forssen et al. |
| 6,034,635 A | 3/2000 | Gilhousen |
| 6,038,668 A | 3/2000 | Chipman et al. |
| 6,046,683 A | 4/2000 | Pidwerbetsky et al. |
| 6,047,192 A | 4/2000 | Maloney et al. |
| 6,061,064 A | 5/2000 | Reichlen |
| 6,064,339 A | 5/2000 | Wax et al. |
| 6,064,942 A | 5/2000 | Johnson et al. |
| 6,097,958 A | 8/2000 | Bergen |
| 6,101,178 A | 8/2000 | Beal |
| 6,101,390 A | 8/2000 | Jayaraman et al. |
| 6,101,391 A | 8/2000 | Ishizuka et al. |
| 6,108,555 A | 8/2000 | Maloney et al. |
| 6,108,557 A | 8/2000 | Wax et al. |
| 6,112,095 A | 8/2000 | Wax et al. |
| 6,115,611 A | 9/2000 | Kimoto et al. |

| | | |
|---|---|---|
| 6,122,520 A | 9/2000 | Want et al. |
| 6,138,003 A | 10/2000 | Kingdon et al. |
| 6,154,745 A | 11/2000 | Kari et al. |
| 6,157,621 A | 12/2000 | Brown et al. |
| 6,167,274 A | 12/2000 | Smith |
| 6,181,928 B1 | 1/2001 | Moon |
| 6,185,282 B1 | 2/2001 | Boeckman et al. |
| 6,185,427 B1 | 2/2001 | Krasner et al. |
| 6,236,365 B1 | 5/2001 | LeBlanc et al. |
| 6,240,285 B1 | 5/2001 | Blum et al. |
| 6,243,587 B1 | 6/2001 | Dent et al. |
| 6,249,245 B1 | 6/2001 | Watters et al. |
| 6,249,252 B1 | 6/2001 | Dupray |
| 6,295,502 B1 | 9/2001 | Hancock et al. |
| 6,301,463 B1 | 10/2001 | Dao et al. |
| 6,304,833 B1 | 10/2001 | Ferkinhoff et al. |
| 6,308,072 B1 | 10/2001 | Labedz et al. |
| 6,317,718 B1 * | 11/2001 | Fano .......................... 705/14.39 |
| 6,321,092 B1 | 11/2001 | Fitch et al. |
| 6,324,404 B1 | 11/2001 | Dennison et al. |
| 6,330,452 B1 | 12/2001 | Fattouche et al. |
| 6,381,464 B1 | 4/2002 | Vannucci |
| 6,385,302 B1 | 5/2002 | Antonucci et al. |
| 6,385,541 B1 | 5/2002 | Blumberg et al. |
| 6,415,018 B1 | 7/2002 | Antonucci et al. |
| 6,438,380 B1 | 8/2002 | Bi et al. |
| 6,496,776 B1 | 12/2002 | Blumberg et al. |
| 6,519,232 B1 | 2/2003 | Becher |
| 6,519,463 B2 | 2/2003 | Tendler |
| 6,522,875 B1 | 2/2003 | Dowling et al. |
| 6,529,143 B2 | 3/2003 | Mikkola et al. |
| 6,549,130 B1 | 4/2003 | Joao |
| 6,549,768 B1 | 4/2003 | Fraccaroli |
| 6,571,279 B1 | 5/2003 | Herz et al. |
| 6,584,307 B1 | 6/2003 | Antonucci et al. |
| 6,594,483 B2 | 7/2003 | Nykanen et al. |
| 6,650,619 B1 | 11/2003 | Schuster et al. |
| 6,650,902 B1 | 11/2003 | Richton |
| 6,677,894 B2 | 1/2004 | Sheynblat et al. |
| 6,683,538 B1 | 1/2004 | Wilkes, Jr. |
| 6,707,421 B1 | 3/2004 | Drury et al. |
| 6,731,940 B1 | 5/2004 | Nagendran |
| 6,751,626 B2 | 6/2004 | Brown et al. |
| 6,754,482 B1 | 6/2004 | Torabi |
| 6,813,501 B2 | 11/2004 | Kinnunen et al. |
| 6,819,929 B2 | 11/2004 | Antonucci et al. |
| 6,826,481 B2 * | 11/2004 | Root et al. .......................... 702/3 |
| 6,834,195 B2 | 12/2004 | Brandenberg et al. |
| 6,839,628 B1 | 1/2005 | Tu |
| 6,845,400 B2 | 1/2005 | Macpherson et al. |
| 6,847,825 B1 | 1/2005 | Duvall et al. |
| 6,871,140 B1 | 3/2005 | Florance et al. |
| 6,873,850 B2 | 3/2005 | Dowling et al. |
| 6,912,545 B1 | 6/2005 | Lundy et al. |
| 6,950,876 B2 | 9/2005 | Bright et al. |
| 6,952,101 B2 | 10/2005 | Gupta |
| 6,952,181 B2 | 10/2005 | Karr et al. |
| 7,047,019 B1 | 5/2006 | Cox et al. |
| 7,171,189 B2 | 1/2007 | Bianconi et al. |
| 7,228,140 B2 | 6/2007 | Anctil et al. |
| 7,245,910 B2 | 7/2007 | Osmo |
| 7,812,766 B2 | 10/2010 | LeBlanc et al. |
| 2001/0022558 A1 | 9/2001 | Dupray et al. |
| 2002/0035605 A1 | 3/2002 | McDowell et al. |
| 2002/0111154 A1 | 8/2002 | Eldering et al. |
| 2003/0032409 A1 | 2/2003 | Hutcheson et al. |
| 2003/0040324 A1 | 2/2003 | Eldering et al. |
| 2003/0126250 A1 | 7/2003 | Jhanji |
| 2003/0146871 A1 | 8/2003 | Dupray et al. |
| 2003/0148774 A1 | 8/2003 | Naghian et al. |
| 2003/0222820 A1 | 12/2003 | Dupray et al. |
| 2004/0022258 A1 | 2/2004 | Tsukada et al. |
| 2004/0198386 A1 | 10/2004 | Dupray |
| 2004/0266457 A1 | 12/2004 | Dupray |
| 2006/0276201 A1 | 12/2006 | Dupray |
| 2006/0294147 A1 * | 12/2006 | Root et al. ................. 707/104.1 |
| 2007/0287473 A1 | 12/2007 | Dupray |
| 2008/0113672 A1 | 5/2008 | Karr et al. |
| 2008/0167049 A1 | 7/2008 | Karr et al. |
| 2009/0048938 A1 | 2/2009 | Dupray |
| 2010/0063829 A1 | 3/2010 | Dupray |

FOREIGN PATENT DOCUMENTS

| | | |
|---|---|---|
| EP | 0546758 | 6/1993 |
| EP | 0689369 | 12/1995 |
| EP | 0811296 | 12/1997 |
| EP | 0870203 | 10/1998 |
| EP | 0923817 | 6/1999 |
| EP | 1045604 | 10/2000 |
| GB | 1605207 | 10/1983 |
| GB | 2155720 | 9/1985 |
| JP | 10-013961 | 1/1998 |
| WO | WO 93/04453 | 3/1993 |
| WO | WO 94/01978 | 1/1994 |
| WO | WO 94/11853 | 5/1994 |
| WO | WO 94/15412 | 7/1994 |
| WO | WO 94/27161 | 11/1994 |
| WO | WO 95/03598 | 2/1995 |
| WO | WO 95/34177 | 12/1995 |
| WO | WO 96/14588 | 5/1996 |
| WO | WO 96/20542 | 7/1996 |
| WO | WO 97/01228 | 1/1997 |
| WO | WO 97/22888 | 6/1997 |
| WO | WO 97/24010 | 7/1997 |
| WO | WO 97/26750 | 7/1997 |
| WO | WO 97/38540 | 10/1997 |
| WO | WO 97/41654 | 11/1997 |
| WO | WO 97/50002 | 12/1997 |
| WO | WO 98/00982 | 1/1998 |
| WO | WO 98/02824 | 1/1998 |
| WO | WO 98/08314 | 2/1998 |
| WO | WO 98/10307 | 3/1998 |
| WO | WO 98/14018 | 4/1998 |
| WO | WO 98/59506 | 12/1998 |
| WO | WO 99/33293 | 7/1999 |
| WO | WO 99/45732 | 9/1999 |
| WO | WO 00/04730 | 1/2000 |
| WO | WO 00/29979 | 5/2000 |
| WO | WO 00/41090 | 7/2000 |
| WO | WO 00/41412 | 7/2000 |
| WO | WO 00/50844 | 8/2000 |
| WO | WO 01/44998 | 6/2001 |
| WO | WO 01/60086 | 8/2001 |
| WO | WO 01/95642 | 12/2001 |
| WO | WO 02/065250 | 8/2002 |

OTHER PUBLICATIONS

U.S. Appl. No. 08/246,149, Lepkofker (May 19, 1994).
U.S. Appl. No. 08/355,901, Schoen (Dec. 13, 1994).
U.S. Appl. No. 09/176,587, Dupray (Oct. 21, 1998).
U.S. Appl. No. 09/194,367, Dupray (Nov. 24, 1998).
U.S. Appl. No. 60/017,269, Maloney (May 13, 1996).
U.S. Appl. No. 60/017,899, Maloney (May 17, 1996).
U.S. Appl. No. 60/025,855, Leblanc (Sep. 9, 1996).
U.S. Appl. No. 60/035,691, Maloney (Jan. 16, 1997).
U.S. Appl. No. 60/038,037, Christ (Feb. 7, 1997).
"After Allowance Amendment under C.F.R. 1.312", filed Jul. 10, 2007, for U.S. Appl. No. 10/262,413, 23 pages.
"Amendment and Response to Office Action Dated May 5, 2006 in the Claims:", filed Nov. 30, 2006, for U.S. Appl. No. 10/262,338, 27 pages.
"Duplicate Copy of Claims Filed in a Previous Preliminary Amendment", filed May 23, 2007, for U.S. Appl. No. 09/770,838, 23 pages.
"ARGOS: Basic Description of the Argos System"; ARGOS; 7 pgs.
"Location Systems and Technologies", 1994, Wireless Emergency Services JEM Report, Annex A pp. 42-46 and Appendix A pp. 1-2.
"The Measearch Engine Years: Fit the First", 1992, http://www.conman.org/people/spc/refs/search.hpl.html, pp. 1-3.
Abowd et al., A Mobile context-Aware Tour Guide, Sep. 23, 1996 Baltzer Journals.
Abowd et al., A Mobile context-Aware Tour Guide, Wireless Networks 3 (1997), pp. 421-433.
Baldazo, "Navigating with a Web Compass: Quarterdeck Harnessess Leading-edge "Metasearch" Technology to Create a Smart Agent that Searches the Web and organizes the Results", Mar. 1996, BYTE, pp. 97-98.

Bass, Tim, "Intrusion Detection Systems and Multisensor Data Fusion: Creating Cyberspace Situational Awareness," Communications of the ACM, date unknown.

Beck et al.; "Simulation Results on the Downlink of a Qualcomm-like DS-CDMA-System Over Multipath fading channels"; Sep. 1994 pp. 1-7.

Botafogo, "Cluster Analysis for Hypertext Systems", Jun. 1993, ACM-SIRIG, pp. 116-124.

Caffery et al.; "Overview of Radiolocation in CDMA Cellular Systems"; IEEE Communications Magazine; Apr. 1998; pp. 38-45.

Caffery et al.; "Radio Location in Urban CDMA Microcells"; International Symposium on Personal, Indoor, and Mobil Radio Communications, Sep. 1995; 5 pgs.

Caffery, J. and Stüüber, G. L., "Vehicle Location and Tracking for IVHS in CDMA Microcells," International Symposium on Personal, Indoor, and Mobile Radio Communications, pp. 1227-1231, Sep. 1994.

Callan, James P., et al., "Searching Distributed Collections With Inference Networks," 18th Annual International ACM SIGIR Conference on Research and Development in Information Retrieval, 1995.

CC Docket No. 94-102, Before the Federal Communications Commission, in the Matter of Revision of the Commission's Rules to Ensure Compatibility with Enhanced 911 Emergency Calling Systems; "Comments of Harris Government Communication Systems Division A Division of Harris Corporation", filed Sep. 25, 1996.

CC Docket No. 94-102, Before the Federal Communications Commission, in the Matter of Revision of the Commission's Rules to Ensure Compatibility with Enhanced 911 Emergency Calling Systems; "Reply Comments of KSI Inc. and MULIC Inc." filed Oct. 25, 1996.

CC Docket No. 94-102, Before the Federal Communications Commission, in the Matter of Revision of the Commission's Rules to Ensure Compatibility with Enhanced 911 Emergency Calling Systems; ex parte communication from Cambridge Positioning Systems Ltd. received Apr. 14, 1997 by the Commission.

CC Docket No. 94-102, Before the Federal Communications Commission, in the Matter of Revision of the Commission's Rules to Ensure Compatibility with Enhanced 911 Emergency Calling Systems; ex parte communication from GeoTek Communications, Inc. received Apr. 14, 1997 by the Commission.

CC Docket No. 94-102, Before the Federal Communications Commission, in the Matter of Revision of the Commission's Rules to Ensure Compatibility with Enhanced 911 Emergency Calling Systems; ex parte communication from National Strategies, Inc., regarding enhanced 911 system trial by TruePosition, Inc. and New Jersey Office of Emergency Telecommunications Services, received Aug. 8, 1997 by the Commission.

CC Docket No. 94-102, Before the Federal Communications Commission, in the Matter of Revision of the Commission's Rules to Ensure Compatibility with Enhanced 911 Emergency Calling Systems; ex parte communication from SnapTrack, Inc., received Jun. 27, 1997 by the Commission.

CC Docket No. 94-102, Before the Federal Communications Commission, in the Matter of Revision of the Commission's Rules to Ensure Compatibility with Enhanced 911 Emergency Calling Systems; ex parte communication from XYPOINT Corporation, Inc. received Jul. 28, 1997 by the Commission.

Chan et al., "Multipath Propagation Effects on a CDMA Cellular System", 1994, IEEE, pp. 848-855.

Cheverst, et al. "Using context as a Crystal Ball: Rewards and Pitfalls", Distributed Multimedia Research Group, Pub. Yr. 2000, Dept. of Computing, Lancaster University, Lancaster, LA14YR, U.K., 5 pgs.

Cheverst, et al. Experiences of Developing and Deploying a Context-Aware Tourist Guide: The GUIDE Project; "Mobile Computing Networking", pp. 20-31, 2000 (url = "citeseer.ist.psu.edu/cheverst00experiences.html").

Communication from U.S. Patent and Trademark Office, Re: U.S. Appl. No. 08/355,901, Advisory Action, Dated: Aug. 11, 1998.

Communication from U.S. Patent and Trademark Office, Re: U.S. Appl. No. 08/355,901, Advisory Action, Dated: Nov. 4, 1998.

Communication from U.S. Patent and Trademark Office, Re: U.S. Appl. No. 08/355,901, Advisory Action, Dated: Oct. 9, 1998.

Communication from U.S. Patent and Trademark Office, Re: U.S. Appl. No. 08/355,901, Advisory Action, Dated: Sep. 9, 1998.

Communication from U.S. Patent and Trademark Office, Re: U.S. Appl. No. 08/355,901, Examiner Interview Summary Record, Dated: Aug. 13, 1996.

Communication from U.S. Patent and Trademark Office, Re: U.S. Appl. No. 08/355,901, Office Action Summary, Dated: Jun. 24, 1998.

Communication from U.S. Patent and Trademark Office, Re: U.S. Appl. No. 08/355,901, Office Action Summary, Dated: Mar. 14, 1997.

Communication from U.S. Patent and Trademark Office, Re: U.S. Appl. No. 08/355,901, Office Action Summary, Dated: Mar. 17, 1998.

Communication from U.S. Patent and Trademark Office, Re: U.S. Appl. No. 08/355,901.

Communication from U.S. Patent and Trademark Office, Re: U.S. Appl. No. 08/355,901, Response from Examiner regarding communication filed on Dec. 26, 1995, Dated Jul. 23, 1996.

Dailey, D.J., "Demonstration of an Advanced Public Transportation System in the Context of an IVHS Regional Architecture," paper presented at the First World Congress on Applications of Transport Telematics and Intelligent Vehicle-Highway Systems, Nov. 30-Dec. 3, 1994.

Dailey, D.J., et al., "ITS Data Fusion," Final Research Report, Research Project T9903, Task 9, ATIS/ATMS Regional IVHS Demonstration, University of Washington, Apr. 1996.

Dartmouth College, "Soldiers, Agents and Wireless Networks: A Report on a Military Application," PAAM 2000.

Dey, "Understanding and Using Context", Personal and Ubiquitous Computing Journal, vol. 5(1), 2001. pp. 4-7.

Driscoll, "Wireless Caller Location Systems", 1998, GSP World Advanstar Communications, Inc., www.gpsworld.com/1198/1198driscol.html, pp. 1-8.

Dutta et al., "Modified Adaptive Multiuser Detector for DS-CDMA in Multipath Fading", Prior to Dec. 22, 1997, pp. 1-7.

Ergon Proprietary; "Performance Analyses Brief: Microminiature Emergency Locator Systems (MELS)"; May 1996.

Evans, 1998, "New Satellites for Personal Communications," Scientific American, 278(4):70-77.

Fechner et al., A Hybrid Neural Network Architecture for Automatic Object Recognition, 1994, IEEE, pp. 187-194.

Fels et al., "Progress of C-Map: A Context_Aware Mobile Assistant", ATR Media Integration & Communication Research Laboratories, Seida-cho, Soraku-gun, Kyoto, 619-02, Japan, Publication year 1998.

From http:/www.uswcorp.com/laby.htm,, Release concerning RadioCamera™, printed Sep. 14, 1998.

Gallant, "Neural Network Learning and Expert Systems", 1994, The MIT Press, pp. 132-137.

Gaspard et al., "Position Assignment in Digital Cellular Mobile Radio Networks (e.g. GSM) derived from Measurements at the Protocol Interface", Prior to Dec. 22, 1997, pp. 1-5.

Goldbsmith et al., "A Measurement-Based Model for Predicting Coverage Areas of Urban Microcells", 1993, IEEE, pp. 1013-1023.

Hills, 1998, Terrestrial Wireless Networks, Scientific American, 278(4):86-91.

Ichitsubo et al., "A Statistical Model for Microcellular Multipath Propagation Environment", Prior to Dec. 22, 1997, Wireless Systems Laboratories, pp. 1-6.

Iida et al. "Multi-Agent Architecture for Seamless Personal Communications", NetMedia Research Center, Fujitsu Laboratories Ltd., 1999, pp. 1-7.

Iwayama et al., "Cluster-Based Text Catagorization: A Comparison of Category Search Strategies", 1995, ACM-SIGIR, pp. 273-279.

Johnson, "Smart Technology Busting Out All Over Web", Jun. 15, 1998, Electronic Engineering Times, 1012 pp. 1-6.

Junius et al., "New Methods for Processing GSM Radio Measurement Data: Applications for Locating, Handover, and Network Management", 1994, Communication Network, Aachen University of Technology, pp. 338-342.

Karanta, Ilkka, "Intelligent Agents in Mobile Services", VTT Information Technolgy, Oct. 2, 1997.

Kennemann, Olrik, "Continuous Location of Moving GSM Mobile Stations by Pattern Recognition Techniques," Fifth IEEE International Symposium on Personal, Indoor and Mobile Radio Communications (PIMRC '94), pp. 630-634, IEEE, Sep. 1994.

Kosko, "Fuzzy Systems as Universal Approximators", 1994, IEEE, pp. 1329-1333.

Lawrence et al., "Northern Light Search Engine Leads the Pack-Others Fall Behind", May 1, 1998, Online Newsletter, 19(5)pp. 1-2.

Lepkofker; U.S. Appl. No. 08/246,149 Entitled Individual Location System; May 19, 1994.

Long et al., Rapid Prototyping of Mobile Context-Aware Applications: The Cyberguide Case Study; 2nd ACM International Conference on Mobile Computing and Networking, 1996 (MobiCom '96).

Loran; 1992; "Users Handbook 1992 Edition"; U.S. Coast Guard, Radionavigation Division; 28 pgs.

Low, "Comparison of Urban Propagation Models with CW-Measurements", 1992, IEEE Deutsche Bundespost Telekom, pp. 936-942.

Maloney; U.S. Appl. No. 60/035,691, filed Jan. 16, 1997 Entitled "Robust, Efficienct, Localization System".

Mardiraju et al., "Neural Networks for Robust Image Feature Classification: A Comparative Study", 1994, IEEE, pp. 423-430.

Marmasse et al., "Location-aware Information Delivery with comMotion", Mit Media Laboratory, 20 Ames Street, Cambridge, MA 02139, USA, Publication: HUC 2000 Proceeding, pp. 157-171, publication year 2000.

Meadow, "Text Information Retrieval Systems", 1992, Academic Press, pp. 204-209.

Miller, RT, et al., "Protein fold recognition by sequence threading: tools and assessment techniques," Journal Announcement, Department of Biochemistry and Molecular Biology, University College, London, United Kingdom, Jan. 1996.

Mynatt et al., "Designing Audio Aura", published in CHI '98 Conference Proceedings, publication yr. 1998.

Newton; 1981; "The Near-Term Potential of Doppler Location"; John Hopkins APL Technical Digest; pp. 16-31.

Notess, "Internet Search Engine Update", Jul. 1, 1998, Online, vol. v22:nr, pp. 1-3.

Orphanoudakis, C.E., et al., "I2 Cnet: Content-Based Similarity Search in Geographically Distributed Repositories of Medical Images," vol. 20(4), pp. 193-207, Computerized Medical Imaging and Graphics, 1996.

Pascoe et al., "Human-Computer-Giraffe Interaction: HCI in the Field", Workshop on Human Computer Interaction with Mobile Devices, Glasgow, Scotland, publ yr: 1998.

Pelton, 1998, "Telecommunications for the 21st Century," Scientific American, 278(4):80-85.

Pop et al.; "Site Engineering for Indoor Wireless Spread Spectrum Communications"; Jun. 2001; 3 pgs.

Ramanathan et al.; "A Survey of Routing Techniques for Mobile Communications Networks"; Mobile Networks and Applications; Oct. 1996; vol. 1(2); pp. 1-31.

Randell et al, "The Shopping Jacket: Wearable Computing for the Consumer", Personal Technologies, 4, 2000, pp. 241-244.

Rizzo et al.; "Integration of Location Services in the Open Distributed Office"; Technical Report 14-94, Computing Laboratory, University of Kent, Cantebury, United Kingdom; Aug. 1994; pp. 1-14.

Salcic;"AGPCS—An Automatic GSM-based Positioning and Communication System" Proceedings of GeoComputation 1997 & SIRC 1997; Aug. 1997; pp. 15-22.

Schopp, Michael, "User Modelling and Performance Evaluation of Distributed Location Management for Personal Communications Services," Proceedings of the 15th International Teletraffic Congress (ITC) 15, Washington, D.C., 1997, S. 23-34.

Smith, Jr., "Passive Location of Mobile Cellular Telephone Terminals," IEEE, CH3031-2/91/0000-0221, 1991 pp. 221-225.

Sousa et al., "Delay Spread Measurements for the Digital Cellular Channel in Toronto", 1994, IEEE, pp. 837-847.

Spiteri et al., "An Architecture to Support Storage and Retrieval of Events", Proceedings of Middleware 1998, IFIP International Conference on Distributed Systems Platfors and Open Distributed Processing, Lancaster, UK, Sep. 1998.

Stefano et al., "Using Mobile and Intelligent Agents to Support Nomadic Users", 6th International Conference of Intelligence in Networks (ICIN2000), Jan. 17-20, 2000, Bordeaux, France.

Striglis et al., "A Multistage RAKE Receiver for Improved Capacity of CDMA Systems", 1994, IEEE Vehicular Technology Conference, pp. 1-5.

Stutzmann et al., 1998, "Moving Beyond Wireless Voice Systems," Scientific American, 278(4):92-93.

Wang Baldonado et al., "SenseMaker: An Information-Exploration Interface Supporting the Contextual Evolution of a User's Interests", 1997, ACM-CHI, pp. 11-18.

Weiss et al., "HyPursuit: A Hierarcical Network Search Engine that Exploits Content-Link Hypertext Clustering", 1996, Hypertext, pp. 180-193.

Wittenben et al., "A Low Cost Noncoherent Receiver with Adaptive Antenna Combining for High Speed Wireless Lans", Prior to Dec. 22, 1997, ASCOM Systec AG, pp. 1-4.

Wolfe et al., "Field Strength Prediction in Indoor Environments with Neural Networks", Prior to Dec. 22, 1997, pp. 1-5.

Wylie et al., "The Non-Line of Sight Problem in Mobile Location Estimation".

U.S. Appl. No. 12/861,817, filed Aug. 23, 2010, Dupray.

U.S. Appl. No. 11/746,753, filed May 10, 2007, Karr et al.

Brumitt et al., "EasyLiving: Technologies for Intelligent Environments," 2000, pp. 1-12.

Campadello et al., "Using Mobile and Intelligent Agents to Support Nomadic Users," 6th International Conference of Intelligence in Networks (ICIN2000), Jan. 17-20, 2000, Bordeaux, France.

Goodman, "The Wireless Internet: Promises and Challenges," IEEE, 2000, pp. 1-6.

Pitoura et al., "Locating Objects in Mobile Computing," IEEE, 2001, pp. 1-43.

Official Action for U.S. Appl. No. 11/464,880, mailed Jul. 22, 2008.
Official Action for U.S. Appl. No. 11/464,880, mailed Feb. 23, 2010.
Notice of Allowability for U.S. Appl. No. 11/464,880, mailed Aug. 9, 2010.

* cited by examiner

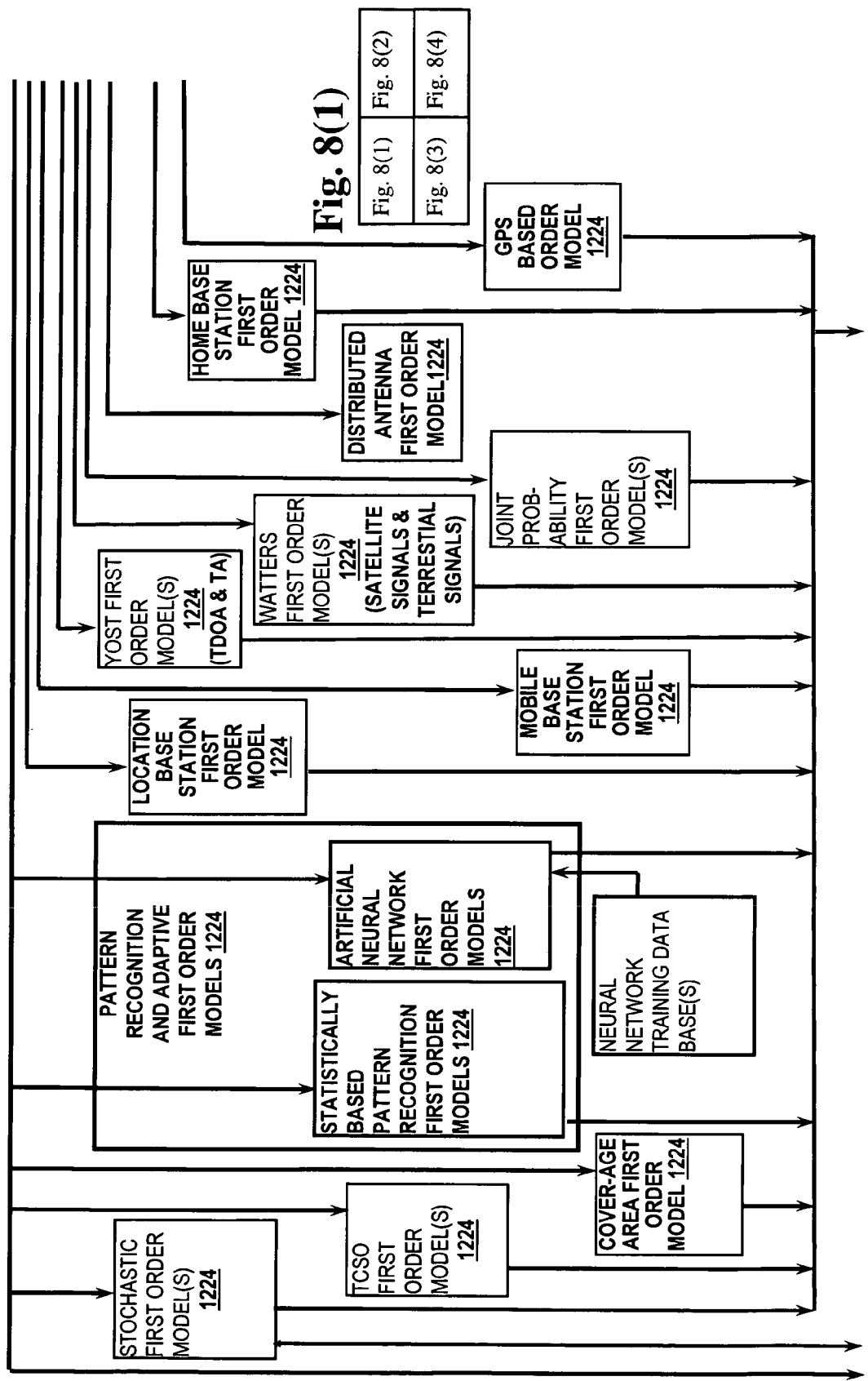

*FOM_ID*: First Order Model ID (providing this Location Hypothesis); note, since it is possible for location hypotheses to be generated by other than the FOM's, in general this field identifies the module that generated this location hypothesis.

*MS_ID*: The identification of the target MS to which this location hypothesis applies.

*pt_est*: The most likely location point estimate of the target MS

*valid_pt*: Boolean indicating the validity of "pt_est"

*area_est*: Location Area Estimate of the target MS provided by the FOM. This area estimate will be used whenever "image_area" below is NULL.

*valid_area*: Boolean indicating the validity of "area_est" (one of "pt_est" and "area_est" must be valid).

*adjust*: Boolean (true iff adjustments to the fields of this location hypothesis are to be performed in the Context Adjuster Module).

*pt_covering*: reference to a substantially minimal area (e.g., mesh cell) covering of "pt_est". Note, since this MS may be substantially on a cell boundary, this covering may in some cases include more than one cell.

*image_area*: reference to an area (e.g., mesh cell) covering of the image cluster set area for "pt_covering" (see detailed description of the function, "confidence_adjuster"). Note that if this field is not NULL, then this is the target MS location estimate used by the Location Center instead of "area_est".

FIG. 9A

*extrapolation_area*: reference to (if non-NULL) an extrapolated MS target estimate area provided by the Location Extrapolator submodule of the Hypothesis Analyzer. That is, this field, if non_NULL, is an extrapolation of the "image_area" field if it exists, otherwise this field is an extrapolation of the "area_est" field. Note other extrapolation fields may also be provided depending on the embodiment of the present invention, such as an extrapolation of the "pt_covering".

*confidence*: A real value in the range [0, +1.0] indicating a likelihood (e.g., probability) that the target MS is in (or out) of a particular area. If positive: if "image_area" exists, then this is a measure of the likelihood that the target MS is within the area represented by "image_area," else if "image_area" has not been computed (e.g., "adjust" is FALSE), then "area_est" must be valid and this is a measure of the likelihood that the target MS is within the area represented by "area_est." If negative, then "area_est" must be valid and this is a measure of the likelihood that the target MS is NOT in the area represented by "area_est". If it is zero (near zero), then the likelihood is unknown.

*Original_Timestamp*: Date and time that the location signature cluster for this location hypothesis was received by the CDMA Filter Subsystem,

*Active_Timestamp*: Run-time field providing the time to which this location hypothesis has had its MS location estimate(s) extrapolated (in the Location Extrapolator of the Hypothesis Analyzer). Note that this field is initialized with the value from the "Original_Timestamp" field.

*Processing Tags and environmental categorizations*: For indicating particular types of environmental classifications not readily determined by the Original_Timestamp field (e.g., weather, traffic), and restrictions on location hypothesis processing.

*loc_sig_cluster*: Access to location signature signal characteristics provided to the First Order Models by the CDMA Filter Subsystem; i.e., access to the "loc sigs" (received at "timestamp" regarding the location of the target MS)

*descriptor*: Optional descriptor (from the First Order Model indicating why/how the Location Area Estimate and Confidence Value were determined).

FIG. 9B

Signal Processing Subsystem 1220

FIG. 15: LOCATION PROVISIONING VIA MULTIPLE CMRS

Signal Processing Subsystem 1220

WIRELESS LOCATION ROUTING APPLICATIONS AND ARCHITECTURE THEREFOR

RELATED APPLICATIONS

The present application is a continuation of U.S. patent application Ser. No. 10/297,449, filed Dec. 6, 2002, which is the U.S. National Stage filing of International Application No. PCT/US01/17957 filed Jun. 4, 2001, which claims the benefit of U.S. Provisional Application No. 60/293,094 filed May 22, 2001, these applications being fully incorporated herein by reference.

FIELD OF THE INVENTION

The present invention is directed generally to a system and method for locating people, services, or objects, and in particular, to a system and method for locating a wireless mobile station/unit using various mobile station location estimators, wherein, e.g., a resulting location determination(s) is used for assisting in accessing a product or service. The present invention is additionally directed to a computational system and method for calibrating the relative performance of multiple location models, wherein each such model is capable of being activated for generating hypotheses (e.g., estimates and/or predictions) of an unknown condition such as the location of wireless mobile station.

BACKGROUND OF THE INVENTION

There is great interest in providing existing infrastructures for wireless communication systems with the capability for locating people and/or objects in a cost effective manner. Such a capability would be invaluable in a variety of situations, especially in emergency, crime situations and mobile commerce. There are numerous competing wireless location technologies that purport to effectively locate wireless mobile stations (as used herein this term includes, e.g., mobile phones, short message devices (SMS), electronic container tracking tags, micro-transceivers for personal location and/or emergency). These technologies can be generally classified as:

(a) handset centric wherein a portion of the location processing is performed at the mobile stations, and in particular, each such mobile station (MS) includes specialized electronics specifically for performing location. In most cases, such specialized electronics are for detecting and receiving satellite (or more generally, non-terrestrial) signals that can then be used in determining a location of the MS.

(b) network centric wherein the wireless communication network(s) with which the MS is in contact handle substantially all location specific processing. As one skilled in the art will understand, there are various wireless location technologies that are available such as time difference of arrival (TDOA), time of arrival (TOA), timing advance (TA) techniques, angle of arrival (AOA), multipath pattern matching techniques; and (c) hybrid systems wherein there are specialized location electronics at the handset, but a substantial amount of the location processing is performed at a network site rather at the MS. An example of such a hybrid system is what is known as network assisted GPS systems, wherein GPS signals are obtained at the MS (with the assistance network received information) and GPS timing information is transmitted from the MS to the network for performing MS location computations.

The wide variety of wireless location techniques can provide, under appropriate circumstances, the following advantages:

(a) if the techniques are used in combination, a more reliable and accurate wireless location capability can be provided. In particular, when an embodiment of one wireless location technique is known to be less than satisfactory in a particular geographic area, an alternative embodiment (or alternative technique) can be used to obtain an MS's location(s). Additionally, two different embodiments and/or techniques can be applied substantially simultaneously for locating an MS. In this latter case, a location resolver is likely needed to determine a "most likely" resulting MS location estimate. Note, that wireless location systems for combining wireless location techniques is described in the following international and U.S. patent applications which are each incorporated fully by reference herein:

i. U.S. Provisional Application No. 60/025,855 filed Sep. 9, 1996
  ii. U.S. Provisional Application No. 60/044,821, filed Apr. 25, 1997;
  iii. U.S. Provisional Application No. 60/056,590, filed Aug. 20, 1997;
  iv. International Application No. PCT/US97/15933 filed Sep. 8, 1997 entitled "LOCATION OF A MOBILE STATION USING A PLURALITY OF COMMERCIAL WIRELESS INFRASTRUCTURES"
  v. International Application No. PCT/US97/15892 filed Sep. 8, 1997; entitled "LOCATION OF A MOBILE STATION";
  vi. U.S. application Ser. No. 09/194,367 filed Nov. 24, 1999 entitled "Location Of A Mobile Station";
  vii. U.S. application Ser. No. 09/176,587 filed Oct. 21, 1998 entitled "Wireless Location System For Calibrating Multiple Location Estimators";
  viii. U.S. Pat. No. 6,236,365 filed Jan. 22, 1999 entitled "Location of a Mobile Station Using A Plurality Of Commercial Infrastructures";
  ix. U.S. application Ser. No. 09/299,115 filed: Apr. 23, 1999 entitled "WIRELESS LOCATION USING MULTIPLE SIMULTANEOUS LOCATION ESTIMATORS"; and (b) if a primary wireless location technique fails (e.g., due to an electronics malfunction), then assuming an alternative technique is available that does not use, e.g., the malfunctioning electronics of the primary technique, then the alternative technique can be used for MS location.

However, the variety of wireless location techniques available is also problematic for at least the following reasons:

(a) a request for an MS location can require either the requester to know the wireless location service provider of the geographical area where the MS is likely to be, or to contact a location broker that is able to, e.g., determine a communication network covering the geographical area within which the MS is currently residing and activate (directly or through the MS's wireless service provider) an appropriate wireless location service. In the art, the technology enabling such a location broker capability has been referred to as a "wireless location gateway". An embodiment of such a gateway is described in the PCT/US97/15892 reference identified above;

(b) for communication networks relying on handset centric and/or hybrid systems for MS location, MSs roaming from networks using only network centric location capabilities will likely not have the specialized electronics needed for being located and accordingly many location related network services will not be available such as emergency services (e.g., E911 in the U.S.).

(c) different location techniques have different reliability and accuracy characteristics.

Accordingly, it would be desirable to integrate into a single wireless location broker or wireless location gateway as many location techniques as possible so that location requests can be fulfilled without the requester needing to know what location technique is used. It would be further desirable for roaming MSs to be able to be located in coverage areas where a wireless location technique is different from the one (or more) techniques supported in the primary subscription area for the MS. Additionally, it would be desirable to provide new applications for which MS location information can be applied via, e.g., a wireless location gateway.

OBJECTS OF THE INVENTION RELATING TO WIRELESS LOCATION

It is an objective of the present invention to provide a system and method for accurately locating people and/or objects in a cost effective manner wherein a location requester can obtain an MS location without needing to provide location technique specific information with the request.

It is a further object the present invention to provide wireless location without the requester knowing the particulars of communication network with which the MS may be in contact, e.g., the commercial radio service provider (CMRS), the wireless communications protocol, etc.

Yet another objective is to provide a low cost location system and method, adaptable to wireless telephony/Internet systems, for using a plurality of location techniques for increasing MS location accuracy and consistency. In particular, the plurality of location techniques (embodied in "location estimators" also denoted "first order models" or FOMs herein) may be: activated according to any one or more of a number of activation strategies such as concurrent activation (e.g., for obtaining two location estimates of an MS location), data-driven activation (e.g., activated when appropriate input data is available), priority activation (e.g., an attempt to activate a preferred FOM is first performed, and if unsuccessful, or a result unsatisfactory, then an attempt at activating a second FOM is performed).

Yet another object is to (or be able to) integrate into a wireless location gateway a large number of MS location techniques such as:

(2.1) time-of-arrival wireless signal processing techniques;
(2.2) timing advance techniques;
(2.2) time-difference-of-arrival wireless signal processing techniques;
(2.3) adaptive wireless signal processing techniques having, for example, learning capabilities and including, for instance, artificial neural net and genetic algorithm processing;
(2.4) signal processing techniques for matching MS location signals with wireless signal characteristics of known areas;
(2.5) conflict resolution techniques for resolving conflicts in hypotheses for MS location estimates;
(2.6) techniques for enhancing MS location estimates through the use of both heuristics and historical data associating MS wireless signal characteristics with known locations and/or environmental conditions;
(2.7) angle of arrival techniques (also denoted direction of arrival) for estimating an angle and/or direction of wireless signals transmitted from an MS;
(2.8) location techniques that use satellite signals such as GPS signals received at the MS;
(2.9) hybrid wireless location techniques that combine a two or more of the above location techniques (2.1)-(2.2) or other wireless location techniques.
(2.10) Wireless location techniques that use Doppler, phase coherency, and other signal characteristics for determining MS location, MS velocity and MS direction of movement.

A related object is to integrate handset centric, network centric and hybrid systems so that the problems identified hereinabove are mitigated.

Note that it is an objective of the present invention to provide a "plug and play" capability for new wireless location estimators, wherein new location estimators can be easily incorporated into an embodiment of the present invention. That is, provide an interface that allows substantially automatic integration of new FOMs.

Yet another object is to provide novel applications for wireless location that benefits from an integration of different location techniques.

DEFINITIONS

The following definitions are provided for convenience. In general, the definitions here are also defined elsewhere in this document as well.

(3.1) The term "wireless" herein is, in general, an abbreviation for "digital wireless", and in particular, "wireless" refers to digital radio signaling using one of standard digital protocols such as Advanced Mobile Phone Service (AMPS), Narrowband Advanced Mobile Phone Service (NAMPS), code division multiple access (CDMA) and Time Division Multiple Access (TDMA), Global Systems Mobile (GSM), and time division multiple access (TDMA) as one skilled in the art will understand.

(3.2) As used herein, the term "mobile station" (equivalently, MS) refers to a wireless device that is at least a transmitting device, and in most cases is also a wireless receiving device, such as a portable radio telephony handset. Note that in some contexts herein instead or in addition to MS, the following terms are also used: "personal station" (PS), and "location unit" (LU). In general, these terms may be considered synonymous. Note that examples of various MSs are identified in the Background section above.

(3.3) The terms, "wireless infrastructure" (or simply "infrastructure"), denotes one or more of: (a) a network for one or more of telephony communication services, (b) a collection of commonly controlled transceivers for providing wireless communication with a plurality of MSs, (c) the wireless Internet, (d) that portion of communications network that receives and processes wireless communications with wireless mobile stations. In particular, this infrastructure includes telephony wireless base stations (BS) such as those for radio mobile communication systems based on CDMA, AMPS, NAMPS, TDMA, and GSM wherein the base stations provide a network of cooperative communication channels with an air interface to the MS, and a conventional telecommunications interface with a Mobile Switch Center (MSC). Thus, an MS user within an area serviced by the base stations may be provided with wireless communication throughout the area by user transparent communication transfers (i.e., "handoffs") between the user's MS and these base stations in order to maintain effective telephony service. The mobile switch center (MSC) provides communications and control connectivity among base stations and the public telephone network.

(3.4) The phrase, "composite wireless signal characteristic values" denotes the result of aggregating and filtering a collection of measurements of wireless signal samples, wherein these samples are obtained from the wireless communication between an MS to be located and the base station infrastructure (e.g., a plurality of networked base stations). However, other phrases are also used herein to denote this collection of derived characteristic values depending on the context and the likely orientation of the reader. For example, when viewing these values from a wireless signal processing perspective of radio engineering, as in the descriptions of the subsequent Detailed Description sections concerned with the aspects of the present invention for receiving MS signal measurements from the base station infrastructure, the phrase typically used is: "RF signal measurements". Alternatively, from a data processing perspective, the phrases: "location signature cluster" and "location signal data" are used to describe signal characteristic values between the MS and the plurality of infrastructure base stations substantially simultaneously detecting MS transmissions. Moreover, since the location communications between an MS and the base station infrastructure typically include simultaneous communications with more than one base station, a related useful notion is that of a "location signature" (also denoted "loc sig" herein) which is the composite wireless signal characteristic values for signal samples between an MS to be located and a single base station. Also, in some contexts, the phrases: "signal characteristic values" or "signal characteristic data" are used when either or both a location signature(s) and/or a location signature cluster(s) are intended.

SUMMARY DISCUSSION

The present invention relates to a method and system for performing wireless mobile station location. In particular, the present invention is a wireless mobile station location computing method and system that utilizes multiple wireless location computational estimators (these estimators also denoted herein as MS location hypothesizing computational models, "first order models", FOMs, and/or "location estimating models"), for providing location estimates of a target mobile station MS, wherein ambiguities and/or conflicts between the location estimates may be effectively and straightforwardly resolved. More particularly, the present invention provides a technique for calibrating the performance of each of the location estimators so that a confidence value (e.g., a probability) can be assigned to each generated location estimate. Additionally, the present invention provides a straightforward technique for using the confidence values (probabilities) for deriving a resulting most likely location estimate of a target wireless mobile station.

More generally, the present invention relates to a novel computational method and architecture for synergistically combining the results of a plurality of computational models in a straightforward way that allows the models to be calibrated relative to one another so that differences in results generated by the models can be readily resolved. Accordingly, the computational method and architecture of the present invention may be applied to wide range applications where synergies between multiple models is expected to be enhance performance.

For a particular application having a plurality of computational models (each generating a hypothetical estimate of a desired result(s) in a space of hypothesis results), the present invention may be described, at a high level, as any method or system that performs the following steps:

(4.1.1) A step of determining a classification scheme for determining an input class for each input data set supplied to the plurality of computational models (FOMs), wherein for each range, R, of a plurality of ranges of desired results in the hypothesis space, there is an input class, and the input data sets of this input class are expected to have their corresponding desired result(s) in the range R. Some examples will be illustrative. For a wireless location system, the present step determines geographical subareas of a wireless network coverage area that have "similar" wireless signal characteristics. Such subareas may be relatively easy to determine, and there may be no constraint on the size of the subareas. The intention is to determine: (a) such a subarea as only a general area where a target MS must reside, and (b) the subarea should be relatively homogeneous in its wireless signaling characteristics. Accordingly, (a) and (b) are believed to be substantially satisfied by grouping together into the same input class the wireless signal data sets (i.e., input data sets) from corresponding target MS locations wherein at each of the target MS locations: (i) the set of base stations detected by the target MS (at the location) is substantially the same, and/or (b) the set of base stations detecting the target MS is substantially the same set of base stations.

Note that there are numerous techniques and commercial packages for determining such a classification scheme. In particular, the statistically based system, "CART" (acronym for Classification and Regression Trees) by ANGOSS Software International Limited of Toronto, Canada is one such package. Further, note that this step is intended to provide reliable but not necessarily highly accurate ranges R for the desired results. Also note that in some applications there may be only a single input class, thus assuring high reliability (albeit, likely low accuracy). Accordingly, in this latter case the present step may be omitted.

(4.1.2) A step of calibrating each of the plurality of computational models (FOMs) so that each subsequent hypothesis generated by one of the models has a confidence value (e.g., probability) associated therewith that is indicative of the likeliness of the hypothesis being correct. The calibrating of this step is performed using the input classification scheme determined in the above step (4.1.1). In one embodiment of this step, each model is supplied with inputs from a given fixed input class, wherein each of these inputs have corresponding known results that constitute a correct hypothesis (i.e., a desired result). Subsequently, the performance of each model is determined for the input class and a confidence value is assigned to the model for inputs received from the input class. Note that this procedure is repeated with each input class available from the input classification scheme. In performing this procedure, an application domain specific criteria is used to determine whether the hypotheses generated by the models identify the desired results in the hypothesis space. Accordingly, for each of the models, when supplied with an input data set from a fixed input class, the hypothesis generated by the model will be given the confidence value determined for this input class as an indication of the likelihood of the generated hypothesis being correct (i.e., the desired result).

Note that the confidence value for each generated hypothesis may be computed as a probability that the hypothesis is correct.

Note that for a wireless location application, the criteria (in one embodiment) is whether a location hypothesis contains the actual location where the MS was when the corresponding input data set (wireless signal measurements) were communicated between this MS and the wireless network.

For applications related to the diagnosis of electronic systems, this criteria may be whether an hypothesis identifies a proper functional unit such as a circuit board or chip.

For economic forecasting applications, this criteria may be whether an hypothesis is within a particular range of the correct hypothesis. For example, if an application according to the present invention predicts the U.S. gross national product (GNP) six months into the future according to certain inputs (defining input data sets), then hypotheses generated from historical data that has associated therewith the actual corresponding GNP (six months later), may be used for calibrating each of the plurality of economic forecasting models (FOMs). Thus, the application specific criteria for this case may be that a generated hypothesis is within, say, 10% of the actual corresponding six month GNP prediction.

For identifying a known object such as an air or space borne, terrestrial vehicle, or watercraft, the criteria may be whether an hypothesis actually identifies the object.

For geophysical analysis applications (e.g., for identifying and/or classifying and/or mapping mineral deposits, oil, aquifers or seismic faults), the criteria may be whether an hypothesis provides a correct analysis.

Note that the applications described herein are illustrative, but not comprehensive of the scope of the present invention. Further note that this step typically is performed at least once prior to inputting input data sets whose resulting hypotheses are to be used to determine the desired or correct results. Additionally, once an initial calibration has been performed, this step may also be performed: (a) intermittently between the generation of hypotheses, and/or (b) substantially continuously and in parallel with the generation of hypotheses by the models.

(4.1.3) A step of providing one or more input data sets to the models (FOMs) for generating a plurality of hypotheses, wherein the result(s) desired to be hypothesized are unknown. Moreover, note that the generated hypotheses are preferred to have a same data structure definition.

For example, for a wireless location system, the present step provides an input data set including the composite signal characteristic values to one or more MS location hypothesizing computational models, wherein each such model subsequently determines one or more initial estimates (also denoted location hypotheses) of the location of the target MS. Note that one or more of these model may be based on, for example, the signal processing techniques 2.1 through 2.3 above.

(4.1.4) A step of adjusting or modifying the generated hypotheses output by the models, wherein for such an hypothesis, adjustments may be performed on one or both of its hypothesized result H.R, and its confidence value for further enhancing the performance of the present invention. In one embodiment of this step, H.R is used as an index to retrieve other results from an archival database, wherein this database associates hypothesized results with their corresponding desired or correct results. Thus, H.R may be used to identify data from other archived hypothesized results that are "nearby" to H.R, and subsequently use the nearby data to retrieve the corresponding desired results. Thus, the set of retrieved desired results may be used to define a new "adjusted" hypothesis.

For example, for a wireless location system utilizing the present invention, each location hypothesis, H, identifies an area for a target MS, and H can used to identify additional related locations included in archived hypotheses generated by the same FOM as generated H. For instance, such related locations may be the area centroids of the archived hypotheses, wherein these centroids reside within the area hypothesized by H. Accordingly, such centroids may be used to retrieve the corresponding actual verified MS locations (i.e., the corresponding desired results), and these retrieved verified locations may be used to generate a new adjusted area that is likely to be more accurate than H. In particular, a convex hull of the verified locations may be used as a basis for determining a new location hypothesis of the target MS. Moreover, this aspect of the invention may include the preprocessing of such adjustments throughout a wireless coverage area to produce a geolocation vector gradient field, wherein for each archived hypotheses H (having $L_H$ as an MS location estimate) for a designated FOM, throughout the coverage area, a corresponding verified location version $VL_H$ is determined. Subsequently, the adjustment vector $AV_H = (VL_H - L_H)$ is determined as one of the adjustment vectors of the vector gradient field. Thus, $L_H$ and $AV_H$ are associated in the data archive as a record of the vector gradient field. Accordingly, when a location hypothesis H0 for a target MS at an unknown location is generated (the hypothesis H0 having L0 as the target MS location estimate), records within the vector gradient field having their corresponding location $L_H$ "near" L0, (e.g., within area of a predetermined distance about L0 or a "neighborhood: of L0) can be retrieved. Accordingly, an adjustment to L0 can be determined as a function of the $L_H$ and $AV_H$ values of the retrieved records. Note that an adjustment to L0 may be simply an average of these $AV_H$ vectors for the retrieved records. Alternatively, the $AV_H$ values may be weighted such that the $AV_H$ having $L_H$ closer to L0 are more influential in the resulting derived location for the target MS. More generally, the adjustment technique includes a method for interpolating an adjustment at L0 from the verified adjustments at locations about L0. Enhancements on such adjustment/interpolation techniques are also within the scope of the present invention. For example, the weightings (or other terms of an such an interpolation technique) may be combined with other known wireless signal characteristics of the area such as an identification of: (a) a known sharp change in the geolocation gradient vector field, and/or (b) a subarea having reduced wireless transmission capabilities, and/or (c) a subarea wherein the retrieved records for the subarea have their estimates $L_H$ widely spaced apart, and/or (d) a subarea wherein there is an insufficient number of retrieved records.

For other application domains, the present step requires a first technique to determine both "nearby" archived data from previously archived hypotheses, and a second technique to determine an "adjusted" hypothesis from the retrieved desired results. In general, such techniques can be relatively straightforward to provide when the hypothesized results reside in a vector space, and more particularly, in a Cartesian product of the real numbers. Accordingly, there are numerous applications that can be configured to generate hypothesized results in a vector space (or Cartesian product of the real numbers). For instance, economic financial forecasting applications typically result in numeric predictions where the first and second techniques can be, e.g., substantially identical to the centroid and convex hull techniques for the wireless location application; and (4.1.5) A step of subsequently computing a "most likely" target MS location estimate is computed for outputting to a location requesting application such as 911 emergency, the fire or police departments, taxi services, etc. Note that in computing the most likely target MS location estimate a plurality of location hypotheses may be taken into account. In fact, it is an important aspect of the present invention that the most likely MS location estimate is determined by computationally forming a composite MS location estimate utilizing such a plurality of location hypotheses so that, for example, location estimate similarities between location hypotheses can be effectively utilized.

Referring to (4.1.3) there may be hypotheses for estimating not only desired result(s), but also hypotheses may be generated that indicate where the desired result(s) is not. Thus, if the confidence values are probabilities, an hypothesis may be generated that has a very low (near zero) probability of having the desired result. As an aside, note that in general, for each generated hypothesis, H, having a probability, P, there is a dual hypothesis $H^c$ that may be generated, wherein the $H^c$ represents the complementary hypothesis that the desired result is in the space of hypothesized results outside of H. Thus, the probability that the desired result(s) is outside of the result hypothesized by H is 1-P. Accordingly, with each location hypothesis having a probability favorably indicating where a desired result may be (i.e., P>=0.5), there is a corresponding probability for the complement hypothesis that indicates where the desired result(s) is unlikely to be. Thus, applying this reasoning to a wireless location application utilizing the present invention, then for an hypothesis H indicating that the target MS is in a geographical area A, there is a dual location estimate $H^c$ that may be generated, wherein the $H^c$ represents the area outside of A and the probability that the target MS is outside of A is 1-P. Thus, with each location hypothesis having a probability favorably indicating where a target MS may be (i.e., P>=0.5), there is a corresponding probability for the complement area not represented by the location hypothesis that does not favor the target MS being in this complement area. Further, note that similar dual hypotheses can be used in other applications using the multiple model architecture of the present invention when probabilities are assigned to hypotheses generated by the models of the application.

Referring to (4.1.3) as it relates to a wireless location system provided by the present invention, note that, it is an aspect of the present invention to provide location hypothesis enhancing and evaluation techniques that can adjust target MS location estimates according to historical MS location data and/or adjust the confidence values of location hypotheses according to how consistent the corresponding target MS location estimate is: (a) with historical MS signal characteristic values, (b) with various physical constraints, and (c) with various heuristics. In particular, the following capabilities are provided by the present invention:

(5.1) a capability for enhancing the accuracy of an initial location hypothesis, H, generated by a first order model, $FOM_H$, by using H as, essentially, a query or index into an historical data base (denoted herein as the location signature data base). Note, this data base may include: (a) a plurality of previously obtained location signature clusters (i.e., composite wireless signal characteristic values) such that for each such cluster there is an associated actual or verified MS locations where an MS communicated with the base station infrastructure for locating the MS, and (b) previous MS location hypothesis estimates from $FOM_H$ derived from each of the location signature clusters stored according to (a). Alternatively this data base include a location error gradient field for the know location errors for $FOM_H$;

(5.2) a capability for analyzing composite signal characteristic values of wireless communications between the target MS and the base station infrastructure, wherein such values are compared with composite signal characteristics values of known MS locations (these latter values being archived in the location signature data base). In one instance, the composite signal characteristic values used to generate various location hypotheses for the target MS are compared against wireless signal data of known MS locations stored in the location signature data base for determining the reliability of the location hypothesizing models for particular geographic areas and/or environmental conditions;

(5.3) a capability for reasoning about the likeliness of a location hypothesis wherein this reasoning capability uses heuristics and constraints based on physics and physical properties of the location geography;

(5.4) an hypothesis generating capability for generating new location hypotheses from previous hypotheses.

As also mentioned above in (2.3), the present invention may utilize adaptive signal processing techniques. One particularly important utilization of such techniques includes the automatic tuning of the present invention so that, e.g., such tuning can be applied to adjusting the values of location processing system parameters that affect the processing performed by the present invention. For example, such system parameters as those used for determining the size of a geographical area to be specified when retrieving location signal data of known MS locations from the historical (location signature) data base can substantially affect the location processing. In particular, a system parameter specifying a minimum size for such a geographical area may, if too large, cause unnecessary inaccuracies in locating an MS. Accordingly, to accomplish a tuning of such system parameters, an adaptation engine is included in the present invention for automatically adjusting or tuning parameters used by the present invention. Note that in one embodiment, the adaptation engine is based on genetic algorithm techniques.

The present invention may include one or more FOMs that may be generally denoted as classification models wherein such FOMs are trained or calibrated to associate particular composite wireless signal characteristic values with a geographical location where a target MS could likely generate the wireless signal samples from which the composite wireless signal characteristic values are derived. Further, the present invention may include the capability for training and retraining such classification FOMs to automatically maintain the accuracy of these models even though substantial changes to the radio coverage area may occur, such as the construction of a new high rise building or seasonal variations (due to, for example, foliage variations). As used herein, "training" refers to iteratively presenting "training data" to a computational module for changing the behavior of the module so that the module may perform progressively better as it learns appropriate behavioral responses to the training data. Accordingly, training may include, for example, the repeated input of training data to an artificial neural network, or repeated statistical regression analyses on different and/or enhanced training data (e.g., statistical sample data sets). Note that other embodiments of a trained pattern matching FOMs for wireless location are disclosed in U.S. Pat. No. 6,026,304, titled "Radio Transmitter Location Finding for Wireless Communication Network Services and Management," filed Jan. 8, 1997 and issued Feb. 15, 2000, having Hilsenrath and Wax as inventors, this patent being incorporated herein fully by reference.

It is well known in the wireless telephony art that the phenomenon of signal multipath and shadow fading renders most analytical location computational techniques such as time-of-arrival (TOA) or time-difference-of-arrival (TDOA) substantially error prone in urban areas and particularly in dense urban areas without further statistical correlation processing such as such super resolution as disclosed in U.S. Pat. No. 5,890,068 by Fattouche et. al. issued on Mar. 30, 1999 and incorporated fully herein by reference. Moreover, it may be the case that even though such additional processing is performed, the multipath phenomenon may still be problematic. However, this same multipath phenomenon also may produce substantially distinct or peculiar signal measurement patterns, wherein such a pattern coincides with a relatively small geographical area. Thus, the present invention may include a FOM(s) utilize multipath as an advantage for increasing accuracy. Moreover, it is worthwhile to note that the utilization of classification FOMs in high multipath environments is especially advantageous in that high multipath environments are typically densely populated. Thus, since such environments are also capable of yielding a greater density of MS location signal data from MSs whose actual locations can be obtained, there can be a substantial amount of training or calibration data captured by the present invention for training or calibrating such classification FOMs and for progressively improving the MS location accuracy of such models.

It is also an aspect of the present invention that classification FOMs may be utilized that determine target MS locations by correlating and/or associating network anomalous behavior with geographic locations where such behavior occurs. That is, network behaviors that are problematic for voice and/or data communication may be used advantageously for locating a target MS. For example, it is well known that wireless networks typically have within their coverage areas persistent subareas where voice quality is problematic due to, e.g., measurements related to high total errors, a high error rate, or change in error rate. In particular, such measurements may be related to frame error rates, redundancy errors, co-channel interference, excessive handoffs between base stations, and/or other call quality measurements. Additionally, measurements may be used that are related to subareas where wireless communication between the network and a target MS is not sufficient to maintain a call (i.e., "deadzones"). Thus, information about such so called problematic behaviors may used by, e.g., a location estimator (FOM) to generate a more accurate estimate of a target MS. For example, such network behavioral measurements may be provided for training an artificial neural network and/or for providing to a statistical regression analysis technique and/or statistical prediction models (e.g., using principle decomposition, partial least squares, or other regression techniques) for associating or correlating such measurements with the geographic area for which they likely derive. Moreover, note that such network behavioral measurements can also be used to reduce the likelihood of a target MS being in an area if such measurements are not what would be expected for the area.

It is also an aspect of the present invention that FOMs themselves may be hybrid combinations of MS location techniques. For example, an embodiment of the present invention may include a FOM that uses a combination of Time Difference of Arrival (TDOA) and Timing Advance (TA) location measurement techniques for locating the target MS, wherein such a technique may require only minor modifications to the wireless infrastructure. In particular, such a FOM may provide reduced MS location errors and reduced resolution of ambiguities than are present when these techniques are used separately. One embodiment of such a FOM (also denoted the Yost Model or FOM herein) is disclosed in U.S. Pat. No. 5,987,329 filed Jul. 30, 1997 and issued Nov. 16, 1999 having Yost and Panchapakesan as inventors, this patent being fully incorporated herein by reference.

Additionally, note that FOMs related to the Yost Model may also be incorporated into embodiments of the present invention wherein an elliptical search restriction location technique may also be utilized. In particular, such a technique is disclosed in U.S. patent application, having U.S. Ser. No. 08/903,551, and entitled "System and Method Using Elliptical Search Area Coverage in Determining the Location of a Mobile Terminal", filed Jul. 30, 1997, which is also incorporated by reference herein.

It is also a related aspect of the present invention to include a plurality of stationary, low cost, low power "location detection base stations" (LBS), each such LBS having both restricted range MS detection capabilities, and a built-in MS. Accordingly, a grid of such LBSs can be utilized for providing wireless signaling characteristic data (from their built-in MSs) for: (a) (re)training such classification FOMs, and (b) calibrating the FOMs so that each generated location hypothesis has a reliable confidence value (probability) indicative of the likeliness of the target MS being in an area represented by the location hypothesis.

It is a further aspect of the present invention that the personal communication system (PCS) infrastructures currently being developed by telecommunication providers offer an appropriate localized infrastructure base upon which to build various personal location systems (PLS) employing the present invention and/or utilizing the techniques disclosed herein. In particular, the present invention is especially suitable for the location of people and/or objects using code division multiple access (CDMA) wireless infrastructures, although other wireless infrastructures, such as, time division multiple access (TDMA) infrastructures and GSM are also contemplated. CDMA general principles are described, for example, in U.S. Pat. No. 5,109,390, to Gilhausen, et al, which is also incorporated herein by reference.

As mentioned in (1.7) and in the discussion of classification FOMs above, embodiments of the present invention may include components (e.g., FOMs) that can substantially automatically retrain themselves to compensate for variations in wireless signal characteristics (e.g., multipath) due to environmental and/or topographic changes to a geographic area serviced by the present invention. For example, in one embodiment, the present invention optionally includes low cost, low power base stations, denoted location base stations (LBS) above, providing, for example, CDMA pilot channels to a very limited area about each such LBS. The location base stations may provide limited voice traffic capabilities, but each is capable of gathering sufficient wireless signal characteristics from an MS within the location base station's range to facilitate locating the MS. Thus, by positioning the location base stations at known locations in a geographic region such as, for instance, on street lamp poles and road signs, additional MS location accuracy can be obtained. That is, due to the low power signal output by such location base stations, for there to be signaling control communication (e.g., pilot signaling and other control signals) between a location base station and a target MS, the MS must be relatively near the location base station. Additionally, for each location base station not in communication with the target MS, it is likely that the MS is not near to this location base station. Thus, by utilizing information received from both location base stations in communication with the target MS and those that are not in communication with the target MS, the present invention may substantially narrow the possible geographic areas within which the target MS is likely to be. Further, by providing each location base station (LBS) with a co-located stationary wireless transceiver (denoted a built-in MS above) having similar functionality to an MS, the following advantages are provided:

(6.1) assuming that the co-located base station capabilities and the stationary transceiver of an LBS are such that the base station capabilities and the stationary transceiver communicate with one another, the stationary transceiver can be signaled by another component(s) of the present invention to activate or deactivate its associated base station capability, thereby conserving power for the LBS that operate on a restricted power such as solar electrical power;

(6.2) the stationary transceiver of an LBS can be used for transferring target MS location information obtained by the LBS to a conventional telephony base station;

(6.3) since the location of each LBS is known and can be used in location processing, the present invention is able to (re)train itself in geographical areas having such LBSs. That is, by activating each LBS stationary transceiver so that there is signal communication between the stationary transceiver and surrounding base stations within range, wireless signal characteristic values for the location of the stationary transceiver are obtained for each such base station. Accordingly, such characteristic values can then be associated with the known location of the stationary transceiver for training various of the location processing modules of the present invention such as the classification FOMs discussed above. In particular, such training and/or calibrating may include:

(i) (re)training FOMs;

(ii) adjusting the confidence value initially assigned to a location hypothesis according to how accurate the generating FOM is in estimating the location of the stationary transceiver using data obtained from wireless signal characteristics of signals between the stationary transceiver and base stations with which the stationary transceiver is capable of communicating;

(iii) automatically updating the previously mentioned historical data base (i.e., the location signature data base), wherein the stored signal characteristic data for each stationary transceiver can be used for detecting environmental and/or topographical changes (e.g., a newly built high rise or other structures capable of altering the multipath characteristics of a given geographical area); and (iv) tuning of the location system parameters, wherein the steps of: (a) modifying various system parameters and (b) testing the performance of the modified location system on verified mobile station location data (including the stationary transceiver signal characteristic data), these steps being interleaved and repeatedly performed for obtaining better system location accuracy within useful time constraints.

One embodiment of the present invention utilizes a mobile (location) base station (MBS) that can be, for example, incorporated into a vehicle, such as an ambulance, police car, or taxi. Such a vehicle can travel to sites having a transmitting target MS, wherein such sites may be randomly located and the signal characteristic data from the transmitting target MS at such a location can consequently be archived with a verified location measurement performed at the site by the mobile location base station. Moreover, it is important to note that such a mobile location base station as its name implies also includes base station electronics for communicating with mobile stations, though not necessarily in the manner of a conventional infrastructure base station. In particular, a mobile location base station may (in one embodiment) only monitor signal characteristics, such as MS signal strength, from a target MS without transmitting signals to the target MS. Alternatively, a mobile location base station can periodically be in bi-directional communication with a target MS for determining a signal time-of-arrival (or time-difference-of-arrival) measurement between the mobile location base station and the target MS. Additionally, each such mobile location base station includes components for estimating the location of the mobile location base station, such mobile location base station location estimates being important when the mobile location base station is used for locating a target MS via, for example, time-of-arrival or time-difference-of-arrival measurements as one skilled in the art will appreciate. In particular, a mobile location base station can include:

(7.1) a mobile station (MS) for both communicating with other components of the present invention (such as a location processing center included in the present invention);

(7.2) a GPS receiver for determining a location of the mobile location base station;

(7.3) a gyroscope and other dead reckoning devices; and (7.4) devices for operator manual entry of a mobile location base station location.

Furthermore, a mobile location base station includes modules for integrating or reconciling distinct mobile location base station location estimates that, for example, can be obtained using the components and devices of (7.1) through (7.4) above. That is, location estimates for the mobile location base station may be obtained from: GPS satellite data, mobile location base station data provided by the location processing center, dead reckoning data obtained from the mobile location base station vehicle dead reckoning devices, and location data manually input by an operator of the mobile location base station.

The location estimating system of the present invention offers many advantages over existing location systems. The present invention employs a number of distinctly different location estimators which provide a greater degree of accuracy and/or reliability than is possible with existing wireless location systems. For instance, the location models provided may include not only the radius-radius/TOA and TDOA techniques but also adaptive techniques such as artificial neural net techniques and the techniques disclosed in the U.S. Pat. No. 6,026,304 by Hilsenrath et. al. incorporated by reference herein, and angle or direction of arrival techniques as well as substantially any other wireless location technique wherein appropriate input data can be obtained.

(a) Note that hybrid location estimators based on combinations of such techniques (such as the location technique of U.S. Pat. No. 5,987,329 by Yost et. al). may also be provided by the present invention.

It is also an aspect of the present invention that various embodiments may provide various strategies for activating, within a single MS location instance, one or more location estimators (FOMs), wherein each such activated location estimator is provided with sufficient wireless signal data input for the activation. In one embodiment, one such strategy may be called "greedy" in that substantially as many location estimators may be activated as there is sufficient input (additionally, time and resources as well) for activation. Note that some wireless location techniques are dependent on specialized location related devices being operational such as fixed or network based receivers, antennas, transceivers, and/or signal processing equipment. Additionally note that some location techniques also require particular functionality to be operable in the MS; e.g., functionality for detecting one or more location related signals from satellites (more generally non-terrestrial transmitting stations). For example, the signals may be GPS signals. Accordingly, certain wireless location techniques may have their activations dependent upon whether such location related devices and/or MS functionality are available and operable for each instance of determining an MS location. Thus, for each MS wireless location instance, location estimators may be activated according to the operable features present during an MS location instance for providing input activation data.

The present invention may be able to adapt to environmental changes substantially as frequently as desired. Thus, the present invention may be able to take into account changes in the location topography over time without extensive manual data manipulation. Moreover, the present invention can be utilized with varying amounts of signal measurement inputs. Thus, if a location estimate is desired in a very short time interval (e.g., less than approximately one to two seconds), then the present invention can be used with only as much signal measurement data as is possible to acquire during an initial portion of this time interval. Subsequently, after a greater amount of signal measurement data has been acquired, additional more accurate location estimates may be obtained. Note that this capability can be useful in the context of 911 emergency response in that a first quick coarse wireless mobile station location estimate can be used to route a 911 call from the mobile station to a 911 emergency response center that has responsibility for the area containing the mobile station and the 911 caller. Subsequently, once the 911 call has been routed according to this first quick location estimate, by continuing to receive additional wireless signal measurements, more reliable and accurate location estimates of the mobile station can be obtained.

Moreover, there are numerous additional advantages of the system of the present invention when applied in communication systems using, e.g., CDMA. The location system of the present invention readily benefits from the distinct advantages of the CDMA spread spectrum scheme. Namely, these advantages include the exploitation of radio frequency spectral efficiency and isolation by (a) monitoring voice activity, (b) management of two-way power control, (c) provisioning of advanced variable-rate modems and error correcting signal encoding, (d) inherent resistance to fading, (e) enhanced privacy, and (f) multiple "rake" digital data receivers and searcher receivers for correlation of signal multipaths.

At a more general level, it is an aspect of the present invention to demonstrate the utilization of various novel computational paradigms such as:

(8.1) providing a multiple FOM computational architecture (as illustrated in FIG. 8) wherein:
(8.1.1) the hypotheses may be generated by modular independent hypothesizing computational models (FOMs), wherein the FOMs have been calibrated to thereby output confidence values (probabilities) related to the likelihood of correspondingly generated hypotheses being correct;
(8.1.2) the location hypotheses from the FOMs may be further processed using additional amounts of application specific processing common or generic to a plurality of the FOMs;
(8.1.3) the computational architecture may enhance the hypotheses generated by the FOMs both according to past performance of the models and according to application specific constraints and heuristics without requiring complex feedback loops for recalibrating one or more of the FOMs;
(8.1.4) the FOMs are relatively easily integrated into, modified and extracted from the computational architecture;

(8.2) providing a computational paradigm for enhancing an initial estimated solution to a problem by using this initial estimated solution as, effectively, a query or index into an historical data base of previous solution estimates and corresponding actual solutions for deriving an enhanced solution estimate based on past performance of the module that generated the initial estimated solution.

The multiple FOM architecture provided herein is useful in implementing solutions in a wide range of applications. In fact, most of the Detailed Description hereinbelow can be immediately translated into other application areas, as one skilled in the art of computer application architectures will come to appreciate. For example, the following additional applications are within the scope of the present invention:

(9.1) document scanning applications;
(9.2) diagnosis and monitoring applications such as medical diagnosis/monitoring, communication network diagnosis/monitoring. Note that in many cases, the domain wherein a diagnosis is to be performed has a canonical hierarchical order among the components within the domain. For example, in automobile diagnosis, the components of an auto may be hierarchically ordered according to ease of replacement in combination within function. Thus, within an auto's electrical system (function), there may be a fuse box, and within the fuse box there will be fuses. Thus, these components may be ordered as follows (highest to lowest): auto, electrical system, fuse box, fuses. Thus, if different diagnostic FOMs provided different hypotheses as to a problem with an auto, the confidence values for each component and its subcomponents maybe summed together to provide a likelihood value that the problem within the component. Accordingly, the lowest component having, for example, at least a minimum threshold of summed confidences can be selected as the most likely component for either further analysis and/or replacement. Note that such summed confidences may be normalized by dividing by the number of hypotheses generated from the same input so that the highest summed confidence is one and the lowest is zero. Further note that this example is merely representative of a number of different diagnosis and/or prediction applications to which the present invention is applicable, wherein there are components that have canonical hierarchical decompositions. For example, a technique similar to the auto illustration above may be provided for the diagnosis of computer systems, networks (LANs, WANs, Internet and telephony networks), medical diagnosis from, e.g., x-rays, MRIs, sonograms, etc;
(9.3) robotics applications such as scene and/or object recognition. That is, various FOMs may process visual image input differently, and it may be that for expediency, an object is recognized if the summed confidence values for the object being recognized is above a certain threshold;
(9.4) seismic and/or geologic signal processing applications such as for locating oil and gas deposits;

(9.5) recognition of terrestrial and/or airborne objects from satellites, wherein there may be various spectral bands monitored.

(9.6) Additionally, note that this architecture need not have all modules co-located. In particular, it is an additional aspect of the present invention that various modules can be remotely located from one another and communicate with one another via telecommunication transmissions such as telephony technologies and/or the Internet. Accordingly, the present invention is particularly adaptable to such distributed computing environments. For example, some number of the first order models may reside in remote locations and communicate their generated hypotheses via the Internet.

In an alternative embodiment of the present invention, the processing following the generation of location hypotheses (each having an initial location estimate) by the first order models may be such that this processing can be provided on Internet user nodes and the first order models may reside at Internet server sites. In this configuration, an Internet user may request hypotheses from such remote first order models and perform the remaining processing at his/her node.

Additionally, note that it is within the scope of the present invention to provide one or more central location development sites that may be networked to, for example, geographically dispersed location centers providing location services according to the present invention, wherein the FOMs may be accessed, substituted, enhanced or removed dynamically via network connections (via, e.g., the Internet) with a central location development site. Thus, a small but rapidly growing municipality in substantially flat low density area might initially be provided with access to, for example, two or three FOMs for generating location hypotheses in the municipality's relatively uncluttered radio signaling environment. However, as the population density increases and the radio signaling environment becomes cluttered by, for example, thermal noise and multipath, additional or alternative FOMs may be transferred via the network to the location center for the municipality.

Note that in some embodiments of the present invention, since there is a lack of sequencing between the FOMs and subsequent processing of hypotheses (e.g., location hypotheses, or other application specific hypotheses), the FOMs can be incorporated into an expert system, if desired. For example, each FOM may be activated from an antecedent of an expert system rule. Thus, the antecedent for such a rule can evaluate to TRUE if the FOM outputs a location hypothesis, and the consequent portion of such a rule may put the output location hypothesis on a list of location hypotheses occurring in a particular time window for subsequent processing by the location center. Alternatively, activation of the FOMs may be in the consequents of such expert system rules. That is, the antecedent of such an expert system rule may determine if the conditions are appropriate for invoking the FOM(s) in the rule's consequent.

The present invention may also be configured as a blackboard system with intelligent agents (FOMs). In this embodiment, each of the intelligent agents is calibrated using archived data so that for each of the input data sets provided either directly to the intelligent agents or to the blackboard, each hypothesis generated and placed on the blackboard by the intelligent agents has a corresponding confidence value indicative of an expected validity of the hypothesis.

Of course, other software architectures may also to used in implementing the processing of the location center without departing from scope of the present invention. In particular, object-oriented architectures are also within the scope of the present invention. For example, the FOMs may be object methods on an MS location estimator object, wherein the estimator object receives substantially all target MS location signal data output by the signal filtering subsystem. Alternatively, software bus architectures are contemplated by the present invention, as one skilled in the art will understand, wherein the software architecture may be modular and facilitate parallel processing.

Further features and advantages of the present invention are provided by the figures and detailed description accompanying this invention summary. Note that the terms "invention" and "present invention" as used herein are to be considered generic terms for generally identifying novel aspects disclosed herein. The claims as provided hereinbelow define the scope of the invention for which patent protection has been granted.

BRIEF DESCRIPTION OF THE DRAWINGS

FIGS. 9A and 9B are a high level data structure diagram describing the fields of a location hypothesis object generated by the first order models 1224 of the location center.

DETAILED DESCRIPTION

Detailed Description Introduction

When performing wireless location as described herein, substantial improvements in radio location can be achieved since CDMA and other advanced radio communication infrastructures can be used for enhancing radio location. For example, the capabilities of IS-41 and advanced intelligent network (AIN) already provide a coarse-granularity of wireless location, as is necessary to, for example, properly direct a terminating call to an MS. Such information, originally intended for call processing usage, can be re-used in conjunction with the wireless location processing described herein to provide wireless location in the large (i.e., to determine which country, state and city a particular MS is located), and wireless location in the small (i.e., which location, plus or minus a few hundred feet a given MS is located).

Figure 4:
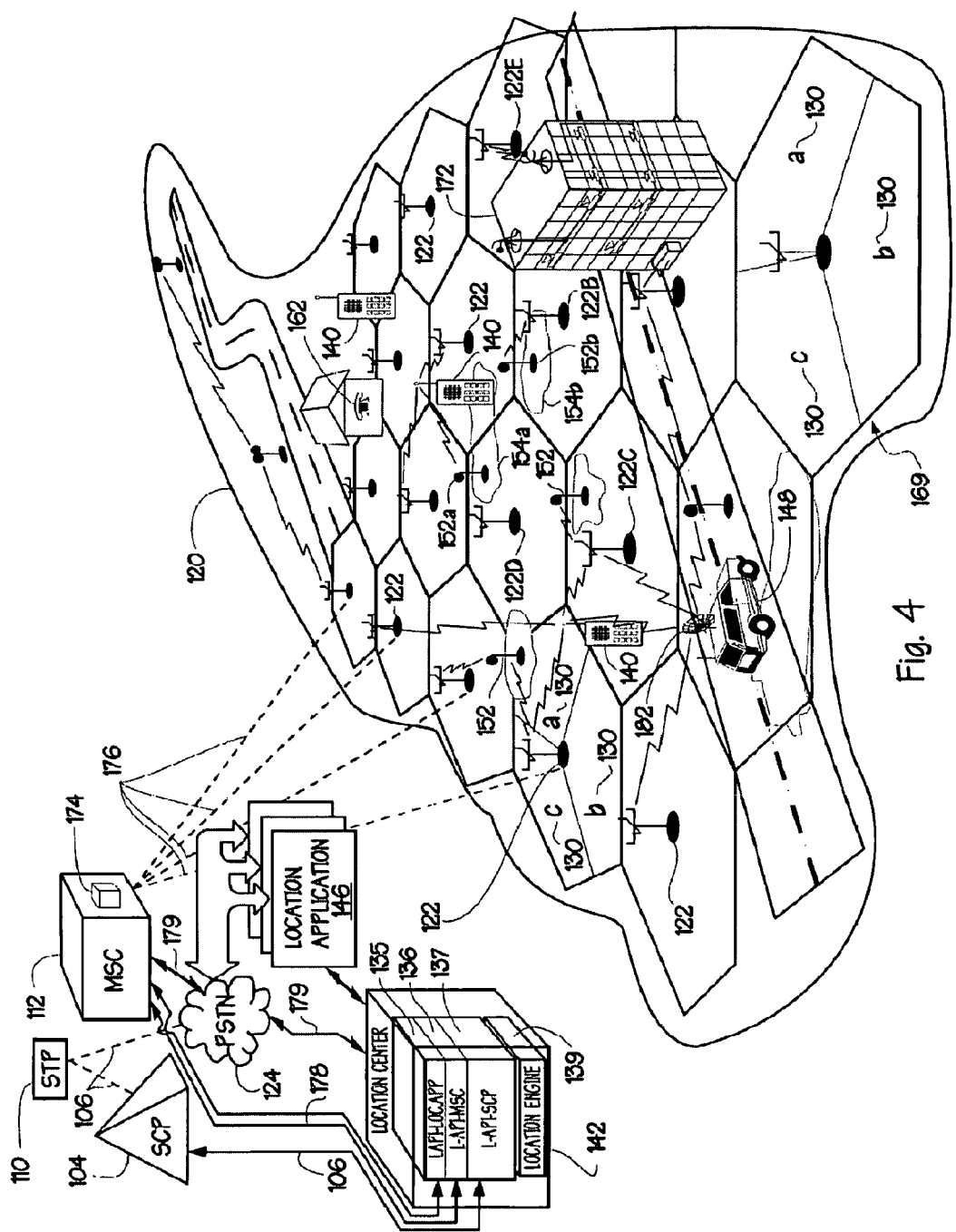
FIG. 4 illustrates an overall view of a wireless radio location network architecture, based on advanced intelligent network (AIN) principles.

FIG. 4 is a high level diagram of one embodiment of a wireless radiolocation architecture for the present invention. Accordingly, this figure illustrates the interconnections between the components of a wireless cellular communication network, such as, a typical PCS network configuration and various components that are specific to the present invention. In particular, as one skilled in the art will understand, a typical wireless (PCS) network includes:

(a) a (large) plurality of wireless mobile stations (MSs) 140 for at least one of voice related communication, visual (e.g., text such as is provided by a short message service) related communication, and according to present invention, location related communication. Note that some of the MSs 140 may include the electronics and corresponding software to detect and process signals from non-terrestrial transmission stations such as GPS and/or GLONASS satellites. Moreover, note that such non-terrestrial transmission stations can also be high attitude aircraft which, e.g., can hover over a metropolitan area thereby facilitating wireless communications;

(b) a mobile switching center (MSC) 112;

(c) a plurality of wireless cell sites in a radio coverage area 120, wherein each cell site includes an infrastructure base station such as those labeled 122 (or variations thereof such as 122A-122D). In particular, the base stations 122 denote the standard high traffic, fixed location base stations used for voice and data communication with a plurality of MSs 140, and, according to the present invention, also used for communication of information related to locating such MSs 140. Additionally, note that the base stations labeled 152 are more directly related to wireless location enablement. For example, as described in greater detail hereinbelow, the base stations 152 may be low cost, low functionality transponders that are used primarily in communicating MS location related information to the location center 142 (via base stations 122 and the MSC 112). Note that unless stated otherwise, the base stations 152 will be referred to hereinafter as location base station(s) 152 or simply LBS(s) 152;

(d) a public switched telephone network (PSTN) 124 (which may include signaling system links 106 having network control components such as: a service control point (SCP) 104, one or more signaling transfer points (STPs) 110.

In addition, the present invention provides one or more location centers/gateways 142. Such gateways may be described at a high level as follows.

Location Center/Gateway 142 Description

A location center/gateway 142, (also be referred to as a location center/gateway, or simply gateway), in response to a location request received at the location center, can request activation of one or more of a plurality of wireless location techniques in order to locate an MS 140.

Figure 18:
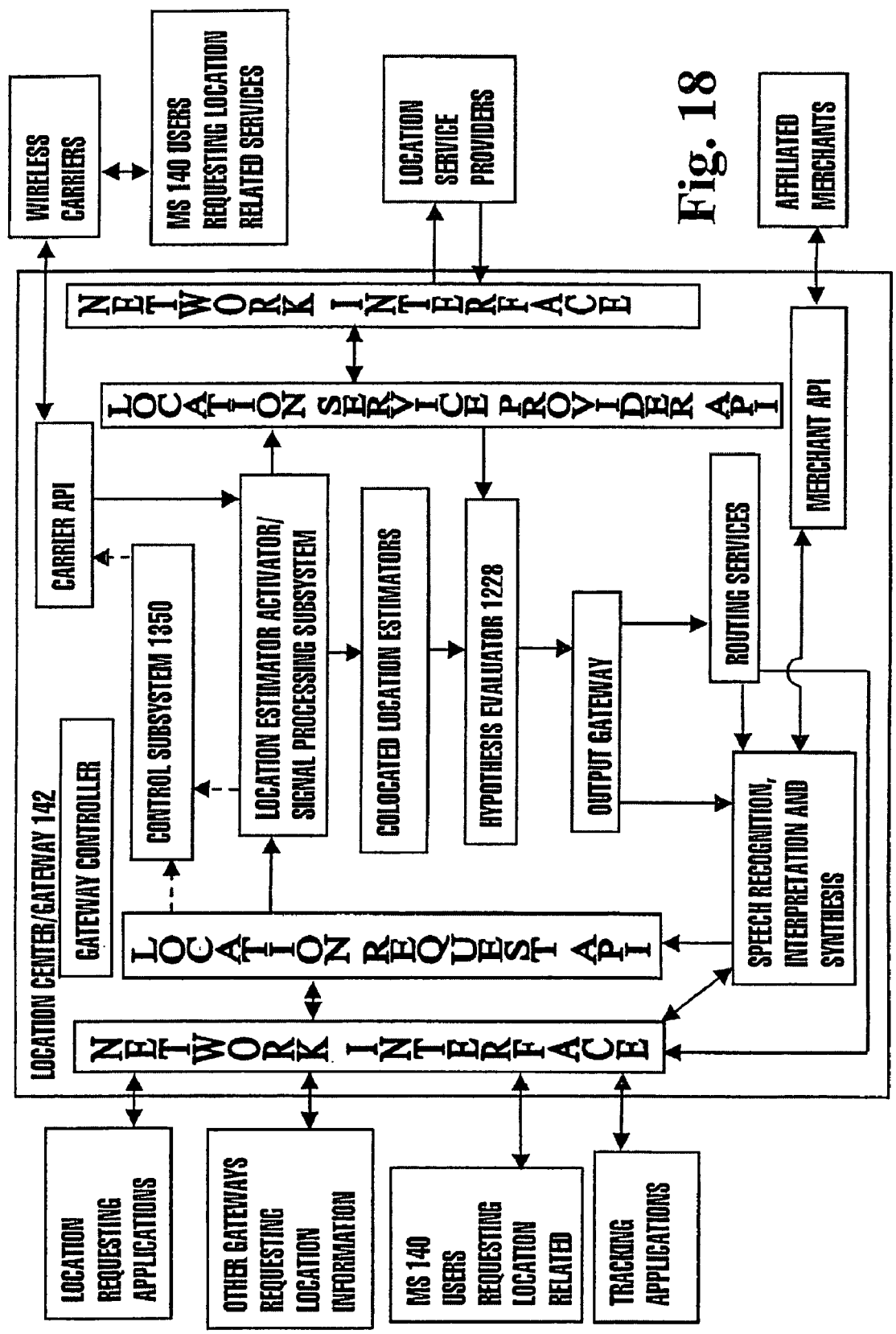
FIG. 18 is a block diagram further illustrating the present invention as a wireless location gateway.

Various embodiments are provided herein of the location center/gateway 142. In particular, FIG. 18 is block diagram illustrating another embodiment of the location center/gateway 142 of the present invention. Note that the wireless location gateway activation requests may be dependent upon, e.g., (a) a wireless network with which the MS 140 may be in contact, such a network may be:
  (i) a commercial mobile radio network supporting telephony functionality,
  (ii) a short messaging service or paging network;
  (iii) a wireless network of beacons for providing location related information such as GPS and LORAN C,
  (iv) wireless carrier independent networks for performing wireless location such as the wireless location network provided by Times Three, Suite #220, Franklin Atrium, 3015 5th Avenue N.E. Calgary, AB T2A 6TB,
  (v) a wireless broadcasting network for use in activating an MS 140 of, e.g., a stolen vehicle such as is provided by LoJack Corporation, 333 Elm Street, Dedham, Mass. 02026, and/or
  (vi) a hybrid network including portions of wireless networks each network providing different types of signal measurements for performing wireless location);

(b) the location signal measurement obtaining capabilities of the wireless network with which the MS may be in contact. For example, such a network may only support a network centric location technique;

(c) the functionality of the MS 140 such as: the type(s) of wireless signals which can be detected and processed by the MS such as:
  (i) non-terrestrial signals such as GPS signals,
  (ii) signals from wireless beaconing/broadcasting systems such as for LORAN C signals or stolen vehicle broadcast networks for activating an MS 140 attached to the stolen vehicle, or
  (iii) wireless telephony protocols like CDMA, TDMA, and/or GSM, (d) a likely location of the target MS 140. For example, if the target MS 140 is likely to be in Japan rather than the United States, then the location service provider contacted by the gateway 142 may be different from the location service provider if the MS is likely to be in the U.S.

Moreover, regarding the plurality of wireless location techniques (embodiments thereof also denoted herein as "location estimators") for which activation may be requested by the gateway, these techniques may be co-located with the gateway, accessible via a network including: (i) local area networks, and (ii) wide area networks such as a telephony (wired or wireless) network, the Internet or a cable network. The gateway 142 may supply to one or more of the location estimators, measurements of communications between the MS 140 and one or more networks for determining a location of the MS 140. Alternatively, instead of supplying such measurements (locally or remotely, and, via a network or otherwise), the gateway 142 may provide, with the location activation request, an identification of where the measurements may be obtained (e.g., one or more network addresses). In yet another alternative, such a gateway 142 may also send request(s) to the network(s) having such MS communication measurements to forward them to particular location estimators. Note, that in performing these tasks, the gateway 142 may receive with a location request (or may retrieve in response thereto) information regarding the functionality of the target MS 140, e.g., as discussed above. Accordingly, such information may be used in selecting the location estimator to which an activation request is provided. Thus, the gateway 142 may be the intermediary between location requesting applications and the location estimators, thereby providing a simple, uniform application programming interface (API) for such applications substantially independently of the location estimators that are activated to fulfill such location requests. Moreover, the gateway 142 (or embodiments thereof) can substantially ease the burden on geolocation service providers by providing a substantially uniform method for obtaining target MS/network signal data for use in locating the target MS. Thus, by interfacing to the gateway 142, a location service provider may substantially reduce the number and complexity of its data exchange interfaces with the wireless networks for obtaining target MS/network signal data. Similarly, the networks capturing such signal data may also reduce the complexity and number of their interfaces for providing such signal data to location service providers. Additionally, note that the gateway may also fulfill location requests wherein the location is for a stationary and/or wireline handset instead of a mobile station 140. Accordingly, the gateway 142 may request access to, e.g., phone location information stored in a carrier's database of premise provisioning equipment as one skilled in the art will understand.

In some embodiments of the gateway 142, it may also facilitate in the providing of certain location related services in addition to providing, e.g., MS 140 locations. In particular, one or more of the following location related services may be facilitated by the gateway 142 or may be made operative via the wireless location capabilities of the gateway 142. However, note that the following location related services can, in general, be provided without use of a gateway 142, albeit, e.g., in a likely more restricted context wherein not all available wireless location estimating techniques are utilized, and/or by multiplying the number of interfaces to geolocation service providers (e.g., distinct wireless location interfaces provided directly to each wireless location service provider utilized). Further note that some of these applications are described in greater detail in later sections herein:

(10.1) Routing instructions for directing a vehicle or person to get to a desired destination. Note, that there are various forms of utilizing MS location capabilities to determine an appropriate route, and related teachings are provided in copending U.S. patent application titled, "Wireless Location Using A Plurality of Commercial Network Infrastructures," by F. W. LeBlanc, Dupray and Karr filed Jan. 22, 1999 and having U.S. Pat. No. 6,236, 365 issued May 22, 2001 which is fully incorporated herein by reference, and by the following two copending U.S. patent applications which are also incorporated herein by reference: (i) "Location Of A Mobile Station" filed Nov. 24, 1999 having application Ser. No. 09/194, 367 whose inventors are Dupray and Karr, and (ii) "A Wireless Location System For Calibrating Multiple Location Estimators" filed Oct. 21, 1998 having application Ser. No. 09/176,587 whose inventor is Dupray. Additionally, other routing services (e.g., as illustrated by the "routing services" component in FIG. 18) may also be provided by the gateway 142 (or by service providers in cooperation with the gateway). For example, the gateway 142 may cooperate with an automated speech recognition interpretation and synthesis unit for providing substantially automated interactive communication with an MS 140 for providing spoken directions. Note that such directions may be provided in terms of street names and/or descriptions of the terrain (e.g., "the glass high rise on the left having pink tinted glass").

(10.2) Advertising may be directed to an MS 140 according to its location. In at least some studies it appears that MS 140 users do not respond well to unsolicited wireless advertisement whether location based or otherwise. However, in response to certain user queries for locally available merchandise, certain advertisements may be viewed in a more friendly light. Thus, by allowing an MS user to contact, e.g., a wireless advertising portal by voice or via wireless Internet, and describe certain merchandise desired (e.g., via interacting with an automated speech interaction unit) the user may be able to describe and receive (at his/her MS 140) visual displays of merchandise that may satisfy such a user's request. For example, an MS user may provide a spoken request such as: "I need a shirt, who has specials near here?".

(10.3) Applications that combine routing with safety for assisting MS users with requests such as "How do I get back to the hotel safely?";

(10.4) Applications that combine routing with sight seeing guided tour where routing is interactive and depending on feedback from users regarding, e.g., user interests;

(10.5) Applications using Internet picture capture with real time voice capture and MS location (e.g., sightseeing, security, and law enforcement), (10.6) Intelligent transportation (e.g., voice commanded vehicles)

(10.7) Applications that monitor whether or not a person or object (e.g., a vehicle) is within a predetermined boundary. Note, that such an application may automatically provide speech output to the MS user (or other authorized user) when the person or object is beyond the predetermined boundary;

(10.8) Applications that route to an event and automatically determine parking availability and where to park;

(10.9) Traffic/weather condition routing

Further note that various architectures for the location center/location gateway are within the scope of the invention including a distributed architecture wherein in addition to the FOMs being possibly remotely accessed (e.g., via a communications network such as the Internet), the gateway itself may be distributed throughout one or more communication networks. Thus, a location request received at a first location gateway portion may be routed to a second location gateway portion (e.g., via the Internet). Such a distributed gateway may be considered a "meta-gateway" and in fact such gateway portions may be fully functioning gateways in their own right. Thus, such routing therebetween may be due to contractual arrangements between the two gateways (each fulfilling location requests for a different network, wireless carrier, and/or geographical region). For example, for locating a stolen vehicle, it is not uncommon for the stolen vehicle to be transported rapidly beyond the coverage area of a local or regional wireless vehicle locating service. Moreover, a given location gateway may provide location information for only certain areas corresponding, e.g., to contractual arrangements with the wireless carriers with which the location gateway is affiliated. Thus, a first location gateway may provide vehicle locations for a first collection of one or more wireless networks, and a second location gateway may provide vehicle locations for a second collection of one or more wireless networks. Accordingly, for an MS 140 built into a vehicle which can be detected by one or more wireless networks (or portions thereof) in each of the first and second collections, then if the vehicle is stolen, the first gateway may be initially contacted for determining whether the vehicle can be located via communications with the first collection of one or more wireless networks, and if the vehicle can not be located, the first gateway may provide a location request to the second gateway for thereby locating the stolen vehicle via wireless communications with one or more wireless networks of the second collection. Furthermore, the first gateway may provide location requests for the stolen vehicle to other location gateways.

The present invention provides the following additional components:

(11.1) one or more mobile base stations 148 (MBS) which are optional, for physically traveling toward the target MS 140 or tracking the target MS;

(11.2) a plurality of location base stations 152 (LBS) which are optional, distributed within the radio coverage areas 120, each LBS 152 having a relatively small MS 140 detection area 154. Note that such LBSs 152 may also support Internet and/or TCP/IP transmissions for transmitting visual location related information (e.g., graphical, or pictorial) related to an MS location request.

Since location base stations 152 can be located on, e.g., each floor of a multi-story building, the wireless location technology described herein can be used to perform location in terms of height as well as by latitude and longitude.

In operation, an MS 140 may utilize one or more of the wireless technologies, CDMA, TDMA, AMPS, NAMPS or GSM for wireless communication with: (a) one or more infrastructure base stations 122, (b) mobile base station(s) 148, or (c) an LBS 152. Additionally, note that in some embodiments of the invention, there may be MS to MS communication.

Referring to FIG. 4 again, additional detail is provided of typical base station coverage areas, sectorization, and high level components within a radio coverage area 120, including the MSC 112. Three exemplary base stations (BSs) are 122A, 122B and 122C, each of which radiate referencing signals within their area of coverage 169 to facilitate mobile station (MS) 140 radio frequency connectivity, and various timing and synchronization functions. Note that some base stations may contain no sectors 130 (e.g. 122E), thus radiating and receiving signals in a 360 degree omnidirectional coverage area pattern, or the base station may contain "smart antennas" which have specialized coverage area patterns. However, the generally most frequent base stations 122 have three sector 130 coverage area patterns. For example, base station 122A includes sectors 130, additionally labeled a, b and c. Accordingly, each of the sectors 130 radiate and receive signals in an approximate 120 degree arc, from an overhead view. As one skilled in the art will understand, actual base station coverage areas 169 (stylistically represented by hexagons about the base stations 122) generally are designed to overlap to some extent, thus ensuring seamless coverage in a geographical area. Control electronics within each base station 122 are used to communicate with a mobile stations 140. Information regarding the coverage area for each sector 130, such as its range, area, and "holes" or areas of no coverage (within the radio coverage area 120), may be known and used by the location center 142 to facilitate location determination. Further, during communication with a mobile station 140, the identification of each base station 122 communicating with the MS 140 as well, as any sector identification information, may be known and provided to the location center 142.

In the case of the base station types 122, 148, and 152 communicating location information, a base station or mobility controller 174 (BSC) controls, processes and provides an interface between originating and terminating telephone calls from/to mobile station (MS) 140, and the mobile switch center (MSC) 112. The MSC 122, on-the-other-hand, performs various administration functions such as mobile station 140 registration, authentication and the relaying of various system parameters, as one skilled in the art will understand.

The base stations 122 may be coupled by various transport facilities 176 such as leased lines, frame relay, T-Carrier links, optical fiber links or by microwave communication links.

When an MS 140 is powered on and in the idle state, it constantly monitors the pilot signal transmissions from each of the base stations 122 located at nearby cell sites. Since base station/sector coverage areas may often overlap, such overlapping enables an MS 140 to detect, and, in the case of certain wireless technologies, communicate simultaneously along both the forward and reverse paths, with multiple base stations 122 and/or sectors 130. In FIG. 4, the constantly radiating pilot signals from base station sectors 130, such as sectors a, b and c of BS 122A, are detectable by MSs 140 within the coverage area 169 for BS 122A. That is, the mobile stations 140 scan for pilot channels, corresponding to a given base station/sector identifiers (IDs), for determining in which coverage area 169 (i.e., cell) it is contained. This is performed by comparing signal strengths of pilot signals transmitted from these particular cell-sites.

The mobile station 140 then initiates a registration request with the MSC 112, via the base station controller 174. The MSC 112 determines whether or not the mobile station 140 is allowed to proceed with the registration process (except, e.g., in the case of a 911 call, wherein no registration process is required). Once any required registration is complete, calls may be originated from the mobile station 140 or calls or short message service messages can be received from the network. Note that the MSC 112 communicates as appropriate, with a class 4/5 wireline telephony circuit switch or other central offices, connected to the PSTN 124 network. Such central offices connect to wireline terminals, such as telephones, or any communication device compatible with a wireline. The PSTN 124 may also provide connections to long distance networks and other networks.

The MSC 112 may also utilize IS/41 data circuits or trunks connecting to signal transfer point 110, which in turn connects to a service control point 104, via Signaling System #7 (SS7) signaling links (e.g., trunks) for intelligent call processing, as one skilled in the art will understand. In the case of wireless AIN services such links are used for call routing instructions of calls interacting with the MSC 112 or any switch capable of providing service switching point functions, and the public switched telephone network (PSTN) 124, with possible termination back to the wireless network.

Referring still to FIG. 4, the location center/gateway (LC) 142 interfaces with the MSC 112 either via dedicated transport facilities 178, using, e.g., any number of LAN/WAN technologies, such as Ethernet, fast Ethernet, frame relay, virtual private networks, etc., or via the PSTN 124. The gateway 142 may receive autonomous (e.g., unsolicited) command/response messages regarding, for example: (a) the state of the wireless network of each commercial radio service provider utilizing the LC 142 for wireless location services, (b) MS 140 and BS 122 radio frequency (RF) measurements, (c) communications with any MBSs 148, and (d) location applications requesting MS locations using the location center/gateway 142. Conversely, the LC 142 may provide data and control information to each of the above components in (a)-(d). Additionally, the LC 142 may provide location information to an MS 140, via a BS 122. Moreover, in the case of the use of a mobile base station (MBS) 148, several communications paths may exist with the LC 142.

The MBS 148 may act as a low cost, partially-functional, moving base station, and is, in one embodiment, situated in a vehicle (e.g., land, water or aircraft) where an operator may engage in MS 140 searching and tracking activities. In providing these activities using CDMA, the MBS 148 provides a forward link pilot channel for a target MS 140, and subsequently receives unique BS pilot strength measurements from the MS 140. The MBS 148 also includes a mobile station 140 for data communication with the gateway 142, via a BS 122. In particular, such data communication includes telemetering at least the geographic position (or estimates thereof) of the MBS 148, various RF measurements related to signals received from the target MS 140, and in some embodiments, MBS 148 estimates of the location of the target MS 140. In some embodiments, the MBS 148 may utilize multiple-beam fixed antenna array elements and/or a moveable narrow beam antenna, such as a microwave dish 182. The antennas for such embodiments may have a known orientation in order to further deduce a radio location of the target MS 140 with respect to an estimated current location of the MBS 148. As will be described in more detail herein below, the MBS 148 may further contain a satellite (e.g., global positioning system (GPS)) receiver (or other receiver for non-terrestrial wireless signals) for determining the location of the MBS 148 and/or providing wireless location assistance a target MS 140, e.g., providing GPS information to the MS to assist the MS in determining its location. Additionally, the MBS 148 may include distance sensors, dead-reckoning electronics, as well as an on-board computing system and display devices for locating both the MBS 148 itself as well as tracking and locating the target MS 140. The computing and display provides a means for communicating the position of the target MS 140 on a map display to an operator of the MBS 148. It is important to note that in one embodiment, an MBS 148 may determine its location substantially independent of the communications network(s) with which the MBS communicates.

Each location base station (LBS) 152 is a low cost location device. In some embodiments, to provide such LBS's cost effectively, each LBS 152 only partially or minimally supports the air-interface standards of the one or more wireless technologies used in communicating with both the BSs 122 and the MSs 140. Each LBS 152, when put in service, is placed at a fixed location, such as at a traffic signal, lamp post, etc., wherein the location of the LBS may be determined as accurately as, for example, the accuracy of the locations of the infrastructure BSs 122. Assuming the wireless technology, CDMA, is used, each BS 122 uses a time offset of the pilot PN sequence to identify a forward CDMA pilot channel. In one embodiment, each LBS 152 emits a unique, time-offset pilot PN sequence channel in accordance with the CDMA standard in the RF spectrum designated for BSs 122, such that the channel does not interfere with neighboring BSs 122 cell site channels, and does not interfere with neighboring LBSs 152. Each LBS 152 may also contain multiple wireless receivers in order to monitor transmissions from a target MS 140. Additionally, each LBS 152 contains mobile station 140 electronics, thereby allowing the LBS to both be controlled by, e.g., the gateway 142 or the wireless carrier(s) for the LBS, and to transmit information to, e.g., the gateway 142 (via, e.g., at least one neighboring BS 122), or to another wireless location service provider such as one providing one or more FOMs.

As mentioned above, when the location of a particular target MS 140 is desired, the gateway 142 may request location information about the target MS 140 from, for instance, one or more activated LBSs 152 in a geographical area of interest. Accordingly, whenever the target MS 140 is in an LBS coverage area, or is suspected of being in the coverage area, either upon command from the gateway 142 (or other location service provider), or in a substantially continuous (or periodic) fashion, the LBS's pilot channel appears to the target MS 140 as a potential neighboring base station channel, and consequently, is placed, for example, in the CDMA neighboring set, or the CDMA remaining set of the target MS 140 (as one familiar with the CDMA standards will understand).

During the normal CDMA pilot search sequence of the mobile station initialization state (in the target MS), the target MS 140 will, if within range of such an activated LBS 152, detect the LBS pilot presence during the CDMA pilot channel acquisition substate. Consequently, the target MS 140 performs RF measurements on the signal from each detected LBS 152. Similarly, an activated LBS 152 can perform RF measurements on the wireless signals from the target MS 140. Accordingly, each LBS 152 detecting the target MS 140 may subsequently telemeter back to the LC 142 measurement results related to signals from/to the target MS 140. Moreover, upon command, the target MS 140 may telemeter back to the gateway 142 its own measurements of the detected LBSs 152, and consequently, this new location information, in conjunction with location related information received from the BSs 122, can be used to locate the target MS 140.

It should be noted that an LBS 152 will normally deny hand-off requests, since typically the LBS does not require the added complexity of handling voice or traffic bearer channels, although economics and peak traffic load conditions may dictate preference here. Note that GPS timing information, needed by any CDMA base station, is either achieved via a the inclusion of a local GPS receiver or via a telemetry process from a neighboring conventional BS 122, which contains a GPS receiver and timing information. Since energy requirements are minimal in such an LBS 152, (rechargeable) batteries or solar cells may be used to power the LBSs. Further, no expensive terrestrial transport link is typically required since two-way communication is provided by an included MS 140 (or an electronic variation thereof) within each LBS. Thus, LBSs 152 may be placed in numerous locations, such as:

(a) in dense urban canyon areas (e.g., where signal reception may be poor and/or very noisy);
(b) in remote areas (e.g., hiking, camping and skiing areas);
(c) along highways (e.g., for emergency as well as monitoring traffic flow), and their rest stations; or
(d) in general, wherever more location precision is required than is obtainable using other wireless infrastructure network components.

Location Center—Network Elements API Description

A location application programming interface 136 (FIG. 4), denoted L-API, is may be provided between the location center/gateway 142 (LC) and the mobile switch center (MSC)

network element type, in order to send and receive various control, signals and data messages. The L-API may be implemented using a preferably high-capacity physical layer communications interface, such as IEEE standard 802.3 (10 base T Ethernet), although other physical layer interfaces could be used, such as fiber optic ATM, frame relay, etc. At least two forms of L-API implementation are possible. In a first case, the signal control and data messages are provided using the MSC 112 vendor's native operations messages inherent in the product offering, without any special modifications. In a second case, the L-API includes a full suite of commands and messaging content specifically optimized for wireless location purposes, which may require some, although minor development on the part of an MSC vendor.

Signal Processor Description

Figure 17:
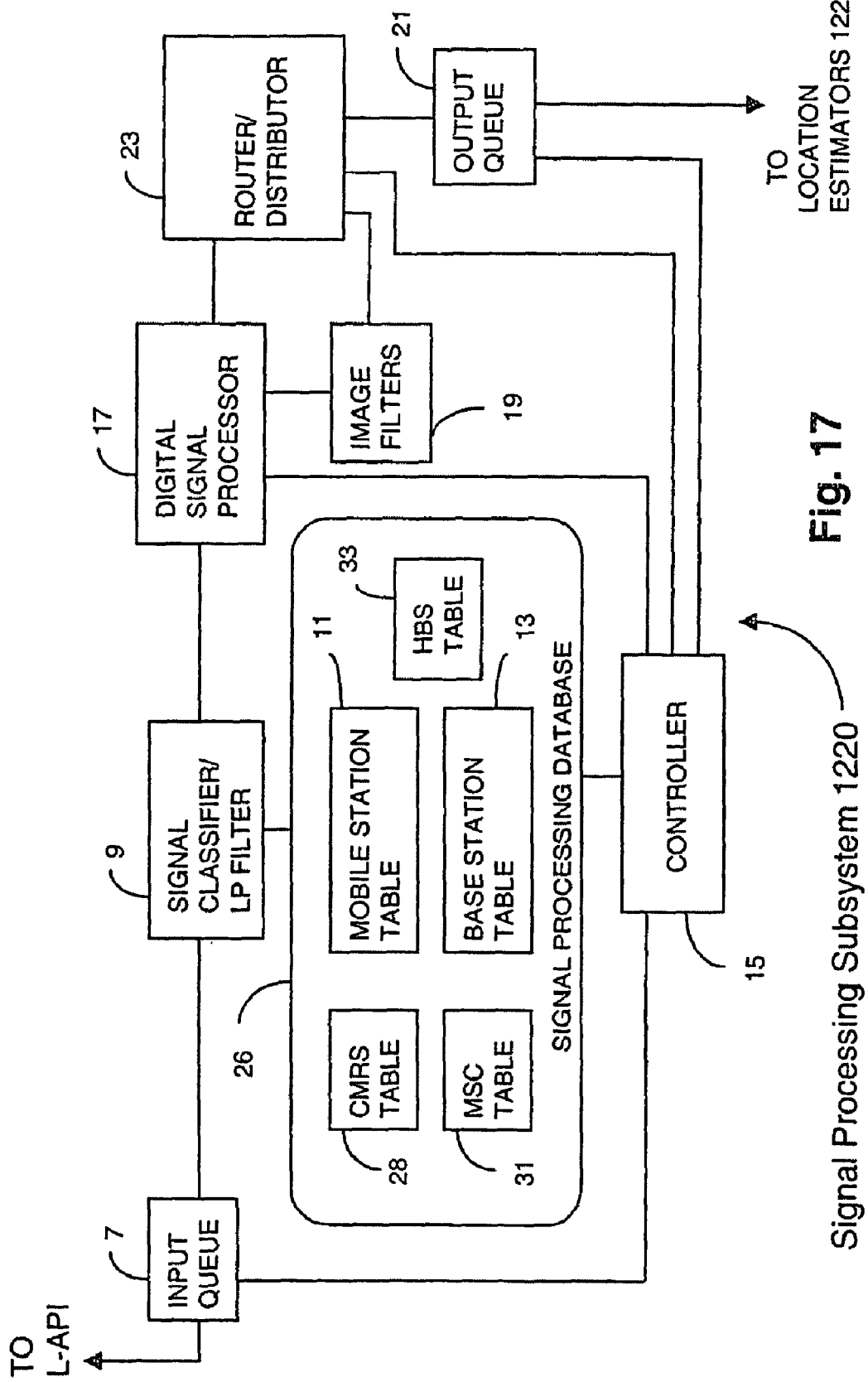
FIG. 17 illustrates the primary components of the signal processing subsystem.

Referring to FIG. 17, a signal processing subsystem (labeled 1220 in other figures) may be provided (or accessed) by the gateway 142. Such a signal processing subsystem may: (a) receive control messages and signal measurements from one or more wireless service provider networks, and (b) transmit appropriate control messages to such wireless networks via the location applications programming interface 136 referenced earlier, for wireless location purposes. The signal processing subsystem 1220 additionally provides various signal identification, conditioning and pre-processing functions, including buffering, signal type classification, signal filtering, message control and routing functions to the location estimating modules or FOMs.

Figure 1:
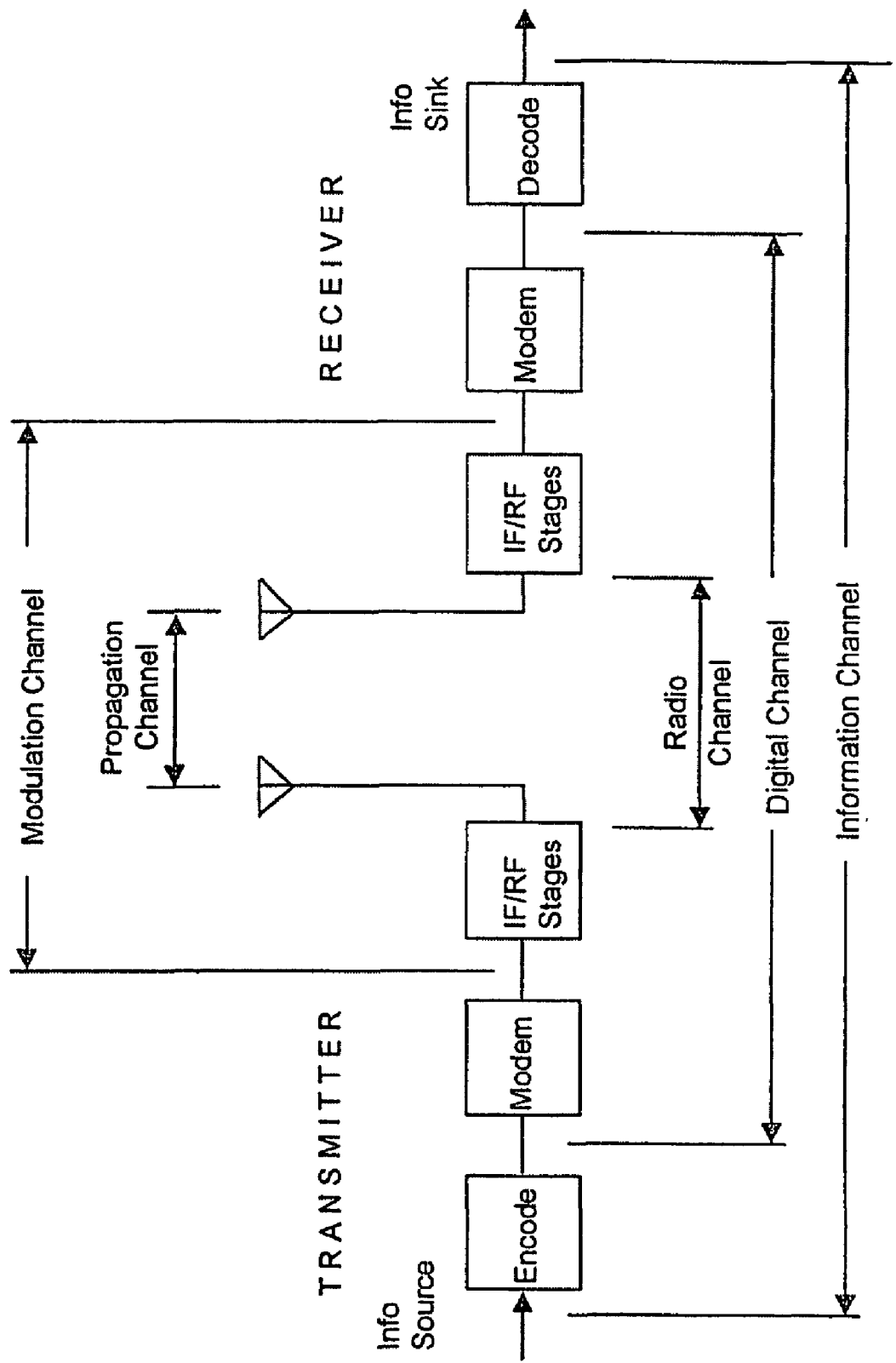
FIG. 1 illustrates various perspectives of radio propagation opportunities which may be considered in addressing correlation with mobile to base station ranging.

There can be several combinations of Delay Spread/Signal Strength sets of measurements made available to the signal processing subsystem 1220. In some cases a mobile station 140 (FIG. 1) may be able to detect up to three or four pilot channels representing three to four base stations, or as few as one pilot channel, depending upon the environment and wireless network configuration. Similarly, possibly more than one BS 122 can detect a mobile station 140 transmitter signal, and the fact that multiple CMRS' base station equipment commonly will overlap coverage areas.

For each mobile station 140 or BS 122 transmitted signal that is detected by a receiver group at a base or mobile station, respectively, multiple delayed signals, or "fingers" may be detected (e.g., in CDMA) and tracked resulting from multipath radio propagation conditions from a given transmitter. In typical spread spectrum diversity CDMA receiver design, the "first" finger represents the most direct, or least delayed multipath signal. Second or possibly third or fourth fingers may also be detected and tracked, assuming the detecting base station and/or mobile station 140 contains a sufficient number of data receivers for doing so. The signal processing subsystem may utilize various wireless signal measurements of transmissions between a target mobile station 140 and a network of base stations 122, 152 and/or 148. Such measurements can be important in effectively estimating the location of mobile stations 140 in that it is well known that measurements of wireless signal propagation characteristics, such as signal strength (e.g., RSSI), time delay, angle of arrival, and any number other measurements, can individually lead to gross errors in MS 140 location estimates.

Accordingly, one aspect of the present invention is directed to utilizing a larger number of wireless signal measurements, and utilizing a plurality of MS 140 estimation techniques to compensate for location estimation errors generated by some such techniques. For example, due to the large capital outlay costs associated with providing three or more overlapping base station coverage signals in every possible location, most practical digital PCS deployments result in fewer than three base station pilot channels being reportable in the majority of location areas, thus resulting in a larger, more amorphous location estimates by terrestrial triangulation systems. Thus, by utilizing wireless signal measurements from a variety of sources substantially simultaneously and/or "greedily" (i.e., use whatever signal measurements can be obtained from any of the signal sources as they are obtained), additional location enhancements can be obtained. For example, by enhancing a mobile station 140 with electronics for detecting satellite transmissions (as done with mobile base stations 148 and which also can be viewed as such an enhanced mobile station 140) additional location related signals maybe obtained from:
 (a) the GPS satellite system,
 (b) the Global Navigation Satellite System (GLONASS) satellite system, a Russian counterpart to the U.S. GPS system, and/or
 (c) the numerous low earth orbit satellite systems (LEOs) and medium earth orbit satellite systems (MEOs) such as the IRIDIUM system being developed by Motorola Corp., the GLOBALSTAR system by Loral and Qualcomm, and the ICO satellite system by ICO Global Communications.

Thus, by combining even insufficient wireless location measurements from different wireless communication systems, accurate location of an MS 140 is possible. For example, by if only two GPS satellites are detectable, but there is an additional reliable wireless signal measurement from, e.g., a terrestrial base station 122, then by triangulating using wireless signal measurements derived from transmissions from each of these three sources, a potentially reliable and accurate MS location can be obtained.

Moreover, the transmissions from the MS 140 used for determining the MS's location need not be transmitted to terrestrial base stations (e.g., 122). It is within the scope of the present invention that a target MS 140 may transmit location related information to satellites as well. For example, if a target MS 140 detects two GPS satellite transmissions and is able to subsequently transmit the GPS signal measurements (e.g., timing measurements) to an additional satellite capable of determining additional MS location measurements according to the signals received, then by performing a triangulation process at the location center/gateway 142 (which may be co-located with the additional satellite, or at a remote terrestrial site), a potentially reliable and accurate MS location can be obtained. Accordingly, the present invention is capable of resolving wireless location ambiguities due to a lack of location related information of one type by utilizing supplemental location related information of a different type. Note that by "type" as used here it is intended to be interpreted broadly as, e.g.,
 (a) a data type of location information, and/or
 (b) communications from a particular commercial wireless system as opposed to an alternative system, each such system having distinct groups of known or registered MS users.

Moreover, it can be that different FOMs are provided for at least some wireless location computational models utilizing different types of location related information. For example, in certain contexts wireless networks based on different wireless signaling technologies may be used to locate an MS 140 during the time period of a single emergency call such as E911. Moreover, in other contexts it may be possible for the target MS 140 to use one or more of a plurality of wireless communication networks, possibly based on different wireless communication technologies, depending on availability the of technology in the coverage area. In particular, since so called "dual mode" or "tri-mode" mobile stations 140 are available, wherein such mobile stations are capable of wireless communication in a plurality of wireless communication technologies, such as digital (e.g., CDMA, and/or TDMA) as well as analog or AMP/NAMPS, such mobile stations may utilize a first (likely a default) wireless communication technology whenever possible, but switch to another wireless communication technology when, e.g., coverage of the first wireless technology becomes poor. Moreover, such different technologies are typically provided by different wireless networks (wherein the term "network" is understood to include a network of communication supporting nodes geographically spaced apart that provide a communications infrastructure having access to information regarding subscribers to the network prior to a request to access the network by the subscribers). Accordingly, the present invention may include (or access) FOMs for providing mobile station location estimates wherein the target MS 140 communicates with various networks using different wireless communication technologies. Moreover, such FOMs may be activated according to the wireless signal measurements received from various wireless networks and/or wireless technologies supported by a target MS 140 and to which there is a capability of communicating measurements of such varied wireless signals to the FOM(s). Thus, in one embodiment of the present invention, there may be a triangulation (or trilateration) based FOM for each of CDMA, TDMA and AMP/NAMPS which may be singly, serially, or concurrently used for obtaining a particular location of an MS 140 at a particular time (e.g., for an E911 call). Thus, when locating a target MS 140, the MS may, if there is overlapping coverage of two wireless communication technologies and the MS supports communications with both, repeatedly switch back and forth between the two thereby providing additional wireless signal measurements for use in locating the target MS 140.

In one embodiment of the present invention, wherein multiple FOMs may be activated substantially simultaneously (or alternatively, wherever appropriate input is received that allow particular FOMs to be activated). Note that at least some of the FOMs may provide "inverse" estimates of where a target MS 140 is not instead of where it is. Such inverse analysis can be very useful in combination with location estimates indicating where the target MS is in that the accuracy of a resulting MS location estimate may be substantially decreased in size when such inverse estimates are utilized to rule out areas that otherwise appear to be likely possibilities for containing the target MS 140. Note that one embodiment of a FOM that can provide such reverse analysis is a location computational model that generates target MS location estimates based on archived knowledge of base station coverage areas (such an archive being the result of, e.g., the compilation a RF coverage database—either via RF coverage area simulations or field tests). In particular, such a model may provide target MS location inverse estimates having a high confidence or likelihood that that the target MS 140 is not in an area since either a base station 122 (or 152) can not detect the target MS 140, or the target MS can not detect a particular base station. Accordingly, the confidences or likelihoods on such estimates may be used by diminishing a likelihood that the target MS is in an area for the estimate, or alternatively the confidence or likelihood of all areas of interest outside of the estimate can increased.

Note that in some embodiments of the present invention, both measurements of forward wireless signals to a target MS 140, and measurements of reverse wireless signals transmitted from the target MS to a base station can be utilized by various FOMs. In some embodiments, the received relative signal strength ($RRSS_{BS}$) of detected nearby base station transmitter signals along the forward link to the target mobile station can be more readily used by the location estimate modules (FOMs) since the transmission power of the base stations 122 typically changes little during a communication with a mobile station. However, the relative signal strength ($RRSS_{MS}$) of target mobile station transmissions received by the base stations on the reverse link may require more adjustment prior to location estimate model use, since the mobile station transmitter power level changes nearly continuously.

Location Center High Level Functionality

At a very high level the location center/gateway 142 computes (or requests computation of) location estimates for a wireless mobile station 140 by performing at least some of the following steps:

(23.0) receiving an MS location request;

(23.1) receiving measurements of signal transmission characteristics of communications communicated between the target MS 140 and one or more wireless infrastructure base stations 122. Note, this step may only be performed if the gateway provides such measurements to a FOM (e.g., a FOM co-located therewith);

(23.2) filtering the received signal transmission characteristics (by a signal processing subsystem 1220 illustrated in, e.g., FIGS. 5 and 30) as needed so that target MS location data can be generated that is uniform and consistent with location data generated from other target MSs 140. In particular, such uniformity and consistency is both in terms of data structures and interpretation of signal characteristic values provided by the MS location data, as will be described hereinbelow. Note, this step may also only be performed if the gateway provides such measurements to a FOM. Otherwise, such FOM is likely to perform such filtering;

(23.3) inputting the generated target MS location data to one or more MS location estimating models (FOMs, labeled collectively as 1224 in FIG. 5), so that each such FOM may use the input target MS location data for generating a "location hypothesis" providing an estimate of the location of the target MS 140. Note, this step may also only be performed if the gateway provides such measurements to a FOM;

(23.4) receiving the resulting location hypotheses from the activated FOMs, and providing the generated location hypotheses to an hypothesis evaluation module (denoted the hypothesis evaluator 1228 in FIG. 5) for:

(a) (optionally) adjusting the target MS location estimates of the generated location hypotheses and/or adjusting confidence values of the location hypotheses, wherein for each location hypothesis, its confidence value indicates the confidence or likelihood that the target MS is located in the location estimate of the location hypothesis. Moreover, note that such adjusting uses archival information related to the accuracy and/or reliability of previously generated location hypotheses;

(b) (optionally) evaluating the location hypotheses according to various heuristics related to, for example, the radio coverage area 120 terrain, the laws of physics, characteristics of likely movement of the target MS 140; and (c) (necessarily) determining a most likely location area for the target MS 140, wherein the measurement of confidence associated with each input MS location area estimate may be used for determining a "most likely location area"; and (23.5) outputting a most likely target MS location estimate to one or more applications 146 (FIG. 5) requesting an estimate of the location of the target MS 140.

Location Hypothesis Data Representation

In order to describe how the steps (23.1) through (23.5) are performed in the sections below, some introductory remarks related to the data denoted above as location hypotheses will be helpful. Additionally, it will also be helpful to provide introductory remarks related to historical location data and the data base management programs associated therewith.

For each target MS location estimate generated and utilized by the present invention, the location estimate is provided in a data structure (or object class) denoted as a "location hypothesis" (illustrated in Table LH-1). Brief descriptions of the data fields for a location hypothesis is provided in the Table LH-1.

TABLE LH-1

| | |
|---|---|
| FOM_ID | First order model ID (providing this Location Hypothesis); note, since it is possible for location hypotheses to be generated by other than the FOMs 1224, in general, this field identifies the module that generated this location hypothesis. |
| MS_ID | The identification of the target MS 140 to this location hypothesis applies. |
| pt_est | The most likely location point estimate of the target MS 140. |
| valid_pt | Boolean indicating the validity of "pt_est". |
| area_est | Location Area Estimate of the target MS 140 provided by the FOM. This area estimate will be used whenever "image_area" below is NULL. |
| valid_area | Boolean indicating the validity of "area_est" (one of "pt_est" and "area_est" must be valid). |
| adjust | Boolean (true if adjustments to the fields of this location hypothesis are to be performed in the Context adjuster Module). |
| pt_covering | Reference to a substantially minimal area (e.g., mesh cell) covering of "pt_est". Note, since this MS 140 may be substantially on a cell boundary, this covering may, in some cases, include more than one cell. |
| image_area | Reference to a substantially minimal area (e.g., mesh cell) covering of "pt_covering" (see detailed description of the function, "confidence_adjuster"). Note that if this field is not NULL, then this is the target MS location estimate used by the location center 142 instead of "area_est". |
| extrapolation_area | Reference to (if non-NULL) an extrapolated MS target estimate area provided by the location extrapolator submodule 1432 of the hypothesis analyzer 1332. That is, this field, if non-NULL, is an extrapolation of the "image_area" field if it exists, otherwise this field is an extrapolation of the "area_est" field. Note other extrapolation fields may also be provided depending on the embodiment of the present invention, such as an extrapolation of the "pt_covering". |
| confidence | In one embodiment, this is a probability indicating a likelihood that the target MS 140 is in (or out) of a particular area. If "image_area" exists, then this is a measure of the likelihood that the target MS 140 is within the area represented by "image_area", or if "image_area" has not been computed (e.g., "adjust" is FALSE), then "area_est" must be valid and this is a measure of the likelihood that the target MS 140 is within the area represented by "area_est". Other embodiments, are also within the scope of the present invention that are not probabilities; e.g., translations and/or expansions of the [0, 1] probability range as one skilled in the art will understand. |
| Original_Timestamp | Date and time that the location signature cluster (defined hereinbelow) for this location hypothesis was received by the signal processing subsystem 1220. |
| Active_Timestamp | Run-time field providing the time to which this location hypothesis has had its MS location estimate(s) extrapolated (in the location extrapolator 1432 of the hypothesis analyzer 1332). Note that this field is initialized with the value from the "Original_Timestamp" field. |
| Processing Tags and environmental categorizations | For indicating particular types of environmental classifications not readily determined by the "Original_Timestamp" field (e.g., weather, traffic), and restrictions on location hypothesis processing. |
| loc_sig_cluster | Provides access to the collection of location signature signal characteristics derived from communications between the target MS 140 and the base station(s) detected by this MS (discussed in detail hereinbelow); in particular, the location data accessed here is provided to the first order models by the signal processing subsystem 1220; i.e., access to the "loc sigs" (received at "timestamp" regarding the location of the target MS) |
| descriptor | Original descriptor (from the First order model indicating why/how the Location Area Estimate and Confidence Value were determined). |

As can be seen in the Table LH-1, each location hypothesis data structure includes at least one measurement, denoted hereinafter as a confidence value (or simply confidence), that is a measurement of the perceived likelihood that an MS location estimate in the location hypothesis is an accurate location estimate of the target MS 140. Since, in some embodiments of the invention, such confidence values are an important aspect, much of the description and use of such confidence values are described below; however, a brief description is provided here.

In one embodiment, each confidence value is a probability indicative of a likeliness that the target MS 140 resides within an geographic area represented by the hypothesis to which the confidence value applies. Accordingly, each such confidence value is in the range [0, 1]. Moreover, for clarity of discussion, it is assumed that unless stated otherwise that the probabilistic definition provided here is to be used when confidence values are discussed.

Note, however, other definitions of confidence values are within the scope of the present invention that may be more general than probabilities, and/or that have different ranges other than [0, 1]. For example, one such alternative is that each such confidence value is in the range −1.0 to 1.0, wherein the larger the value, the greater the perceived likelihood that the target MS 140 is in (or at) a corresponding MS location estimate of the location hypothesis to which the confidence value applies. As an aside, note that a location hypothesis may have more than one MS location estimate (as will be discussed in detail below) and the confidence value will typically only correspond or apply to one of the MS location estimates in the location hypothesis. Further, values for the confidence value field may be interpreted as: (a) −1.0 means that the target MS 140 is NOT in such a corresponding MS area estimate of the location hypothesis area, (b) 0 means that it is unknown as to the likelihood of whether the MS 140 in the corresponding MS area estimate, and (c)+1.0 means that the MS 140 is perceived to positively be in the corresponding MS area estimate.

Additionally, in utilizing location hypotheses in, for example, the location evaluator 1228 as in (23.4) above, it is important to keep in mind that for confidences, $cf_1$ and $cf_2$, if $cf_1 \leq cf_2$, then for a location hypotheses $H_1$ and $H_2$ having $cf_1$ and $cf_2$, respectively, the target MS 140 is expected to more likely reside in a target MS estimate of $H_2$ than a target MS estimate of $H_1$. Moreover, if an area, A, is such that it is included in a plurality of location hypothesis target MS estimates, then a confidence score, $CS_A$, can be assigned to A, wherein the confidence score for such an area is a function of the confidences for all the location hypotheses whose (most pertinent) target MS location estimates contain A. That is, in order to determine a most likely target MS location area estimate for outputting from the location center/gateway 142, a confidence score is determined for areas within the location center/gateway service area.

Coverage Area: Area Types and their Determination

The notion of "area type" as related to wireless signal transmission characteristics has been used in many investigations of radio signal transmission characteristics. Some investigators, when investigating such signal characteristics of areas have used somewhat naive area classifications such as urban, suburban, rural, etc. However, it is desirable for the purposes of the present invention to have a more operational definition of area types that is more closely associated with wireless signal transmission behaviors.

To describe embodiments of the an area type scheme that may be used in the present invention, some introductory remarks are first provided. Note that the wireless signal transmission behavior for an area depends on at least the following criteria:

(23.8.1) substantially invariant terrain characteristics (both natural and man-made) of the area; e.g., mountains, buildings, lakes, highways, bridges, building density;

(23.8.2) time varying environmental characteristics (both natural and man-made) of the area; e.g., foliage, traffic, weather, special events such as baseball games;

(23.8.3) wireless communication components or infrastructure in the area; e.g., the arrangement and signal communication characteristics of the base stations 122 in the area (e.g., base station antenna downtilt). Further, the antenna characteristics at the base stations 122 may be important criteria.

Accordingly, a description of wireless signal characteristics for determining area types could potentially include a characterization of wireless signaling attributes as they relate to each of the above criteria. Thus, an area type might be: hilly, treed, suburban, having no buildings above 50 feet, with base stations spaced apart by two miles. However, a categorization of area types is desired that is both more closely tied to the wireless signaling characteristics of the area, and is capable of being computed substantially automatically and repeatedly over time. Moreover, for a wireless location system, the primary wireless signaling characteristics for categorizing areas into at least minimally similar area types are: thermal noise and, more importantly, multipath characteristics (e.g., multipath fade and time delay).

Focusing for the moment on the multipath characteristics, it is believed that (23.8.1) and (23.8.3) immediately above are, in general, more important criteria for accurately locating an MS 140 than (23.8.2). That is, regarding (23.8.1), multipath tends to increase as the density of nearby vertical area changes increases. For example, multipath is particularly problematic where there is a high density of high rise buildings and/or where there are closely spaced geographic undulations. In both cases, the amount of change in vertical area per unit of area in a horizontal plane (for some horizontal reference plane) may be high. Regarding (23.8.3), the greater the density of base stations 122, the less problematic multipath may become in locating an MS 140. Moreover, the arrangement of the base stations 122 in the radio coverage area 120 in FIG. 4 may affect the amount and severity of multipath.

Accordingly, it would be desirable to have a method and system for straightforwardly determining area type classifications related to multipath, and in particular, multipath due to (23.8.1) and (23.8.3). The present invention provides such a determination by utilizing a novel notion of area type, hereinafter denoted "transmission area type" (or, "area type" when both a generic area type classification scheme and the transmission area type discussed hereinafter are intended) for classifying "similar" areas, wherein each transmission area type class or category is intended to describe an area having at least minimally similar wireless signal transmission characteristics. That is, the novel transmission area type scheme of the present invention is based on: (a) the terrain area classifications; e.g., the terrain of an area surrounding a target MS 140, (b) the configuration of base stations 122 in the radio coverage area 120, and (c) characterizations of the wireless signal transmission paths between a target MS 140 location and the base stations 122.

In one embodiment of a method and system for determining such (transmission) area type approximations, a partition (denoted hereinafter as $P_0$) is imposed upon the radio coverage area 120 for partitioning for radio coverage area into subareas, wherein each subarea is an estimate of an area having included MS 140 locations that are likely to have is at least a minimal amount of similarity in their wireless signaling characteristics. To obtain the partition $P_0$ of the radio coverage area 120, the following steps are performed:

(23.8.4.1) Partition the radio coverage area 120 into subareas, wherein in each subarea is: (a) connected, (b) the subarea is not too oblong, e.g., the variations in the lengths of chords sectioning the subarea through the centroid of the subarea are below a predetermined threshold, (c) the size of the subarea is below a predetermined value, and (d) for most locations (e.g., within a first or second deviation) within the subarea whose wireless signaling characteristics have been verified, it is likely (e.g., within a first or second deviation) that an MS 140 at one of these locations will detect (forward transmission path) and/or will be detected (reverse transmission path) by a same collection of base stations 122. For example, in a CDMA context, a first such collection may be (for the forward transmission path) the active set of base stations 122, or, the union of the active and candidate sets, or, the union of the active, candidate and/or remaining sets of base stations 122 detected by "most" MSs 140 in. Additionally (or alternatively), a second such collection may be the base stations 122 that are expected to detect MSs 140 at locations within the subarea. Of course, the union or intersection of the first and second collections is also within the scope of the present invention for partitioning the radio coverage area 120 according to (d) above. It is worth noting that it is believed that base station 122 power levels will be substantially constant. However, even if this is not the case, one or more collections for (d) above may be determined empirically and/or by computationally simulating the power output of each base station 122 at a predetermined level. Moreover, it is also worth mentioning that this step is relatively straightforward to implement using the data stored in the location signature data base 1320 (i.e., the verified location signature clusters discussed in detail hereinbelow). Denote the resulting partition here as $P_1$.

(23.8.4.2) Partition the radio coverage area 120 into subareas, wherein each subarea appears to have substantially homogeneous terrain characteristics. Note, this may be performed periodically substantially automatically by scanning radio coverage area images obtained from aerial or satellite imaging. For example, EarthWatch Inc. of Longmont, CO can provide geographic with 3 meter resolution from satellite imaging data. Denote the resulting partition here as $P_2$.

(23.8.4.3) Overlay both of the above partitions, $P_1$ and $P_2$ of the radio coverage area 120 to obtain new subareas that are intersections of the subareas from each of the above partitions. This new partition is $P_0$ (i.e., $P_0=P_1$ intersect $P_2$), and the subareas of it are denoted as "$P_0$ subareas".

Now assuming $P_0$ has been obtained, the subareas of $P_0$ are provided with a first classification or categorization as follows:

(23.8.4.4) Determine an area type categorization scheme for the subareas of $P_1$. For example, a subarea, A, of $P_1$, may be categorized or labeled according to the number of base stations 122 in each of the collections used in (23.8.4.1)(d) above for determining subareas of $P_1$. Thus, in one such categorization scheme, each category may correspond to a single number x (such as 3), wherein for a subarea, A, of this category, there is a group of x (e.g., three) base stations 122 that are expected to be detected by a most target MSs 140 in the area A. Other embodiments are also possible, such as a categorization scheme wherein each category may correspond to a triple: of numbers such as (5, 2, 1), wherein for a subarea A of this category, there is a common group of 5 base stations 122 with two-way signal detection expected with most locations (e.g., within a first or second deviation) within A, there are 2 base stations that are expected to be detected by a target MS 140 in A but these base stations can not detect the target MS, and there is one base station 122 that is expected to be able to detect a target MS in A but not be detected.

(23.8.4.5) Determine an area type categorization scheme for the subareas of $P_2$. Note that the subareas of $P_2$ may be categorized according to their similarities. In one embodiment, such categories may be somewhat similar to the naive area types mentioned above (e.g., dense urban, urban, suburban, rural, mountain, etc.). However, it is also an aspect of the present invention that more precise categorizations may be used, such as a category for all areas having between 20,000 and 30,000 square feet of vertical area change per 11,000 square feet of horizontal area and also having a high traffic volume (such a category likely corresponding to a "moderately dense urban" area type).

(23.8.4.6) Categorize subareas of $P_0$ with a categorization scheme denoted the "$P_0$ categorization," wherein for each $P_0$ subarea, A, a "$P_0$ area type" is determined for A according to the following substep(s):

(a) Categorize A by the two categories from (23.8.4.4) and (23.8.5) with which it is identified. Thus, A is categorized (in a corresponding $P_0$ area type) both according to its terrain and the base station infrastructure configuration in the radio coverage area 120.

(23.8.4.7) For each $P_0$ subarea, A, of $P_0$ perform the following step(s):

(a) Determine a centroid, C(A), for A;

(b) Determine an approximation to a wireless transmission path between C(A) and each base station 122 of a predetermined group of base stations expected to be in (one and/or two-way) signal communication with most target MS 140 locations in A. For example, one such approximation is a straight line between C(A) and each of the base stations 122 in the group. However, other such approximations are within the scope of the present invention, such as, a generally triangular shaped area as the transmission path, wherein a first vertex of this area is at the corresponding base station for the transmission path, and the sides of the generally triangular shaped defining the first vertex have a smallest angle between them that allows A to be completely between these sides.

(c) For each base station 122, $BS_i$, in the group mentioned in (b) above, create an empty list, $BS_i$-list, and put on this list at least the $P_0$ area types for the "significant" $P_0$ subareas crossed by the transmission path between C(A) and $BS_i$. Note that "significant" $P_0$ subareas may be defined as, for example, the $P_0$ subareas through which at least a minimal length of the transmission path traverses. Alternatively, such "significant" $P_0$ subareas may be defined as those $P_0$ subareas that additionally are know or expected to generate substantial multipath.

(d) Assign as the transmission area type for A as the collection of $BS_i$-lists. Thus, any other $P_0$ subarea having the same (or substantially similar) collection of lists of $P_0$ area types will be viewed as having approximately the same radio transmission characteristics.

Note that other transmission signal characteristics may be incorporated into the transmission area types. For example, thermal noise characteristics may be included by providing a third radio coverage area 120 partition, P3, in addition to the partitions of $P_1$ and $P_2$ generated in (23.8.4.1) and (23.8.4.2) respectively. Moreover, the time varying characteristics of (23.8.2) may be incorporated in the transmission area type frame work by generating multiple versions of the transmission area types such that the transmission area type for a given subarea of $P_0$ may change depending on the combination of time varying environmental characteristics to be considered in the transmission area types. For instance, to account for seasonality, four versions of the partitions $P_1$ and $P_2$ may be generated, one for each of the seasons, and subsequently generate a (potentially) different partition $P_0$ for each season. Further, the type and/or characteristics of base station 122 antennas may also be included in an embodiment of the transmission area type.

Other embodiments of area types are also within the scope of the present invention. As mentioned above, each of the first order models 1224 have default confidence values associated therewith, and these confidence values may be probabilities. More precisely, such probability confidence values can be determined as follows. Assume there is a partition of the coverage area into subareas, each subarea being denoted a "partition area." For each partition area, activate each first order model 1224 with historical location data in the Location Signature Data Base 1320 (FIG. 6), wherein the historical location data has been obtained from corresponding known mobile station locations in the partition area. For each first order model, determine a probability of the first order model generating a location hypothesis whose location estimate contains the corresponding known mobile station location. To accomplish this, assume the coverage area is partitioned into partition areas A, wherein each partition area A is specified as the collection of coverage area locations such that for each location, the detected wireless transmissions between the network base stations and a target mobile station at the location can be straightforwardly equated with other locations of area A. For example, one such partition, $P_0$, can be defined wherein each partition area A is specified in terms of three sets of base station identifiers, namely, (a) the base station identifiers of the base stations that can be both detected at each location of A and can detect a target mobile station at each location, (b) the identifiers for base stations that can detect a target mobile station at each location of A, but can not be detected by the target mobile station, and (c) the identifiers for base stations that can be detected by a target mobile station at each location of A, but these base stations can not detect the target mobile station. That is, two locations, $I_1$ and $I_2$. are identified as being in A if and only if the three sets of (a), (b), and (c) for $I_1$ are, respectively, identical to the three sets of (a), (b), and (c) for $I_2$.

Accordingly, assuming the partition $P_0$ is used, a description can be given as to how probabilities may be assigned as the confidence values of location hypotheses generated by the first order models 1224. For each partition area A, a first order model 1224 is supplied with wireless measurements of archived location data in the Location Signature Data Base associated with corresponding verified mobile station locations. Thus, a probability can be determined as to how likely the first order model is to generate a location hypothesis having a location estimate containing the corresponding verified mobile station location. Accordingly, a table of partition area probabilities can be determined for each first order model 1224. Thus, when a location hypothesis is generated and identified as belonging to one of the partition areas, the corresponding probability for that partition area may be assigned as the confidence value for the location hypothesis. The advantages to using actual probabilities here is that, as will be discussed below, the most likelihood estimator 1344 can compute a straightforward probability for each distinct intersection of the multiple location hypotheses generated by the multiple first order models, such that each such probability indicates a likelihood that the target mobile station is in the corresponding intersection.

Location Information Data Bases and Data

Location Data Bases Introduction

It is an aspect of the present invention that MS location processing performed by the location center/gateway 142 should become increasingly better at locating a target MS 140 both by (a) building an increasingly more detailed model of the signal characteristics of locations in the service area for the present invention, and also (b) by providing capabilities for the location center processing to adapt to environmental changes.

One way these aspects of the present invention are realized is by providing one or more data base management systems and data bases for:

(a) storing and associating wireless MS signal characteristics with known locations of MSs 140 used in providing the signal characteristics. Such stored associations may not only provide an increasingly better model of the signal characteristics of the geography of the service area, but also provide an increasingly better model of more changeable signal characteristic affecting environmental factors such as weather, seasons, and/or traffic patterns;

(b) adaptively updating the signal characteristic data stored so that it reflects changes in the environment of the service area such as, for example, a new high rise building or a new highway.

Referring again to FIG. 5 of the collective representation of these data bases is the location information data bases 1232. Included among these data bases is a data base for providing training and/or calibration data to one or more trainable/calibratable FOMs 1224, as well as an archival data base for archiving historical MS location information related to the performance of the FOMs. These data bases will be discussed as necessary hereinbelow. However, a further brief introduction to the archival data base is provided here. Accordingly, the term, "location signature data base" is used hereinafter to denote the archival data base and/or data base management system depending on the context of the discussion. The location signature data base (shown in, for example, FIG. 6 and labeled 1320) is a repository for wireless signal characteristic data derived from wireless signal communications between an MS 140 and one or more base stations 122, wherein the corresponding location of the MS 140 is known and also stored in the location signature data base 1320. More particularly, the location signature data base 1320 associates each such known MS location with the wireless signal characteristic data derived from wireless signal communications between the MS 140 and one or more base stations 122 at this MS location. Accordingly, it is an aspect of the present invention to utilize such historical MS signal location data for enhancing the correctness and/or confidence of certain location hypotheses as will be described in detail in other sections below.

Data Representations for the Location Signature Data Base

In one embodiment, there are four fundamental entity types (or object classes in an object oriented programming paradigm) utilized in the location signature data base 1320. Briefly, these data entities are described in the items (24.1) through (24.4) that follow:

(24.1) (verified) location signatures: Each such (verified) location signature describes the wireless signal characteristic measurements between a given base station (e.g., BS 122 or LBS 152) and an MS 140 at a (verified or known) location associated with the (verified) location signature. That is, a verified location signature corresponds to a location whose coordinates such as latitude-longitude coordinates are known, while simply a location signature may have a known or unknown location corresponding with it. Note that the term (verified) location signature is also denoted by the abbreviation, "(verified) loc sig" hereinbelow;

(24.2) (verified) location signature clusters: Each such (verified) location signature cluster includes a collection of (verified) location signatures corresponding to all the location signatures between a target MS 140 at a (possibly verified) presumed substantially stationary location and each BS (e.g., 122 or 152) from which the target MS 140 can detect the BS's pilot channel regardless of the classification of the BS in the target MS (i.e., for CDMA, regardless of whether a BS is in the MS's active, candidate or remaining base station sets, as one skilled in the art will understand). Note that for simplicity here, it is presumed that each location signature cluster has a single fixed primary base station to which the target MS 140 synchronizes or obtains its timing;

(24.3) "composite location objects (or entities)": Each such entity is a more general entity than the verified location signature cluster. An object of this type is a collection of (verified) location signatures that are associated with the same MS 140 at substantially the same location at the same time and each such loc sig is associated with a different base station. However, there is no requirement that a loc sig from each BS 122 for which the MS 140 can detect the BS's pilot channel is included in the "composite location object (or entity)"; and (24.4) MS location estimation data that includes MS location estimates output by one or more MS location estimating first order models 1224, such MS location estimate data is described in detail hereinbelow.

It is important to note that a loc sig is, in one embodiment, an instance of the data structure containing the signal characteristic measurements output by the signal filtering and normalizing subsystem also denoted as the signal processing subsystem 1220 describing the signals between: (i) a specific base station 122 (BS) and (ii) a mobile station 140 (MS), wherein the BS's location is known and the MS's location is assumed to be substantially constant (during a 2-5 second interval in one embodiment of the present invention), during communication with the MS 140 for obtaining a single instance of loc sig data, although the MS location may or may not be known. Further, for notational purposes, the BS 122 and the MS 140 for a loc sig hereinafter will be denoted the "BS associated with the loc sig", and the "MS associated with the loc sig" respectively. Moreover, the location of the MS 140 at the time the loc sig data is obtained will be denoted the "location associated with the loc sig" (this location possibly being unknown).

Note that additional description of this aspect of the present invention can be found in one of the following two copending U.S. patent applications which are incorporated herein by reference: (a) "Location Of A Mobile Station" filed Nov. 24, 1999 having application Ser. No. 09/194,367 whose inventors are D. J. Dupray and C. L. Karr, and (b) "A Wireless Location System For Calibrating Multiple Location Estimators" filed Oct. 21, 1998 having application Ser. No. 09/176,587 whose inventor is D. J. Dupray, wherein these copending patent applications may have essential material for the present specification. In particular, these copending patent applications may have essential material relating to the location signature data base 1320.

Location Center Architecture

Overview of Location Center/Gateway Functional Components

Figure 5:
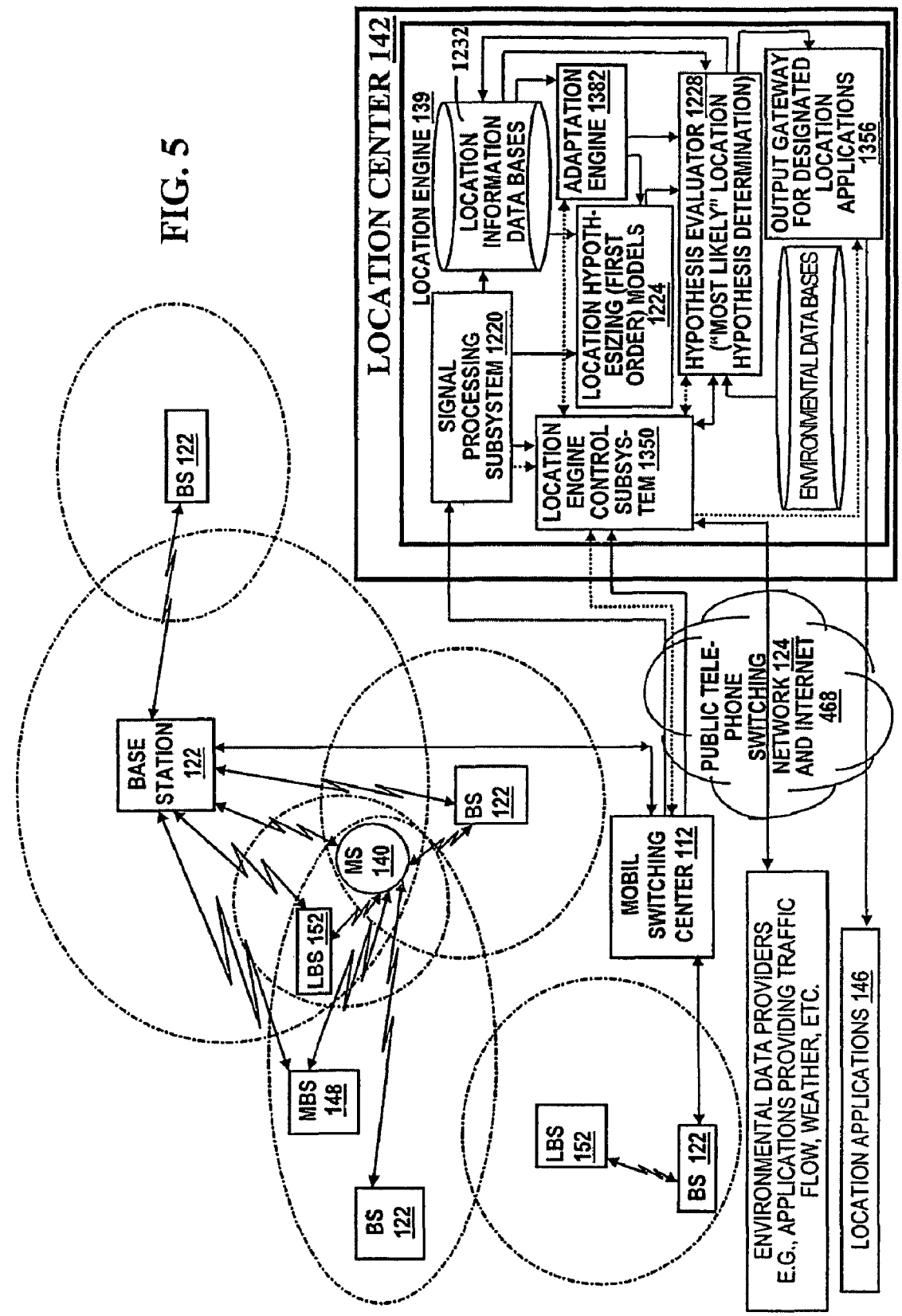
FIG. 5 is a high level block diagram of an embodiment of the present invention for locating a mobile station (MS) within a radio coverage area for the present invention.

FIG. 5 presents a high level diagram of an embodiment of the location center/gateway 142 and the location engine 139 in the context of the infrastructure for the entire location system of the present invention.

It is important to note that the architecture for the location center/gateway 142 and the location engine 139 provided by the present invention is designed for extensibility and flexibility so that MS 140 location accuracy and reliability may be enhanced as further location data become available and as enhanced MS location techniques become available. In addressing the design goals of extensibility and flexibility, the high level architecture for generating and processing MS location estimates may be considered as divided into the following high level functional groups described hereinbelow.

Low Level Wireless Signal Processing Subsystem for Receiving and Conditioning Wireless Signal Measurements A first functional group of location engine 139 modules is for performing signal processing and filtering of MS location signal data received from a conventional wireless (e.g., CDMA) infrastructure, as discussed in the steps (23.1) and (23.2) above. This group is denoted the signal processing subsystem 1220 herein. One embodiment of such a subsystem is described in the U.S. copending patent application titled, "Wireless Location Using A Plurality of Commercial Network Infrastructures," by F. W. LeBlanc, Dupray and Karr filed Jan. 22, 1999 and having U.S. Pat. No. 6,236,365. Note that this copending patent application is incorporated herein entirely by reference since it may contain essential material for the present invention. In particular, regarding the signal processing subsystem 20. Note, however, that the signal processing subsystem may be unnecessary for the gateway 142 unless the gateway supplies wireless location signal data to one or more FOMs.

Initial Location Estimators: First Order Models

Figure 8:
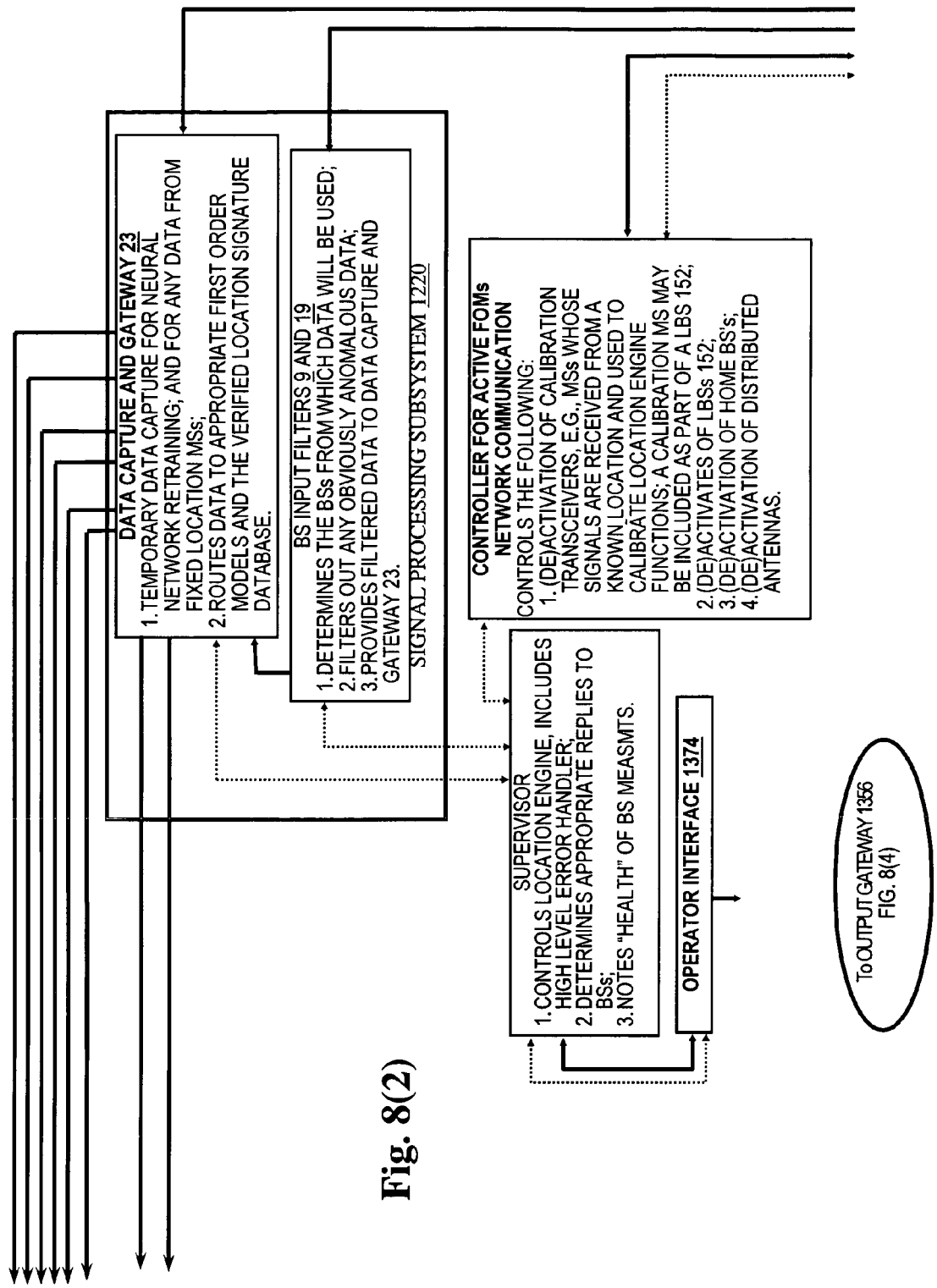
FIG. 8 is a substantially comprehensive high level block diagram illustrating data and control flows between the components of (and/or accessed by) the location center/gateway 142, as well the functionality of these components.
Figure 8:
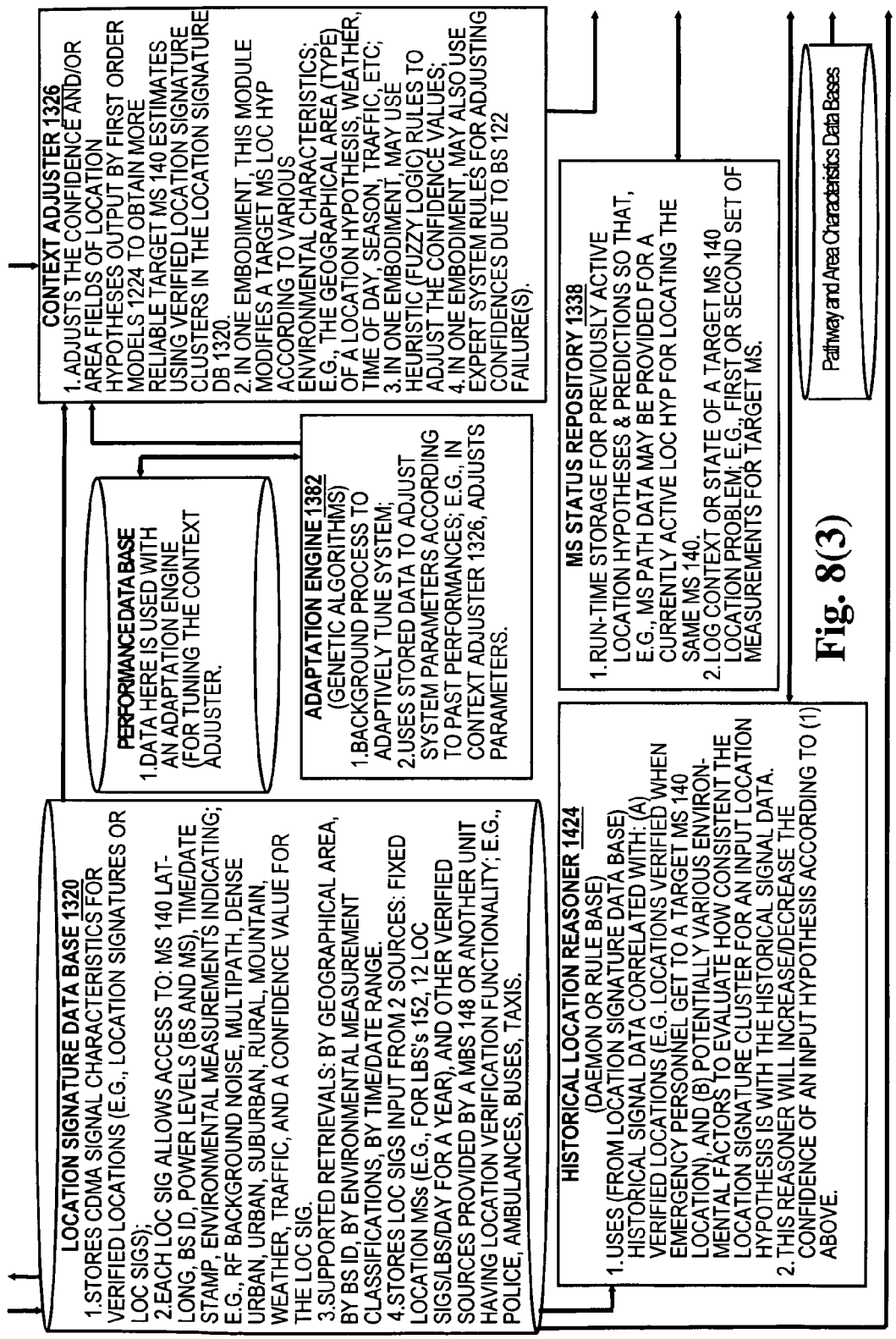
Figure 8:
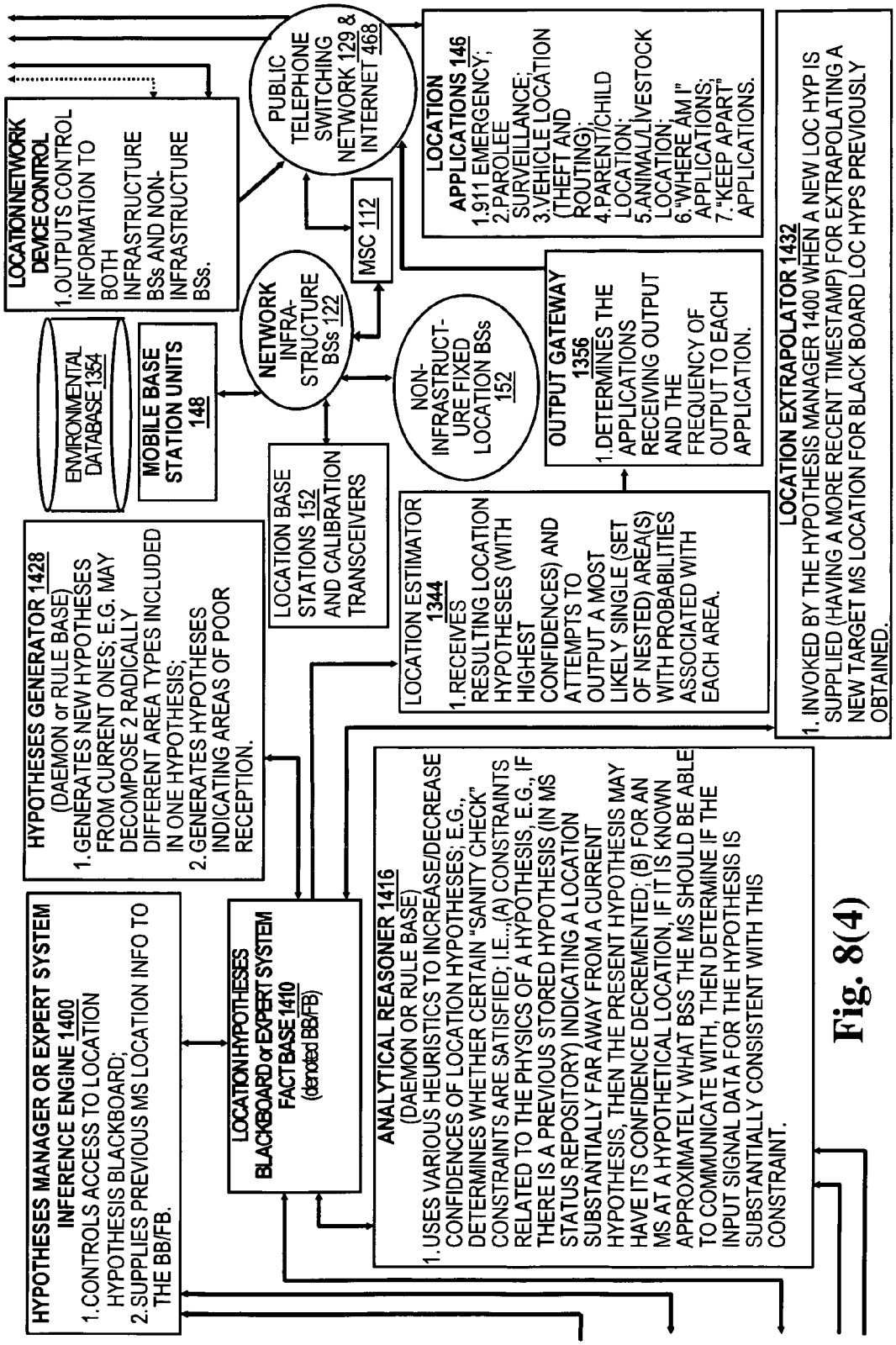
Figure 10:
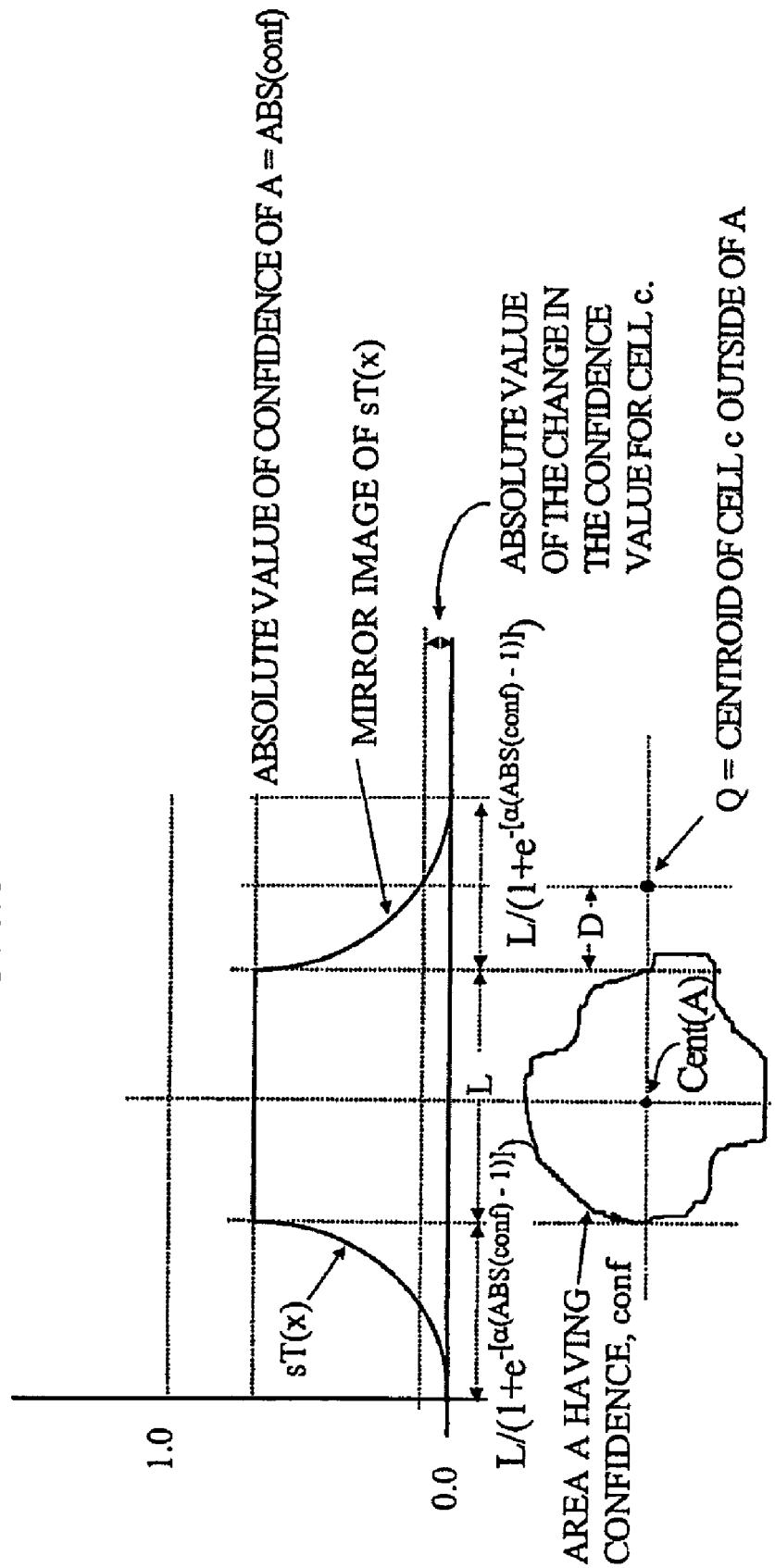
FIG. 10 is a graphical illustration of the computation performed by the most likelihood estimator 1344 of the hypothesis evaluator.

A second functional group of modules at least accessible by the location engine 139 are the FOM 1224 for generating various target MS 140 location initial estimates, as described in step (23.3). A brief description of some types of first order models is provided immediately below. Note that FIG. 8 illustrates another, more detail view of an embodiment of the location center/gateway 142 for the present invention. In particular, this figure illustrates some of the FOMs 1224 at least accessible (but not necessarily co-located with the other location center/gateway modules shown in this figure), and additionally illustrates the primary communications with other modules of the gateway. However, it is important to note that the present invention is not limited to the FOMs 1224 shown and discussed herein. That is, it is a primary aspect of the present invention to easily incorporate FOMs using other signal processing and/or computational location estimating techniques than those presented herein. Further, note that each FOM type may have a plurality of its MS location estimating models (at least) accessible by the gateway 142.

For example, (as will be described in further detail below), one such type of model or FOM 1224 (hereinafter models of this type are referred to as "terrestrial communication station offset (TCSO) models" or "terrestrial communication station offset (TCSO) first order models", or "terrestrial communication station offset (TCSO) FOMs") may be based on a range, offset, and/or distance computation such as on a base station signal reception angle determination between the target MS 140 from each of one or more base stations. Basically, such TCSO models 1224 determine a location estimate of the target MS 140 by determining an offset from each of one or more base stations 122, possibly in a particular direction from each (some of) the base stations, so that, e.g., an intersection of each area locus defined by the base station offsets may provide an estimate of the location of the target MS. TCSO FOMs 1224 may compute such offsets based on, e.g.:

(a) signal timing measurements between the target mobile station 140 and one or more base stations 122; e.g., timing measurements such as time difference of arrival (TDOA), or time of arrival (TOA). Note that both forward and reverse signal path timing measurements may be utilized;

(b) signal strength measurements (e.g., relative to power control settings of the MS 140 and/or one or more BS 122); and/or (c) signal angle of arrival measurements, or ranges thereof, at one or more base stations 122 (such angles and/or angular ranges provided by, e.g., base station antenna sectors having angular ranges of 120° or 60°, or, so called "SMART antennas" with variable angular transmission ranges of 2° to 120°). Accordingly, a terrestrial communication station offset (TCSO) model may utilize, e.g., triangulation or trilateration to compute a location hypothesis having either an area location or a point location for an estimate of the target MS 140. Additionally, in some embodiments location hypothesis may include an estimated error.

Another type of FOM 1224 is a statistically based first order model 1224, wherein a statistical technique, such as regression techniques (e.g., least squares, partial least squares, principle decomposition), or e.g., Bollenger Bands (e.g., for computing minimum and maximum base station offsets). In general, models of this type output location hypotheses determined by performing one or more statistical techniques or comparisons between the verified location signatures in location signature data base 1320, and the wireless signal measurements from a target MS. Models of this type are also referred to hereinafter as a "stochastic signal (first order) model" or a "stochastic FOM" or a "statistical model." Of course, statistically based FOMs may be a hybrid combination with another type of FOM such as a TCSO FOM.

Still another type of FOM 1224 is an adaptive learning model, such as an artificial neural net or a genetic algorithm, wherein the FOM may be trained to recognize or associate each of a plurality of locations with a corresponding set of signal characteristics for communications between the target MS 140 (at the location) and the base stations 122. Moreover, typically such a FOM is expected to accurately interpolate/extrapolate target MS 140 location estimates from a set of signal characteristics from an unknown target MS 140 location. Models of this type are also referred to hereinafter variously as "artificial neural net models" or "neural net models" or "trainable models" or "learning models." Note that a related type of FOM 1224 is based on pattern recognition. These FOMs can recognize patterns in the signal characteristics of communications between the target MS 140 (at the location) and the base stations 122 and thereby estimate a location area of the target MS. However, such FOMs may not be trainable.

Yet another type of FOM 1224 can be based on a collection of dispersed low power, low cost fixed location wireless transceivers (also denoted "location base stations 152" hereinabove) that are provided for detecting a target MS 140 in areas where, e.g., there is insufficient base station 122 infrastructure coverage for providing a desired level of MS 140 location accuracy. For example, it may uneconomical to provide high traffic wireless voice coverage of a typical wireless base station 122 in a nature preserve or at a fair ground that is only populated a few days out of the year. However, if such low cost location base stations 152 can be directed to activate and deactivate via the direction of a FOM 1224 of the present type, then these location base stations can be used to both location a target MS 140 and also provide indications of where the target MS is not. For example, if there are location base stations 152 populating an area where the target MS 140 is presumed to be, then by activating these location base stations 152, evidence may be obtained as to whether or not the target MS is actually in the area; e.g., if the target MS 140 is detected by a location base station 152, then a corresponding location hypothesis having a location estimate corresponding to the coverage area of the location base station may have a very high confidence value. Alternatively, if the target MS 140 is not detected by a location base station 152, then a corresponding location hypothesis having a location estimate corresponding to the coverage area of the location base station may have a very low confidence value. Models of this type are referred to hereinafter as "location base station models."

Yet another type of FOM 1224 can be based on input from a mobile base station 148, wherein location hypotheses may be generated from target MS 140 location data received from the mobile base station 148.

Still other types of FOM 1224 can be based on various techniques for recognizing wireless signal measurement patterns and associating particular patterns with locations in the coverage area 120. For example, artificial neural networks or other learning models can used as the basis for various FOMs.

Note that the FOM types mentioned here as well as other FOM types are discussed in detail hereinbelow. Moreover, it is important to keep in mind that in one embodiment of the present invention, the substantially simultaneous use or activation of a potentially large number of such first order models 1224, may be able to enhance both the reliability of location estimates and the accuracy of such estimates. Additionally, note that in some embodiments of the present invention, the first order models 1224 can be activated when appropriate signal measurements are obtained. For example, a TDOA FOM may be activated when only a single signal time delay measurement is obtained from some plurality of base station 122. However, if, for instance, additional time delay values are obtained (and assuming such additional values are necessary), then one or more wireless signal pattern matching FOM may also be activated in conjunction with the TDOA FOM. Additionally, a FOM using satellite signals (e.g., GPS) to perform a triangulation may be activated whenever appropriate measurements are received regardless of whether additional FOMs are capable of being substantially simultaneously activated or not. Accordingly, since such satellite signal FOMs are generally more accurate, output from such a FOM may dominate any other previous or simultaneous estimates unless there is evidence to the contrary.

Moreover, the present invention provides a framework for incorporating MS location estimators to be subsequently provided as new FOMs in a straightforward manner. For example, a FOM 1224 based on wireless signal time delay measurements from a distributed antenna system for wireless communication may be incorporated into the present invention for thereby locating a target MS 140 in an enclosed area serviced by the distributed antenna system. Accordingly, by using such a distributed antenna FOM, the present invention may determine the floor of a multi-story building from which a target MS is transmitting. Thus, MSs 140 can be located in three dimensions using such a distributed antenna FOM. Additionally, FOMs for detecting certain registration changes within, for example, a public switched telephone network can also be used for locating a target MS 140. For example, for some MSs 140 there may be an associated or dedicated device for each such MS that allows the MS to function as a cordless phone to a line based telephone network when the device detects that the MS is within signaling range. In one use of such a device (also denoted herein as a "home base station"), the device registers with a home location register of the public switched telephone network when there is a status change such as from not detecting the corresponding MS to detecting the MS, or visa versa, as one skilled in the art will understand. Accordingly, by providing a FOM that accesses the MS status in the home location register, the location engine 139 can determine whether the MS is within signaling range of the home base station or not, and generate location hypotheses accordingly. Moreover, other FOMs based on, for example, chaos theory and/or fractal theory are also within the scope of the present invention.

It is important to note the following aspects of the present invention relating to FOMs 1224:

(28.1) Each such first order model 1224 may be relatively easily incorporated into and/or removed from the present invention. For example, assuming that the signal processing subsystem 1220 provides uniform input to the FOMs, and there is a uniform FOM output interface (e.g., API), it is believed that a large majority (if not substantially all) viable MS location estimation strategies may be accommodated. Thus, it is straightforward to add or delete such FOMs 1224.

(28.2) First order models 1224 may be relatively simple and still provide significant MS 140 locating functionality and predictability. For example, much of what is believed to be common or generic MS location processing has been coalesced into, for example: a location hypothesis evaluation subsystem, denoted the hypotheses evaluator 1228 and described immediately below. Thus, the present invention is modular and extensible such that, for example, (and importantly) different first order models 1224 may be utilized depending on the signal transmission characteristics of the geographic region serviced by an embodiment of the present invention. Thus, a simple configuration of the present invention may have (or access) a small number of FOMs 1224 for a simple wireless signal environment (e.g., flat terrain, no urban canyons and low population density).

Alternatively, for complex wireless signal environments such as in cities like San Francisco, Tokyo or New York, a large number of FOMs 1224 may be simultaneously utilized for generating MS location hypotheses.

An Introduction to an Evaluator for Location Hypotheses: Hypothesis Evaluator

A third functional group of location engine 139 modules evaluates location hypotheses output by the first order models 1224 and thereby provides a "most likely" target MS location estimate. The modules for this functional group are collectively denoted the hypothesis evaluator 1228.

Hypothesis Evaluator

A primary purpose of the hypothesis evaluator 1228 is to mitigate conflicts and ambiguities related to location hypotheses output by the first order models 1224 and thereby output a "most likely" estimate of an MS for which there is a request for it to be located. In providing this capability, there are various related embodiments of the hypothesis evaluator that are within the scope of the present invention. Since each location hypothesis includes both an MS location area estimate and a corresponding confidence value indicating a perceived confidence or likelihood of the target MS being within the corresponding location area estimate, there is a monotonic relationship between MS location area estimates and confidence values. That is, by increasing an MS location area estimate, the corresponding confidence value may also be increased (in an extreme case, the location area estimate could be the entire coverage area 120 and thus the confidence value may likely correspond to the highest level of certainty; i.e., +1.0). Accordingly, given a target MS location area estimate (of a location hypothesis), an adjustment to its accuracy may be performed by adjusting the MS location area estimate and/or the corresponding confidence value. Thus, if the confidence value is, for example, excessively low then the area estimate may be increased as a technique for increasing the confidence value. Alternatively, if the estimated area is excessively large, and there is flexibility in the corresponding confidence value, then the estimated area may be decreased and the confidence value also decreased. Thus, if at some point in the processing of a location hypothesis, if the location hypothesis is judged to be more (less) accurate than initially determined, then (i) the confidence value of the location hypothesis may be increased (decreased), and/or (ii) the MS location area estimate can be decreased (increased). Moreover, note that when the confidence values are probabilities, such adjustments are may require the reactivation of one or more FOMs 1224 with requests to generate location hypotheses having location estimates of different sizes. Alternatively, adjuster modules 1436 and/or 1440 (FIG. 16 discussed hereinbelow) may be invoked for generating location hypotheses having area estimates of different sizes. Moreover, the confidence value on such an adjusted location hypothesis (actually a new location hypothesis corresponding to the originally generated hypothesis) may also be a probability in that combinations of FOMs 1224 and adjuster modules 1436 and 1440 can also be calibrated for thereby yielding probabilities as confidence values to the resulting location hypotheses.

In a first class of embodiments (typically wherein the confidence values are not maintained as probabilities), the hypothesis evaluator 1228 evaluates location hypotheses and adjusts or modifies only their confidence values for MS location area estimates and subsequently uses these MS location estimates with the adjusted confidence values for determining a "most likely" MS location estimate for outputting. Alternatively, in a second class of embodiments for the hypothesis evaluator 1228 (also typically wherein the confidence values are not maintained as probabilities), MS location area estimates can be adjusted while confidence values remain substantially fixed. However, in one preferred embodiment of the present embodiment, both location hypothesis area estimates and confidence values are modified.

The hypothesis evaluator 1228 may perform any or most of the following tasks depending on the embodiment of the hypothesis evaluator. That is, (30.1) it may enhance the accuracy of an initial location hypothesis generated by an FOM by using the initial location hypothesis as, essentially, a query or index into the location signature data base 1320 for obtaining one or more corresponding enhanced location hypotheses, wherein the enhanced location hypotheses have both an adjusted target MS location area estimates and an adjusted confidences based on past performance of the FOM in the location service surrounding the target MS location estimate of the initial location hypothesis;

Additionally, for embodiments of the hypothesis evaluator 1228 wherein the confidence values for location hypotheses are not maintained as probabilities, the following additional tasks (30.2) through (30.7) may be performed:

(30.2) the hypothesis evaluator 1228 may utilize environmental information to improve and reconcile location hypotheses supplied by the first order models 1224. A basic premise in this context is that the accuracy of the individual first order models may be affected by various environmental factors such as, for example, the season of the year, the time of day, the weather conditions, the presence of buildings, base station failures, etc.;

(30.3) the hypothesis evaluator 1228 may determine how well the associated signal characteristics used for locating a target MS compare with particular verified loc sigs stored in the location signature data base 1320 (see the location signature data base section for further discussion regarding this aspect of the invention). That is, for a given location hypothesis, verified loc sigs (which were previously obtained from one or more verified locations of one or more MS's) are retrieved for an area corresponding to the location area estimate of the location hypothesis, and the signal characteristics of these verified loc sigs are compared with the signal characteristics used to generate the location hypothesis for determining their similarities and subsequently an adjustment to the confidence of the location hypothesis (and/or the size of the location area estimate);

(30.4) the hypothesis evaluator 1228 may determine if (or how well) such location hypotheses are consistent with well known physical constraints such as the laws of physics. For example, if the difference between a previous (most likely) location estimate of a target MS and a location estimate by a current location hypothesis requires the MS to:

(a1) move at an unreasonably high rate of speed (e.g., 200 mph), or (b1) move at an unreasonably high rate of speed for an area (e.g., 80 mph in a corn patch), or (c1) make unreasonably sharp velocity changes (e.g., from 60 mph in one direction to 60 mph in the opposite direction in 4 sec), then the confidence in the current Location Hypothesis is likely to be reduced.

Alternatively, if for example, the difference between a previous location estimate of a target MS and a current location hypothesis indicates that the MS is:

(a2) moving at an appropriate velocity for the area being traversed, or (b2) moving along an established path (e.g., a freeway), then the confidence in the current location hypothesis may be increased.

(30.5) the hypothesis evaluator 1228 may determine consistencies and inconsistencies between location hypotheses obtained from different first order models. For example, if two such location hypotheses, for substantially the same timestamp, have estimated location areas where the target MS is likely to be and these areas substantially overlap, then the confidence in both such location hypotheses may be increased. Additionally, note that a velocity of an MS may be determined (via deltas of successive location hypotheses from one or more first order models) even when there is low confidence in the location estimates for the MS, since such deltas may, in some cases, be more reliable than the actual target MS location estimates;

(30.6) the hypothesis evaluator 1228 determines new (more accurate) location hypotheses from other location hypotheses. For example, this module may generate new hypotheses from currently active ones by decomposing a location hypothesis having a target MS location estimate intersecting two radically different wireless signaling area types. Additionally, this module may generate location hypotheses indicating areas of poor reception; and (30.7) the hypothesis evaluator 1228 determines and outputs a most likely location hypothesis for a target MS.

Note that additional description of the hypothesis evaluator 1228 can be found in one of the following two copending U.S. patent applications which are incorporated herein by reference: (a) "Location Of A Mobile Station" filed Nov. 24, 1999 having application Ser. No. 09/194,367 whose inventors are D. J. Dupray and C. L. Karr, and (b) "A Wireless Location System For Calibrating Multiple Location Estimators" filed Oct. 21, 1998 having application Ser. No. 09/176,587 whose inventor is D. J. Dupray, wherein these copending patent applications may have essential material for the present specification. In particular, these copending patent applications may have essential material relating to their descriptions of the hypothesis evaluator.

Context Adjuster Introduction.

The context adjuster (alternatively denoted "location adjuster modules) 1326 module enhances both the comparability and predictability of the location hypotheses output by the first order models 1224. In one embodiment (typically where confidence values of location hypotheses are not maintained as probabilities), this module modifies location hypotheses received from the FOMs 1224 so that the resulting location hypotheses output by the context adjuster 1326 may be further processed uniformly and substantially without concern as to differences in accuracy between the first order models from which location hypotheses originate. Further, embodiments of the context adjuster may determine those factors that are perceived to impact the perceived accuracy (e.g., confidence) of the location hypotheses:. For instance, environmental characteristics may be taken into account here, such as time of day, season, month, weather, geographical area categorizations (e.g., dense urban, urban, suburban, rural, mountain, etc.), area subcategorizations (e.g., heavily treed, hilly, high traffic area, etc.).

Figure 16:
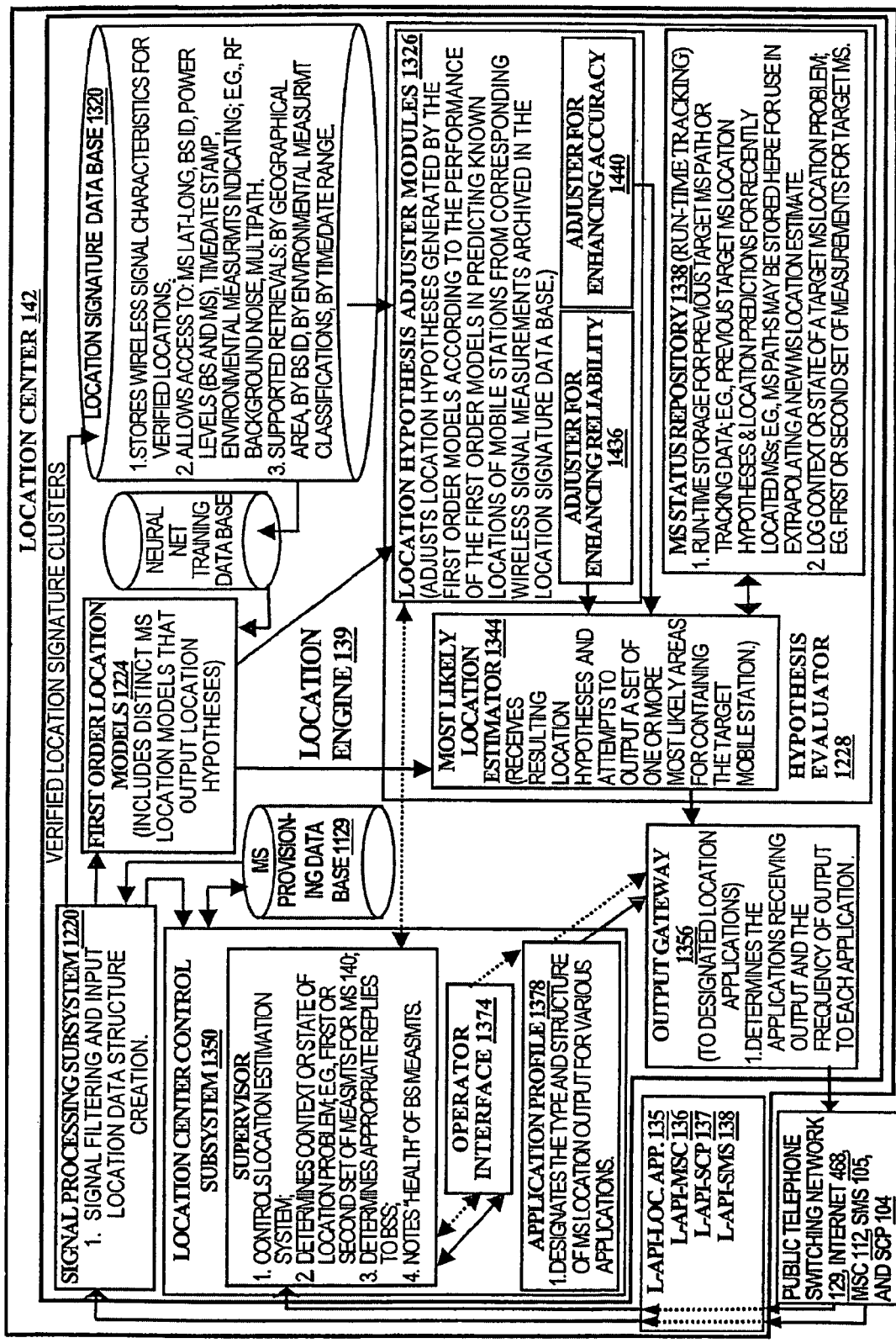
FIG. 16 illustrates another embodiment of the location engine 139, wherein the context adjuster 1326 (denoted in this figure as "location hypothesis adjuster modules") includes a module (1436) that is capable of adjusting location hypotheses for reliability, and another module (1440) that is capable of adjusting location hypotheses for accuracy.

In FIG. 16, two such adjuster modules are shown, namely, an adjuster for enhancing reliability 1436 and an adjuster for enhancing accuracy 1440. Both of these adjusters perform their location hypothesis adjustments in the manner described above. The difference between these two adjuster modules 1436 and 1440 is primarily the size of the localized area "nearby" the newly generated location estimate. In particular, since it is believed that the larger (smaller) the localized nearby area is, the more likely (less likely) the corresponding adjusted image is to contain the target mobile station location, the adjuster for enhancing reliability 1436 may determine its localized areas "nearby" a newly generated location estimate as, for example, having a 40% larger diameter (alternatively, area) than the location area estimate generated by a first order model 1224. Alternatively, the adjuster for enhancing accuracy 1444 may determine its localized areas "nearby" a newly generated location estimate as, for example, having a 30% smaller diameter (alternatively, area) than the location area estimate generated by a first order model 1224. Thus, each newly generated location hypothesis can potentially be used to derive at least two additional adjusted location hypotheses with some of these adjusted location hypotheses being more reliable and some being more accurate than the location hypotheses generated directly from the first order models 1224.

Note that additional description of context adjuster aspects of the present invention can be found in the following two copending U.S. patent applications which are incorporated herein by reference: (a) "Location Of A Mobile Station" filed Nov. 24, 1999 having application Ser. No. 09/194,367 whose inventors are D. J. Dupray and C. L. Karr, and (b) "A Wireless Location System For Calibrating Multiple Location Estimators" filed Oct. 21, 1998 having application Ser. No. 09/176,587 whose inventor is D. J. Dupray, wherein these copending patent applications may have essential material for the present specification. In particular, these copending patent applications may have essential material relating to the context adjuster 1326.

MS Status Repository Introduction

The MS status repository 1338 is a run-time storage manager for storing location hypotheses from previous activations of the location engine 139 (as well as for storing the output "most likely" target MS location estimate(s)) so that a target MS 140 may be tracked using target MS location hypotheses from previous location engine 139 activations to determine, for example, a movement of the target MS 140 between evaluations of the target MS location.

Location Hypothesis Analyzer Introduction.

The location hypothesis analyzer 1332, may adjust confidence values of the location hypotheses, according to:

(a) heuristics and/or statistical methods related to how well the signal characteristics for the generated target MS location hypothesis matches with previously obtained signal characteristics for verified MS locations.

(b) heuristics related to how consistent the location hypothesis is with physical laws, and/or highly probable reasonableness conditions relating to the location of the target MS and its movement characteristics. For example, such heuristics may utilize knowledge of the geographical terrain in which the MS is estimated to be, and/or, for instance, the MS velocity, acceleration or extrapolation of an MS position, velocity, or acceleration.

(c) generation of additional location hypotheses whose MS locations are consistent with, for example, previous estimated locations for the target MS.

Note that additional description of this aspect of the present invention can be found in one of the following copending U.S. patent application which is incorporated herein by reference: "Location Of A Mobile Station" filed Nov. 24, 1999 having application Ser. No. 09/194,367 whose inventors are D. J. Dupray and C. L. Karr.

Most Likelihood Estimator

The most likelihood estimator 1344 is a module for determining a "most likely" location estimate for a target MS being located by the location engine 139. The most likelihood estimator 1344 receives a collection of active or relevant location hypotheses from the hypothesis analyzer 1332 and uses these location hypotheses to determine one or more most likely estimates for the target MS 140.

There are various embodiments of the most likelihood estimator 1344 that may be utilized with the present invention. One such embodiment will now be described. At a high level, an area of interest is first determined which contains the target MS 140 whose location is desired. This can be straight-forwardly determined by identifying the base stations 122 that can be detected by the target MS 140 and/or the base stations 140 that can detect the target MS. Subsequently, assuming that this area of interest has been previously partitioned into "cells" (e.g., small rectangular areas of, for example, 50 to 200 feet per side) and that the resulting location hypotheses for estimating the location of the target MS 140 each have a likelihood probability associated therewith, then for each such location hypothesis, a probability (more generally confidence value) is capable of being assigned to each cell intersecting and/or included in the associated target MS location estimate. In particular, for each location hypothesis, a portion of the probability value, P, for the associated location estimate, A, can be assigned to each cell, C, intersecting the estimate. One simple way to perform this is to divide P by the number of cells C, and increment, for each cell C, a corresponding probability indicative of the target MS 140 being in C with the result from the division. One skilled in the art will readily recognize numerous other ways of incrementing such cell probabilities, including: providing a Gaussian or other probabilistic distribution of probability values according to, e.g., the distance of the cell from the centroid of the location estimate. Accordingly, assuming all such probability increments have been assigned to all such cells C from all location hypotheses generated for locating the target MS 140, then the following is one embodiment of a program for determining one or more most likely locations of the target MS.

```
Desired_rel ← get the desired reliability for the resulting location estimate;
Max_size ← get the desired maximum extent for the resulting location estimate;
Binned_cells ← sort the cells of the area of interest by their probabilities into bins where each successive bin
        includes those cells whose confidence values are within a smaller (non-overlapping)
        range from that of any preceding bin . Further, assume there are, e.g., 100 bins B_I
        wherein B_1 has cells with confidences within the range [0, 0.1], and B_I has cells with
        confidences within the range [(i – 1) * 0.01, i * 0.01].
Result ← nil;
Curr_rel ← 0; /* current likelihood of target MS 140 being in the area represented by "Result" */
Done ← FALSE;
Repeat
    Cell_bin ← get first (next) bin of cells from Binned_cells;
    While (there are cells in Cell_bin) do
        Curr_cell ← get a next cell from Cell_bin that is closest to the centroid of "Result";
        Result ← Result + Curr_cell;
        /* now determine a new reliability value corresponding to adding "Curr_cell" to the most
            likely location estimate being built in "Result" */
        Curr_rel ← Curr_rel + confidence_of_MS_in(Curr_cell);
        If (Curr_rel > Desired_rel) then
            Done ← TRUE;
Until Done;
/* reliability that the target MS is in "Result" is sufficient */
```

-continued

```
Curr_size ← current maximum geographic extent (i.e., dimension) of the area represented by "Result";
If (Curr_size <= Max_size) then output(Result);
Else Determine whether "Result" has one or more outlying cells that can be replaced by other cells closer to
    the centroid of "Result" and still have a reliability >= "Desired_rel";
    If (there are replaceable outlier cells) then
        replace them in Result and output(Result);
    Else output(Result);
```

Note that numerous similar embodiments of the above program maybe used, as one skilled in the art will understand. For instance, instead of "building" Result as provided in the above program, Result can be "whittled" from the area of interest. Accordingly, Result would be initialized to the entire area of interest, and cells would be selected for removal from Result. Additionally, note that the above program determines a fast approximation to the optimal most likely area containing the target MS 140 having at least a particular desired confidence. However, a similar program may be readily provided where a most likely area having less than a desired extent or dimension is output; e.g., such a program would could be used to provide an answer to the question: "What city block is the target MS most likely in?"

Additionally, note that a center of gravity type of computation for obtaining the most likely location estimate of the target MS 140 may be used as described in U.S. Pat. No. 5,293,642 ('642 patent) filed Dec. 19, 1990 having an issue data of Mar. 8, 1994 with inventor Lo which is incorporated by reference herein and may contain essential material for the present invention.

Still referring to the hypothesis evaluator 1228, it is important to note that not all the above mentioned modules are required in all embodiments of the present invention. In particular, the hypothesis analyzer 1332 may be unnecessary. Accordingly, in such an embodiment, the enhanced location hypotheses output by the context adjuster 1326 are provided directly to the most likelihood estimator 1344.

Control and Output Gating Modules

A fourth functional group of location engine 139 modules is the control and output gating modules which includes the location center control subsystem 1350, and the output gateway 1356. The location control subsystem 1350 provides the highest level of control and monitoring of the data processing performed by the location center 142. In particular, this subsystem performs the following functions:

(a) controls and monitors location estimating processing for each target MS 140. Note that this includes high level exception or error handling functions;

(b) receives and routes external information as necessary. For instance, this subsystem may receive (via, e.g., the public telephone switching network and Internet 468) such environmental information as increased signal noise in a particular service area due to increase traffic, a change in weather conditions, a base station 122 (or other infrastructure provisioning), change in operation status (e.g., operational to inactive);

(c) receives and directs location processing requests from other location centers 142 (via, e.g., the Internet);

(d) performs accounting and billing procedures such as billing according to MS location accuracy and the frequency with which an MS is located;

(e) interacts with location center operators by, for example, receiving operator commands and providing output indicative of processing resources being utilized and malfunctions;

(f) provides access to output requirements for various applications requesting location estimates. For example, an Internet location request from a trucking company in Los Angeles to a location center 142 in Denver may only want to know if a particular truck or driver is within the Denver area. Alternatively, a local medical rescue unit is likely to request a precise a location estimate as possible.

Figure 6:
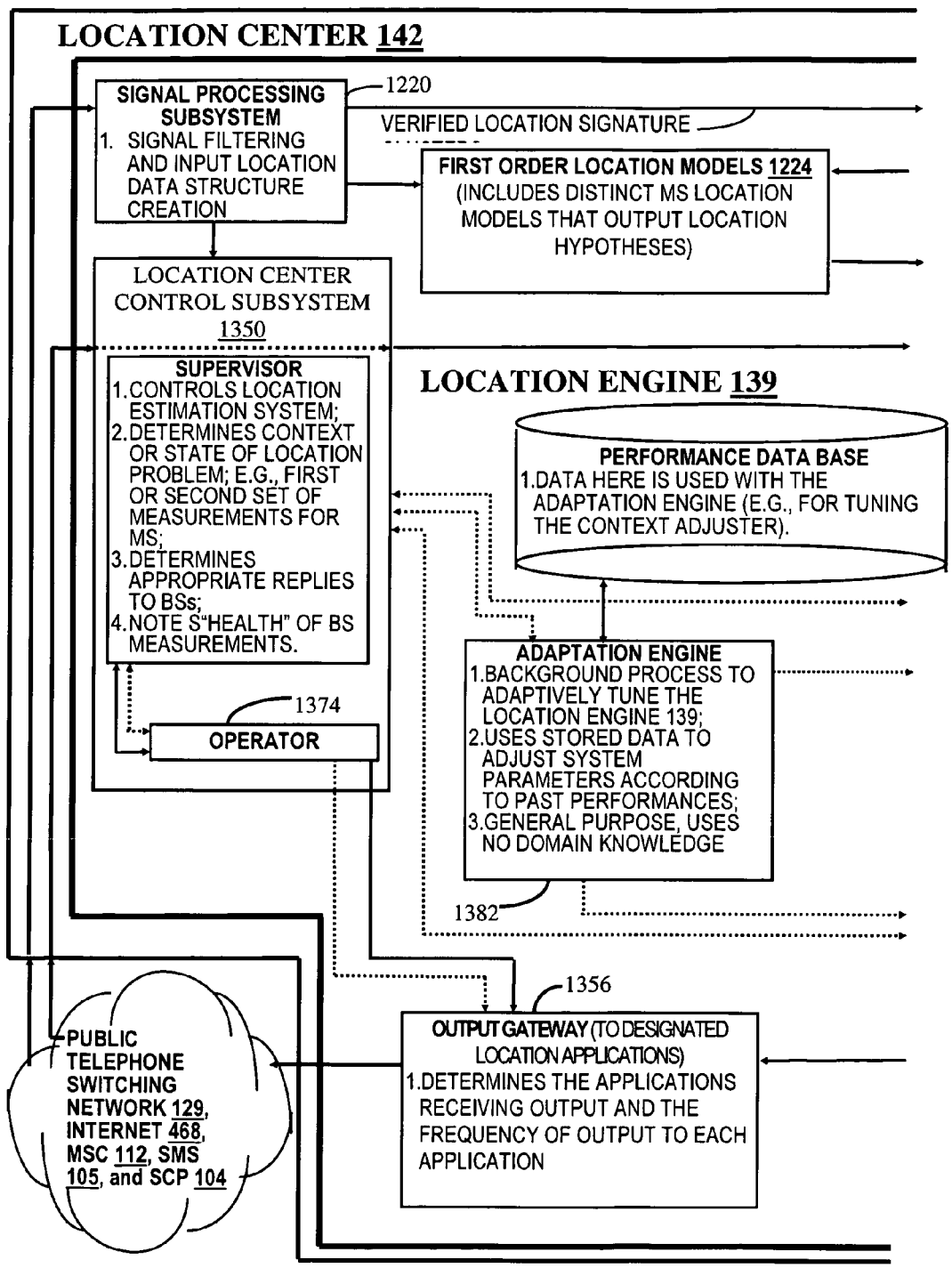
FIG. 6 is a high level block diagram of the location center 142.
Figure 6:
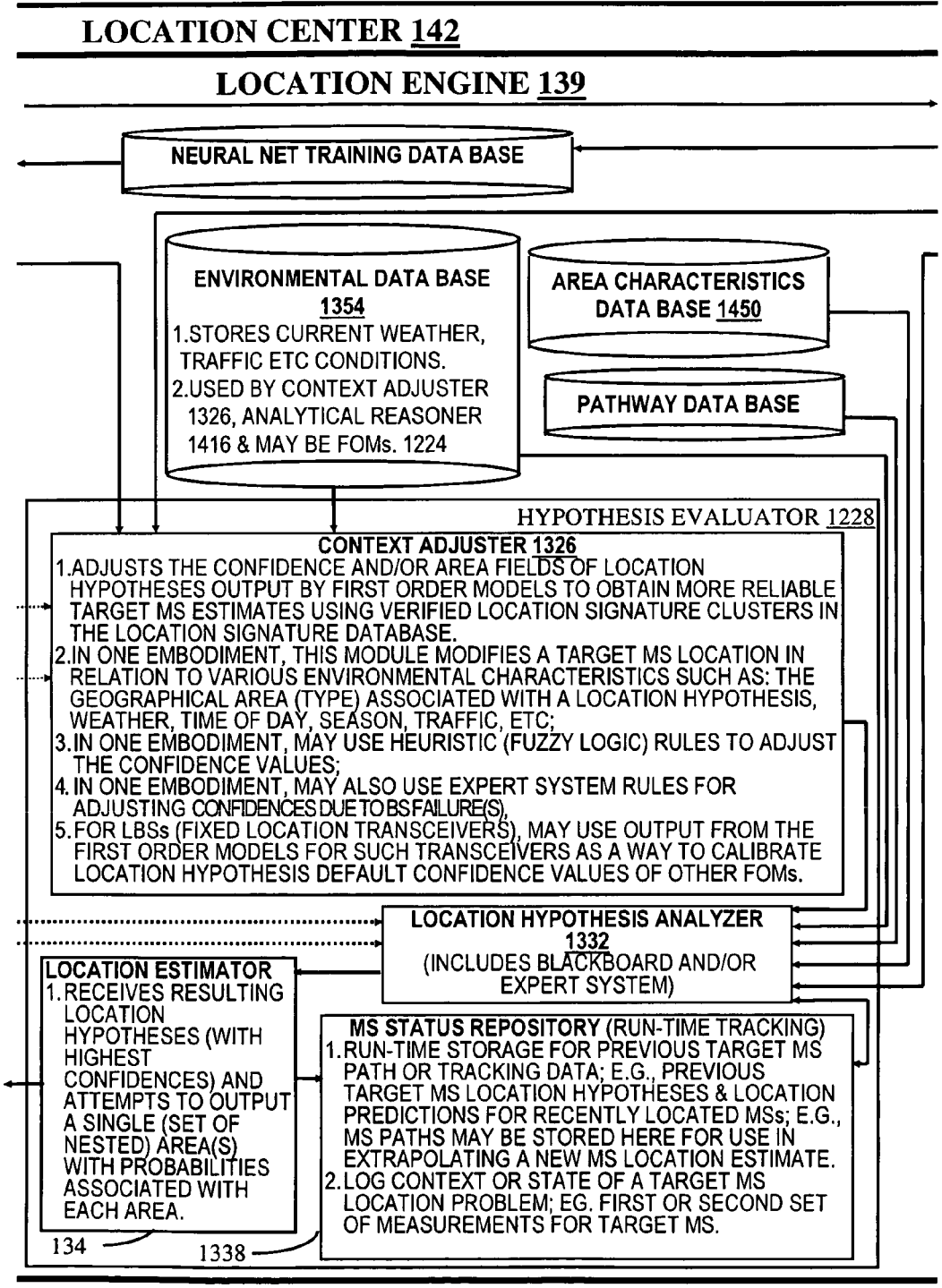
Figure 6:
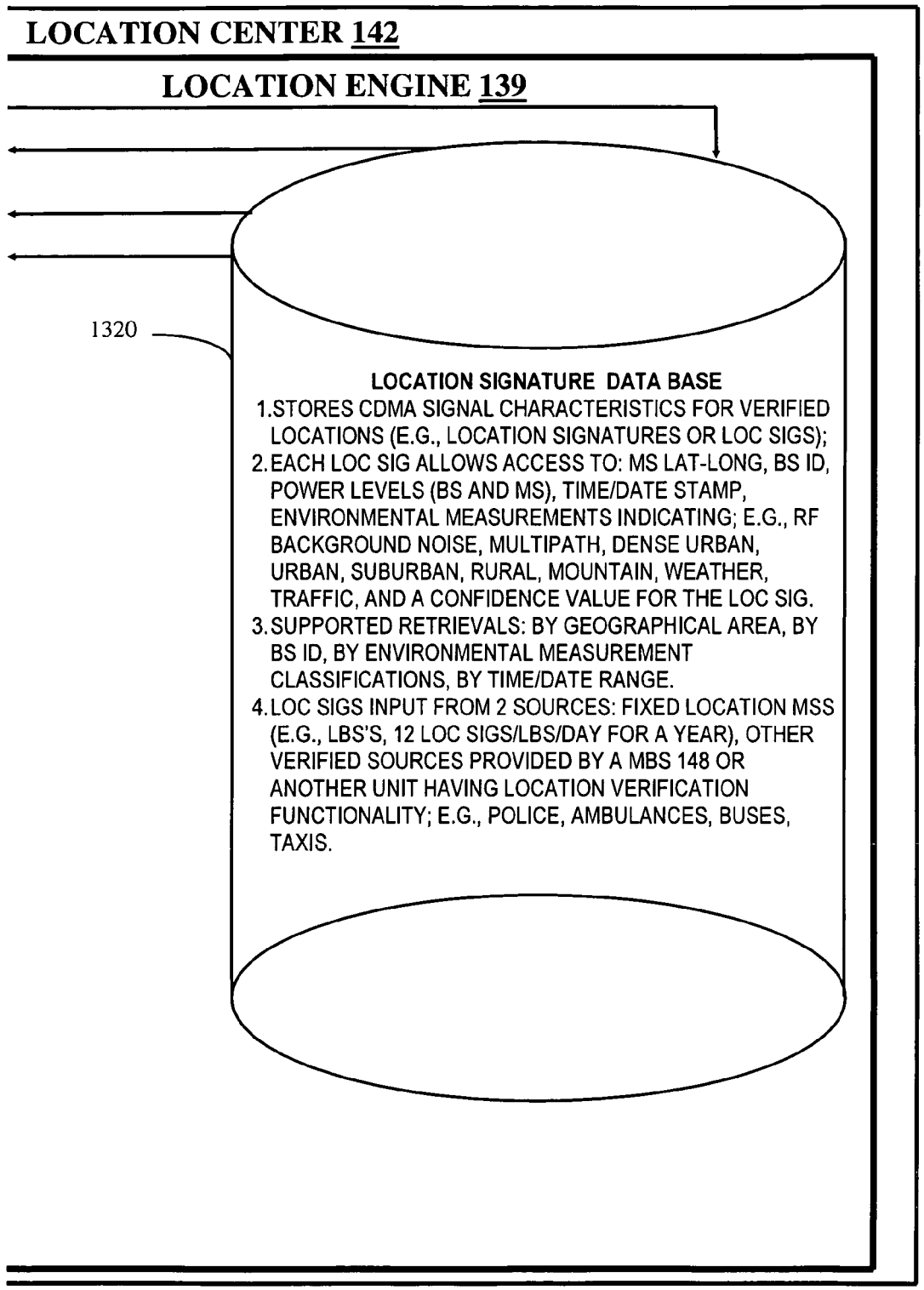
Figure 7:
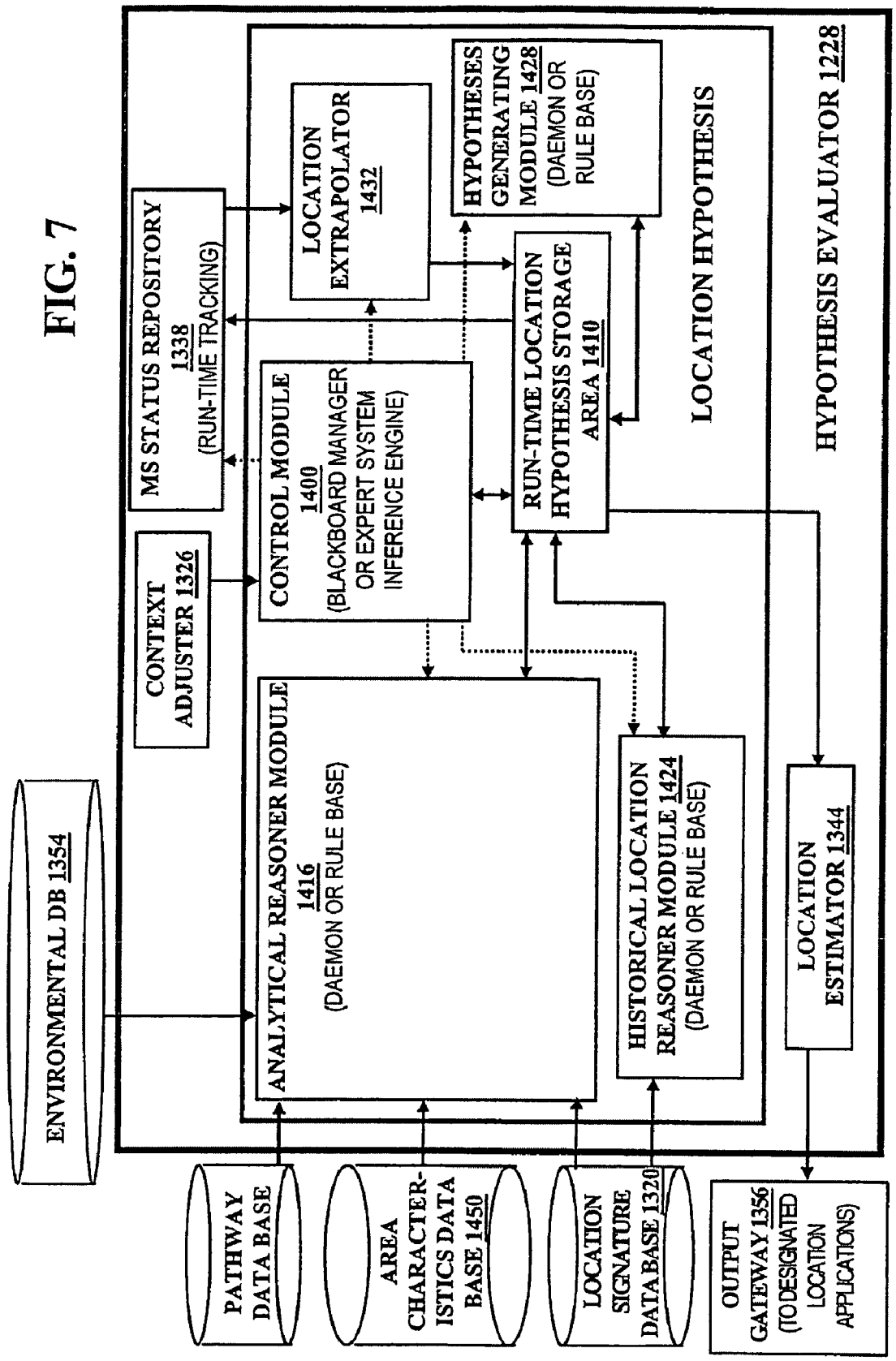
FIG. 7 is a high level block diagram of the hypothesis evaluator for the location center.

Note that in FIG. 6, (a)-(d) above are, at least at a high level, performed by utilizing the operator interface 1374.

Referring now to the output gateway 1356, this module routes target MS 140 location estimates to the appropriate location application(s). For instance, upon receiving a location estimate from the most likelihood estimator 1344, the output gateway 1356 may determine that the location estimate is for an automobile being tracked by the police and therefore must be provided must be provided according to the particular protocol.

System Tuning and Adaptation: the Adaptation Engine

A fifth functional group of location engine 139 modules provides the ability to enhance the MS locating reliability and/or accuracy of the present invention by providing it with the capability to adapt to particular operating configurations, operating conditions and wireless signaling environments without performing intensive manual analysis of the performance of various embodiments of the location engine 139. That is, this functional group automatically enhances the performance of the location engine for locating MSs 140 within a particular coverage area 120 using at least one wireless network infrastructure therein. More precisely, this functional group allows the present invention to adapt by tuning or optimizing certain system parameters according to location engine 139 location estimate accuracy and reliability.

There are a number location engine 139 system parameters whose values affect location estimation, and it is an aspect of the present invention that the MS location processing performed should become increasingly better at locating a target MS 140 not only through building an increasingly more detailed model of the signal characteristics of location in the coverage area 120 such as discussed above regarding the location signature data base 1320, but also by providing automated capabilities for the location center processing to adapt by adjusting or "tuning" the values of such location center system parameters.

Accordingly, the present invention may include a module, denoted herein as an "adaptation engine" 1382, that performs an optimization procedure on the location center 142 system parameters either periodically or concurrently with the operation of the location center in estimating MS locations. That is, the adaptation engine 1382 directs the modifications of the system parameters so that the location engine 139 increases in overall accuracy in locating target MSs 140. In one embodiment, the adaptation engine 1382 includes an embodiment of a genetic algorithm as the mechanism for modifying the system parameters. Genetic algorithms are basically search algorithms based on the mechanics of natural genetics.

Note that additional description of this aspect of the present invention can be found in one of the following two copending U.S. patent applications which are incorporated herein by reference: (a) "Location Of A Mobile Station" filed Nov. 24, 1999 having application Ser. No. 09/194,367 whose inventors are D. J. Dupray and C. L. Karr, and (b) "A Wireless Location System For Calibrating Multiple Location Estimators" filed Oct. 21, 1998 having application Ser. No. 09/176,587 whose inventor is D. J. Dupray, wherein these copending patent applications may have essential material for the present specification. In particular, these copending patent applications may have essential material relating to the use of genetic algorithm implementations for adaptively tuning system parameters of a particular embodiment of the present invention.

Implementations of First Order Models

Further descriptions of various first order models 1224 are provided in this section. However, it is important to note that these are merely representative embodiments of location estimators that are within the scope of the present invention. In particular, two or more of the wireless location technologies described hereinbelow may be combined to created additional First Order Models. For example, various triangulation techniques between a target MS 140 and the base station infrastructure (e.g., time difference of arrival (TDOA) or time of arrival (TOA)), may be combined with an angle of arrival (AOA) technique. For instance, if a single direct line of sight angle measurement and a single direct line of sight distance measurement determined by, e.g., TDOA or TOA can effectively location the target MS 140. In such cases, the resulting First Order Models may be more complex. However, location hypotheses may generated from such models where individually the triangulation techniques and the AOA techniques would be unable to generate effective location estimates.

Terrestrial Communication Station Offset (TCSO) First Order Models (e.g., TOA/TDOA/AOA)

As discussed in the Location Center Architecture Overview section herein above, TCSO models determine a presumed direction and/or distance (more generally, an offset) that a target MS 140 is from one or more base stations 122. In some embodiments of TCSO models, the target MS location estimate(s) generated are obtained using radio signal analysis techniques that are quite general and therefore are not capable of taking into account the peculiarities of the topography of a particular radio coverage area. For example, substantially all radio signal analysis techniques using conventional procedures (or formulas) are based on "signal characteristic measurements" such as:

(a) signal timing measurements (e.g., TOA and TDOA), and/or (b) signal strength measurements.

Furthermore, such signal analysis techniques are likely predicated on certain very general assumptions that can not fully account for signal attenuation and multipath due to a particular radio coverage area topography.

Taking CDMA or TDMA base station network as an example, each base station (BS) 122 is required to emit a constant signal-strength pilot channel pseudo-noise (PN) sequence on the forward link channel identified uniquely in the network by a pilot sequence offset and frequency assignment. It is possible to use the pilot channels of the active, candidate, neighboring and remaining sets, maintained in the target MS, for obtaining signal characteristic measurements (e.g., TOA and/or TDOA measurements) between the target MS 140 and the base stations in one or more of these sets.

Based on such signal characteristic measurements and the speed of signal propagation, signal characteristic ranges or range differences related to the location of the target MS 140 can be calculated. Using TOA and/or TDOA ranges as exemplary, these ranges can then be input to either the radius-radius multilateration or the time difference multilateration algorithms along with the known positions of the corresponding base stations 122 to thereby obtain one or more location estimates of the target MS 140. For example, if there are, four base stations 122 in the active set, the target MS 140 may cooperate with each of the base stations in this set to provide signal arrival time measurements. Accordingly, each of the resulting four sets of three of these base stations 122 may be used to provide an estimate of the target MS 140 as one skilled in the art will understand. Thus, potentially (assuming the measurements for each set of three base stations yields a feasible location solution) there are four estimates for the location of the target MS 140. Further, since such measurements and BS 122 positions can be sent either to the network or the target MS 140, location can be determined in either entity.

Since many of the signal measurements utilized by embodiments of TCSO models are subject to signal attenuation and multipath due to a particular area topography. Many of the sets of base stations from which target MS location estimates are desired may result in either no location estimate, or an inaccurate location estimate.

Accordingly, some embodiments of TCSO FOMs may attempt to mitigate such ambiguity or inaccuracies by, e.g., identifying discrepancies (or consistencies) between arrival time measurements and other measurements (e.g., signal strength), these discrepancies (or consistencies) may be used to filter out at least those signal measurements and/or generated location estimates that appear less accurate. In particular, such identifying and filtering may be performed by, for example, an expert system residing in the TCSO FOM.

Another approach for enhancing certain location techniques such as TDOA or angle or arrival (AOA) is that of super resolution as disclosed in U.S. Pat. No. 5,890,068 (also referred to as the '068 patent herein) filed on Oct. 3, 1996 having an issue date of Mar. 30, 1999 with inventors Fattouche et. al. which is incorporated by reference herein and which may contain essential material for the present invention. In particular, the following portions of the '068 patent are particularly important: the Summary section, the Detailed Description portion regarding FIGS. 12-17, and the section titled "Description Of The Preferred Embodiments Of The Invention."

Another approach, regardless of the FOM utilized, for mitigating such ambiguity or conflicting MS location estimates is particularly novel in that each of the target MS location estimates is used to generate a location hypothesis regardless of its apparent accuracy. Accordingly, these location hypotheses are input to an embodiment of the context adjuster 1326. In particular, in one context adjuster 1326 embodiment each location hypothesis is adjusted according to past performance of its generating FOM 1224 in an area of the initial location estimate of the location hypothesis (the area, e.g., determined as a function of distance from this initial location estimate), this alternative embodiment adjusts each of the location hypotheses generated by a first order model according to a past performance of the model as applied to signal characteristic measurements from the same set of base stations 122 as were used in generating the location hypothesis. That is, instead of only using only an identification of the first order model (i.e., its FOM_ID) to, for example, retrieve archived location estimates generated by the model in an area of the location hypothesis' estimate (when determining the model's past performance), the retrieval retrieves the archived location estimates that are, in addition, derived from the signal characteristics measurement obtained from the same collection of base stations 122 as was used in generating the location hypothesis. Thus, the adjustment performed by this embodiment of the context adjuster 1326 adjusts according to the past performance of the distance model and the collection of base stations 122 used.

Note in one embodiment, such adjustments can also be implemented using a precomputed vector location error gradient field. Thus, each of the location error vectors (as determined by past performance for the FOM) of the gradient field has its starting location at a location previously generated by the FOM, and its vector head at a corresponding verified location where the target MS 140 actually was. Accordingly, for a location hypothesis of an unknown location, this embodiment determines or selects the location error vectors having starting locations within a small area (e.g., possibly of a predetermined size, but alternatively, dependent on the density of the location error vector starting locations nearby to the location hypothesis) of the location hypothesis. Additionally, the determination or selection may also be based upon a similarity of signal characteristics also obtained from the target MS 140 being located with signal characteristics corresponding to the starting locations of location error vectors of the gradient field. For example, such sign characteristics may be, e.g., time delay/signal strength multipath characteristics.

Angle of Arrival First Order Model

Various mobile station location estimating models can be based on the angle of arrival (AOA) of wireless signals transmitted from a target MS 140 to the base station infrastructure as one skilled in the art will understand. Such AOA models (sometimes also referred to as direction of arrival or DOA models) typically require precise angular measurements of the wireless signals, and accordingly utilize specialized antennas at the base stations 122. The determined signal transmission angles are subject to multipath aberrations. Therefore, AOA is most effective when there is an unimpeded line-of-sight simultaneous transmission between the target MS 140 and at least two base stations 122.

TCSO (Grubeck) FOM with Increased Accuracy Via Multiple MS Transmissions

Another TCSO first order model 1224, denoted the Grubeck model (FOM) herein, is disclosed in U.S. Pat. No. 6,009,334 filed Nov. 26, 1997 and issued Dec. 28, 1999 having Grubeck, Fischer, and Lundqvist as inventors, this patent being fully incorporated herein by reference. The Grubeck model includes a location estimator for determining more accurately the distance between a wireless receiver at (RX), e.g., a CMRS fixed location communication station (such as a BS 122) and a target MS 140, wherein wireless signals are repeatedly transmitted from the target MS 140 and may be subject to multipath. An embodiment of the Grubeck model may be applied to TOA, TDOA, and/or AOA wireless measurements. For the TOA case, the following steps are performed:

(a) transmitting "M" samples $s_i$ 1<=I<=M of the same wireless signal from, e.g., the target MS 140 to the RX. Preferably M is on the order of 50 to 100 (e.g., 70) wireless signal bursts, wherein each such burst contains a portion having an identical known contents of bits (denoted a training sequence). However, note that a different embodiment can use (e.g., 70) received bursts containing different (non-identical) information, but information still known to the RX;

(b) receiving the "M" signal samples $s_i$ along with multipath components and noise at, e.g., RX;

(c) for each of the received "M" samples $s_i$, determining at the RX an estimated channel power profile (CPPi). Each CPPi is determined by first determining, via a processor at the RX, a combined correlation response ("Channel Impulse Response" or CIRi) of a small number of the bursts (e.g., 5) by correlating each burst with its known contents. Accordingly; the squared absolute value of the CIRi is the "estimated channel power profile" or CPPi;

(d) (randomly) selecting "N" (e.g., 10) out of the "M" received samples;

(e) performing incoherent integration of the CPPi for the "N" samples selected, which results in an integrated signal, i.e., one integrated channel power profile ICPP (Ni);

(f) determining if the signal-to-noise quality of the ICPP (Ni) is greater than or equal to a predetermined threshold value, and if not, improving the signal-to-noise quality of ICPP(Ni) as required, by redoing the incoherent integration with successively one additional received sample CPPi until the signal-to-noise quality of the ICPP(Ni) is greater than or equal to the predetermined threshold value;

(g) determining the TOA(i), including the case of determining TOA(i) from the maximum signal amplitude;

(h) entering the determined TOA(i) value into a diagram that shows a frequency of occurrence as a function of TOA(i);

(i) repeating the whole procedure "X" times by selecting a new combination of "N" out of "M" samples, which results in "X" additional points in the frequency of occurrence diagram;

(j) reading the minimum value TOA(min) as the time value having "z" of all occurrences with higher TOA(i) values and "1-z" of all occurrences with lower TOA(i) values, where z>0.7.

As mentioned above, an embodiment of the Grubeck FOM may also be provides for TDOA and/or AOA wireless location techniques, wherein a similar incoherent integration may be performed.

Note that a Grubeck FOM may be particularly useful for locating a target MS 140 in a GSM wireless network.

TCSO (Parl) FOM Using Different Tones and Multiple Antennas at BSs 122

A first order model 1224, denoted the Parl model herein, is substantially disclosed in U.S. Pat. No. 5,883,598 (denoted the '598 patent herein) filed Dec. 15, 1995 and issued Mar. 16, 1999 having Parl, Bussgang, Weitzen and Zagami as inventors, this patent being fully incorporated herein by reference. The Parl FOM includes a system for receiving representative signals (denoted also "locating signal(s)") from the target MS 140 via, e.g., base stations 122, and subsequently combining information regarding the amplitude and phase of the MS transmitted signals received at the base stations to determine the position of the target MS 140. In one embodiment, the Parl model uses input from a locating signal having two or more single-frequency tones, as one skilled in the art will understand. Moreover, at least some of the base stations 122 preferably include at least two antennas spaced from each other by a distance between a quarter wavelength and several wavelengths of the wireless locating signals received from the target MS 140. Optionally, another antenna vertically above or below the two or more antennas also spaced by a distance of between a quarter wavelength and several wavelengths can be used where elevation is also being estimated. The base stations 122 sample locating signals from the target MS 140. The locating signals include tones that can be at different frequencies. The tones can also be transmitted at different times, or, in an alternative embodiment, they can be transmitted simultaneously. Because, in one embodiment, only single-frequency tones are used as the locating signal instead of modulated signals, substantial transmission circuitry may be eliminated. The Parl FOM extracts information from each representative signal received from a target MS 144, wherein at least some of the extracted information is related to the amplitude and phase of the received signal.

In one embodiment of a Parl FOM, related to the disclosure in the '598 patent, when the locations of the BSs 122 are known, and the direction from any two of the BSs 122 to the target MS 140, the MS's location can be initially (roughly) determined by signal direction finding techniques. For example, an estimate of the phase difference between the signals at a pair of antennas at any BS 122 (having two such antennas) can lead to the determination of the angle from the base station to the target MS 140, and thus, the determination of the target MS direction. Subsequently, an enhanced location of the target MS 140 is computed directly from received target MS signal data using an ambiguity function A(x,y) described in the '598 patent, wherein for each point at x,y, the ambiguity function A(x,y) depends upon the probability that the MS is located at the geolocation represented by (x,y). Essentially the Parl FOM combines angle of arrival related data and TDOA related data for obtaining an optimized estimate of the target MS 140. However, it appears that independent AOA and TDOA MS locations are not used in determining a resulting target MS location (e.g., without the need for projecting lines at angles of arrival or computing the intersection of hyperbolas defined by pairs of base stations). Instead, the Parl FOM estimates the target MS's location by minimizing a joint probability of location related errors. In particular, such minimization may use the mean square error, and the location (x,y) at which minimization occurs is taken as the estimate of the target MS 140. In particular, the ambiguity function A(x,y) defines the error involved in a position determination for each point in a geolocation Cartesian coordinate system. The Parl model optimizes the ambiguity function to select a point x,y at which the associated error is minimized. The resulting location for (x,y) is taken as the estimate of the location of the target MS 140. Any of several different optimization procedures can be used to optimize the ambiguity function A(x,y). E.g., a first rough estimate of the target MS's location may be obtained by direction finding (as discussed above). Next, six points x,y may be selected that are in close proximity to the estimated point. The ambiguity function A(x,y) is solved for each of the x,y points to obtain six values. The six computed values are then used to define a parabolic surface. The point x,y at which the maximum value of the parabolic surface occurs is then taken as the estimate of the target MS 140. However, other optimization techniques may also be used. For example, a standard technique such as an iterative progression through trial and error to converge to the maximum can be used. Also, gradient search can be used to optimize the ambiguity function. In the case of three-dimensional location, the two-dimensional ambiguity function A(x,y) is extended to a three-dimensional function A(x,y,z). As in the two-dimensional case, the ambiguity function may be optimized to select a point x,y,z as the best estimate of the target MS's location in three dimensions. Again, any of several known optimization procedures, such as iterative progression through trial and error, gradient search, etc., can be used to optimize the ambiguity function.

TCSO FOM Using TDOA/AOA Measurements from an MBS 148 and/or an LBS 152

It is believed that from the location center/gateway 142 architecture and from the architecture of the mobile station location subsystem (described in a separate section hereinbelow) that target MS 140 location related information can be obtained from an MBS 148 and/or one or more LBSs 152. Moreover, such location related information can be supplied to any FOM 1224 that is able to accept such information as input. Thus, pattern recognition and adaptive FOMs may accept such information. However, to provide an alternative description of how MS location related information from an MBS and/or LBS may be used, reference is made to U.S. Pat. No. 6,031,490 (denoted the '490 Patent herein) filed Dec. 23, 1997 and issued Feb. 29, 2000 having Forssen, Berg and Ghisler as inventors, this patent being fully incorporated herein by reference. A TCSO FOM (denoted the FORSSEN FOM herein) using TDOA/AOA is disclosed in the '490 Patent.

The FORSSEN FOM includes a location estimator for determining the Time Difference of Arrival (TDOA) of the position of a target MS 140, which is based on Time of Arrival (TOA) and/or AOA measurements. This FOM uses data received from "measuring devices" provided within a wireless telecommunications network. The measuring devices measure TOA on demand and (optionally) Direction of Arrival (DOA), on a digital uplink time slot or on digital information on an analog uplink traffic channel in one or more radio base stations. The TOA and DOA information and the traffic channel number are reported to a Mobile Services Switching Center (MSC), which obtains the identity of the target MS 140 from the traffic channel number and sends the target MS 140 identity and TOA and DOA measurement information to a Service Node (e.g., location center 142) of the network. The Service Node calculates the position of the target MS 140 using the TOA information (supplemented by the DOA information when available). Note, that the FORSSEN model may utilize data from a second mobile radio terminal that is colocated on a mobile platform (auto, emergency vehicle, etc.) with one of the radio base stations (e.g., MBS 148), which can be moved into relatively close proximity with the target MS 140. Consequently, by moving one of the radio base stations (MBSs) close to the region of interest (near the target MS 140), the position determination accuracy is significantly improved.

Note that the '490 patent also discloses techniques for rising the target MS's transmission power for thereby allowing wireless signals from the target MS to be better detected by distant BSs 122.

Coverage Area First Order Model

Radio coverage area of individual base stations 122 may be used to generate location estimates of the target MS 140. Although a first order model 1224 based on this notion may be less accurate than other techniques, if a reasonably accurate RF coverage area is known for each (or most) of the base stations 122, then such a FOM (denoted hereinafter as a "coverage area first order model" or simply "coverage area model") may be very reliable. To determine approximate maximum radio frequency (RF) location coverage areas, with respect to BSs 122, antennas and/or sector coverage areas, for a given class (or classes) of (e.g., CDMA or TDMA) mobile station(s) 140, location coverage should be based on an MS's ability to adequately detect the pilot channel, as opposed to adequate signal quality for purposes of carrying user-acceptable traffic in the voice channel. Note that more energy is necessary for traffic channel activity (typically on the order of at least −94 to −104 dBm received signal strength) to support voice, than energy needed to simply detect a pilot channel's presence for location purposes (typically a maximum weakest signal strength range of between −104 to −110 dBm), thus the "Location Coverage Area" will generally be a larger area than that of a typical "Voice Coverage Area", although industry studies have found some occurrences of "no-coverage" areas within a larger covered area The approximate maximum RF coverage area for a given sector of (more generally angular range about) a base station 122 may be represented as a set of points representing a polygonal area (potentially with, e.g., holes therein to account for dead zones and/or notches). Note that if such polygonal RF coverage area representations can be reliably determined and maintained over time (for one or more BS signal power level settings), then such representations can be used in providing a set theoretic or Venn diagram approach to estimating the location of a target MS 140. Coverage area first order models utilize such an approach.

One embodiment, a coverage area model utilizes both the detection and non-detection of base stations 122 by the target MS 140 (conversely, of the MS by one or more base stations 122) to define an area where the target MS 140 may likely be. A relatively straightforward application of this technique is to:

(a) find all areas of intersection for base station RF coverage area representations, wherein: (i) the corresponding base stations are on-line for communicating with MSs 140; (ii) the RF coverage area representations are deemed reliable for the power levels of the on-line base stations; (iii) the on-line base stations having reliable coverage area representations can be detected by the target MS; and (iv) each intersection must include a predetermined number of the reliable RF coverage area representations (e.g., 2 or 3); and (b) obtain new location estimates by subtracting from each of the areas of intersection any of the reliable RF coverage area representations for base stations 122 that can not be detected by the target MS.

Accordingly, the new areas may be used to generate location hypotheses.

Satellite Signal Triangulation First Order Models

As mentioned hereinabove, there are various satellite systems that may be used to provide location estimates of a target MS 140 (e.g., GPS, GLONASS, LEOs, and MEOs). In many cases, such location estimates can be very accurate, and accordingly such accuracy would be reflected in the present invention by relatively high confidence values for the location hypotheses generated from such models in comparison to other FOMs. However, it may be difficult for the target MS 140 to detect and/or lock onto such satellite signals sufficiently well to provide a location estimate. For example, it may be very unlikely that such satellite signals can be detected by the MS 140 in the middle of high rise concrete buildings or parking structures having very reduced exposure to the sky.

Hybrid Satellite and TCSO FOMs

A first order model 1224, denoted the WATTERS FOM herein, is disclosed in U.S. Pat. No. 5,982,324 filed May 14, 1998 and issued Nov. 9, 1999 having Watters, Strawczynski, and Steer as inventors, this patent being fully incorporated herein by reference. The WATTERS FOM includes a location estimator for determining the location of a target MS 140 using satellite signals to the target MS 140 as well as delay in wireless signals communicated between the target MS and base stations 122. For example, aspects of global positioning system (GPS) technology and cellular technology are combined in order to locate a target MS 140. The WATTERS FOM may be used to determine target MS location in a wireless network, wherein the network is utilized to collect differential GPS error correction data, which is forwarded to the target MS 140 via the wireless network. The target MS 140 (which includes a receiver R for receiving non-terrestrial wireless signals from, e.g., GPS, or other satellites, or even airborne craft) receives this data, along with GPS pseudoranges using its receiver R, and calculates its position using this information. However, when the requisite number of satellites are not in view of the MS 140, then a pseudosatellite signal, broadcast from a BS 122 of the wireless network, is received by the target MS 140 and processed as a substitute for the missing satellite signal. Additionally, in at least some circumstances, when the requisite number of satellites (more generally, non-terrestrial wireless transmitters) are not detected by the receiver R, then the target MS's location is calculated using the wireless network infrastructure via TDOA/TOA with the BSs 122 of the network. When the requisite number of satellites (more generally, non-terrestrial wireless transmitters) are again detected by the receiver R, then the target MS is again calculated using wireless signals from the non-terrestrial wireless transmitters. Additionally, the WATTERS FOM may use wireless signals already being transmitted from base stations 122 to the target MS 140 in wireless network to calculate a round trip time delay, from which a distance calculation between the base station and the target MS can be made. This distance calculation substitutes for a missing non-terrestrial transmission signal.

Location Base Station First Order Model

In the location base station (LBS) model (FOM 1224), a database is accessed which contains electrical, radio propagation and coverage area characteristics of each of the location base stations in the radio coverage area. The LBS model is an active model, in that it can probe or excite one or more particular LBSs 152 in an area for which the target MS 140 to be located is suspected to be placed. Accordingly, the LBS model may receive as input a most likely target MS 140 location estimate previously output by the location engine 139 of the present invention, and use this location estimate to determine which (if any) LBSs 152 to activate and/or deactivate for enhancing a subsequent location estimate of the target MS. Moreover, the feedback from the activated LBSs 152 may be provided to other FOMs 1224, as appropriate, as well as to the LBS model. However, it is an important aspect of the LBS model that when it receives such feedback, it may output location hypotheses having relatively small target MS 140 location area estimates about the active LBSs 152 and each such location hypothesis also has a high confidence value indicative of the target MS 140 positively being in the corresponding location area estimate (e.g., a confidence value of 0.9 to +1), or having a high confidence value indicative of the target MS 140 not being in the corresponding location area estimate (i.e., a confidence value of –0.9 to –1). Note that in some embodiments of the LBS model, these embodiments may have functionality similar to that of the coverage area first order model described above. Further note that for LBSs within a neighborhood of the target MS wherein there is a reasonable chance that with movement of the target MS may be detected by these LBSs, such LBSs may be requested to periodically activate. (Note, that it is not assumed that such LBSs have an on-line external power source; e.g., some may be solar powered). Moreover, in the case where an LBS 152 includes sufficient electronics to carry voice communication with the target MS 140 and is the primary BS for the target MS (or alternatively, in the active or candidate set), then the LBS model will not deactivate this particular LBS during its procedure of activating and deactivating various LBSs 152.

Stochastic First Order Model

The stochastic first order models may use statistical prediction techniques such as principle decomposition, partial least squares, partial least squares, or other regression techniques for predicting, for example, expected minimum and maximum distances of the target MS from one or more base stations 122, e.g., Bollenger Bands. Additionally, some embodiments may use Markov processes and Random Walks (predicted incremental MS movement) for determining an expected area within which the target MS 140 is likely to be. That is, such a process measures the incremental time differences of each pilot as the MS moves for predicting a size of a location area estimate using past MS estimates such as the verified location signatures in the location signature data base 1320.

Pattern Recognition and Adaptive First Order Models

It is a particularly important aspect of the present invention to provide:
- (a) one or more FOMs 1224 that generate target MS 140 location estimates by using pattern recognition or associativity techniques, and/or
- (b) one or more FOMs 1224 that are adaptive or trainable so that such FOMs may generate increasingly more accurate target MS location estimates from additional training.

Statistically Based Pattern Recognition First Order Models

Regarding FOMs 1224 using pattern recognition or associativity techniques, there are many such techniques available. For example, there are statistically based systems such as "CART" (acronym for Classification and Regression Trees) by ANGOSS Software International Limited of Toronto, Canada that may be used for automatically for detecting or recognizing patterns in data that were not provided (and likely previously unknown). Accordingly, by imposing a relatively fine mesh or grid of cells of the radio coverage area, wherein each cell is entirely within a particular area type categorization, such as the transmission area types (discussed in the section, "Coverage Area: Area Types And Their Determination" above), the verified location signature clusters within the cells of each area type may be analyzed for signal characteristic patterns. Accordingly, if such a characteristic pattern is found, then it can be used to identify one or more of the cells in which a target MS is likely to be located. That is, one or more location hypotheses may be generated having target MS 140 location estimates that cover an area having the identified cells wherein the target MS 140 is likely to be located. Further note that such statistically based pattern recognition systems as "CART" include software code generators for generating expert system software embodiments for recognizing the patterns detected within a training set (e.g., the verified location signature clusters).

A related statistical pattern recognition FOM 1224 is also disclosed in U.S. Pat. No. 6,026,304, filed Jan. 8, 1997 and issued Feb. 15, 2000, having Hilsenrath and Wax as inventors, this patent (denoted the Hilsenrath patent herein) being incorporated herein fully by reference. An embodiment of a FOM 1224 based on the disclosure of the Hilsenrath patent is referred to herein as the Hilsenrath FOM. The Hilsenrath FOM includes a wireless location estimator that locates a target MS 140 using measurements of multipath signals in order to accurately determine the location of the target MS 140. More particularly, to locate the target MS 140, the Hilsenrath FOM uses wireless measurements of both a direct signal transmission path and multipath transmission signals from the MS 140 to a base station 122 receiver. The wireless signals from the target MS 140 arrive at and are detected by an antenna array of the receiver at the BS 122, wherein the antenna array includes a plurality of antennas. A signal signature (e.g., an embodiment of a location signature herein) for this FOM may be derived from any combination of amplitude, phase, delay, direction, and polarization information of the wireless signals transmitted from the target MS 140 to the base station 122 receiver. The Hilsenrath FOM 1224 determines a signal signature from a signal subspace of a covariance matrix. In particular, for p antennas included in the base station receiver, these antennas are used to receive complex signal envelopes $x_1(t), x_2(t), \ldots, x_p(t)$, respectively, which are conventionally grouped together to form a p-dimensional array vector $x(t)=[x_1(t), x_2(t), \ldots, x_p(t)]^T$. The signal subspace may be determined from a collection of M such array vectors $x(t)$ by several techniques. In one such technique, the outer products of the M vectors are added together to form a pxp signal covariance matrix, $R=1/M[x(t_1)x(t_1)^H+\ldots+x(t_M)x(t_M)^H]$. The eigenvalues of R whose magnitudes exceed a predetermined threshold determine a set of dominant eigenvectors. The signal subspace is the space spanned by these dominant eigenvectors. The signal signature is compared to a database of calibrated signal signatures and corresponding locations (e.g., an embodiment of the location signature data base 1320), wherein the signal signatures in the database include representations of the signal subspaces (such as the dominant eigenvectors of the covariance matrices. Accordingly, a location whose calibrated signature best matches the signal signature of the target MS 140 is selected as the most likely location of the target MS 140. Note that the database of calibrated signal signatures and corresponding verified locations is generated by a calibration procedure in which a calibrating MS 140 transmits location data derived from a co-located GPS receiver to the base stations 122. Thus, for each of a plurality of locations distributed through a service area, the location has associated therewith: the (GPS or verified) location information and the corresponding signal signature of the calibrating MS 140.

Accordingly, the location of a target MS 140 in the service area may be determined as follows. Signals originating from the target MS 140 at an unknown location are received at a base station 122. A signal processor, e.g., at the base station 122, then determines the signal signature as described above. The signal signature is then compared with the calibrated signal signatures stored in the above described embodiment of the location signature database 1320 during the calibration procedure. Using a measure of difference between subspaces (e.g., an angle between subspaces), a set of likely locations is selected from this location signature database embodiment. These selected likely locations are those locations whose associated calibrated signal signatures differ by less than a minimum threshold value from the target MS 140 signal signature. The difference measure is further used to provide a corresponding measure of the probability that each of the selected likely locations is the actual target MS location. Moreover, for one or more of the selected likely location, the corresponding measure may be output as the confidence value for a corresponding location hypothesis output by a Hilsenrath FOM 1224.

Thus, an embodiment of the present invention using such a Hilsenrath FOM 1224 performs the following steps (a)-(d):
- (a) receiving at an antenna array provided at one of the base stations 122, signals originating from the target MS 140, wherein the signals comprise p-dimensional array vectors sampled from p antennas of the array;
- (b) determining from the received signals, a signal signature, wherein the signal signature comprises a measured subspace, wherein the array vectors $x(t)$ are approximately confined to the measured subspace;
- (c) comparing the signal signature to previously obtained (and similarly computed) signal signatures, wherein each of the previously obtained signal signatures, SS, has associated therewith corresponding location data verifying the location where SS was obtained, wherein this step of comparing comprises substep of calculating differences between: (i) the measured subspace, and (ii) a similarly determined subspace for each of a plurality of the previously obtained signal signatures; and (d) selecting from the previously obtained signal signatures a most likely signal signature and a corresponding most likely location of the target MS 140 by using the calculated differences;

Note that regardless of the reliability some FOMs as described here may not be exceedingly accurate, but may be very reliable. Thus, since an aspect of at least some embodiments of the present invention is to use a plurality of MS location techniques (FOMs) for generating location estimates and to analyze the generated estimates (likely after being adjusted) to detect patterns of convergence or clustering among the estimates, even large MS location area estimates may be useful. For example, it can be the case that four different and relatively large MS location estimates, each having very high reliability, have an area of intersection that is acceptably precise and inherits the very high reliability from each of the large MS location estimates from which the intersection area was derived.

Note, that another statistically based FOM 1224 may be provided wherein the radio coverage area is decomposed substantially as above, but in addition to using the signal characteristics for detecting useful signal patterns, the specific identifications of the base station 122 providing the signal characteristics may also be used. Thus, assuming there is a sufficient density of verified location signature clusters in some of the mesh cells so that the statistical pattern recognizer can detect patterns in the signal characteristic measurements, an expert system may be generated that outputs a target MS 140 location estimate that may provide both a reliable and accurate location estimate of a target MS 140.

Adaptive/Trainable First Order Models

The term adaptive is used to describe a data processing component that can modify its data processing behavior in response to certain inputs that are used to change how subsequent inputs are processed by the component. Accordingly, a data processing component may be "explicitly adaptive" by modifying its behavior according to the input of explicit instructions or control data that is input for changing the component's subsequent behavior in ways that are predictable and expected. That is, the input encodes explicit instructions that are known by a user of the component. Alternatively, a data processing component may be "implicitly adaptive" in that its behavior is modified by other than instructions or control data whose meaning is known by a user of the component. For example, such implicitly adaptive data processors may learn by training on examples, by substantially unguided exploration of a solution space, or other data driven adaptive strategies such as statistically generated decision trees. Accordingly, it is an aspect of the present invention to utilize not only explicitly adaptive MS location estimators within FOMs 1224, but also implicitly adaptive MS location estimators. In particular, artificial neural networks (also denoted neural nets and ANNs herein) are used in some embodiments as implicitly adaptive MS location estimators within FOMs. Thus, in the sections below, neural net architectures and their application to locating an MS is described.

Artificial Neural Networks for MS Location

Artificial neural networks may be particularly useful in developing one or more first order models 1224 for locating an MS 140, since, for example, ANNs can be trained for classifying and/or associatively pattern matching of various RF signal measurements such as the location signatures. That is, by training one or more artificial neural nets using RF signal measurements from verified locations so that RF signal transmissions characteristics indicative of particular locations are associated with their corresponding locations, such trained artificial neural nets can be used to provide additional target MS 140 location hypotheses. Moreover, it is an aspect of the present invention that the training of such artificial neural net based FOMs (ANN FOMs) is provided without manual intervention as will be discussed hereinbelow. Additional description of this aspect of the present invention can be found in the copending U.S. patent application titled "Location Of A Mobile Station" filed Nov. 24, 1999 having application Ser. No. 09/194,367 whose inventors are D. J. Dupray and C. L. Karr, which is incorporated herein by reference and wherein this copending patent application may have essential material for the present invention. In particular, this copending patent application may have essential material relating to the use of ANNs as mobile station location estimators 1224.

Other First Order Models

Figure 2:
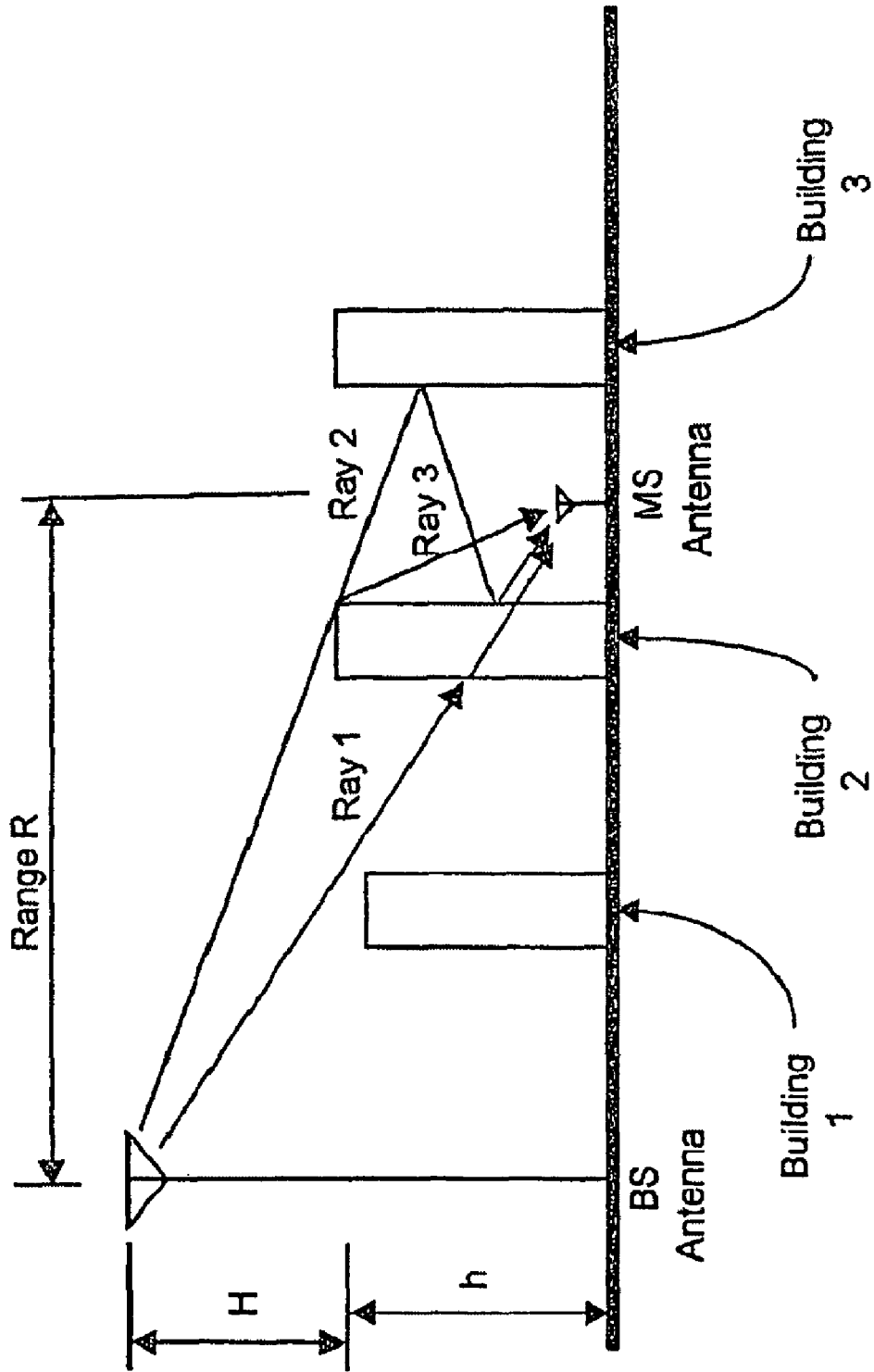
FIG. 2 shows aspects of the two-ray radio propagation model and the effects of urban clutter.
Figure 3:
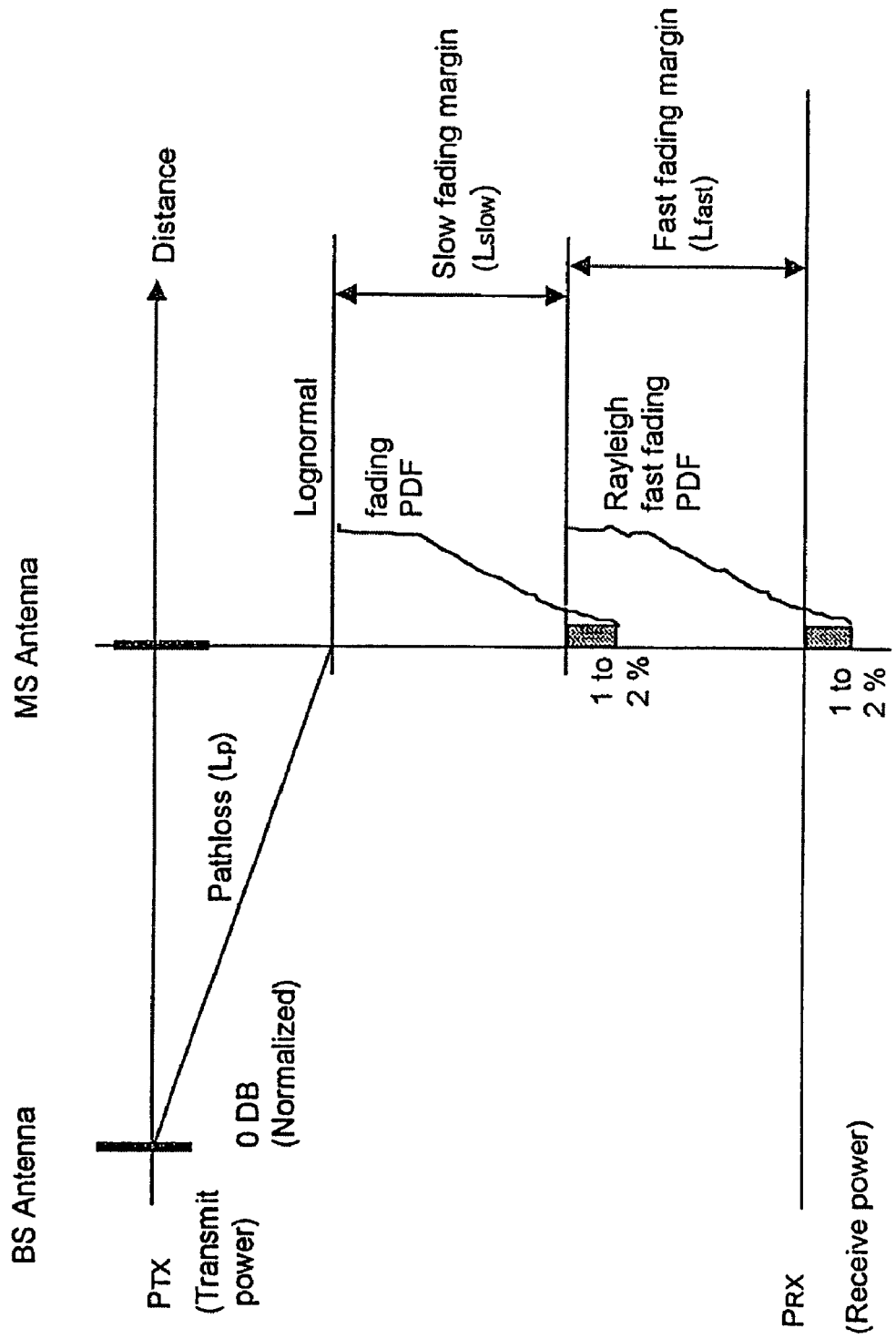
FIG. 3 provides a typical example of how the statistical power budget is calculated in design of a Commercial Mobile Radio Service Provider network.

U.S. Pat. No. 5,390,339 ('339 patent) filed Oct. 23, 1991 having an issue date of Feb. 14, 1995 with inventor being Bruckert et. al. provides number of embodiments of wireless location estimators for estimating the location of a "remote unit." In particular, various location estimator embodiments are described in relation to FIGS. 1B and 2B therein. The location estimators in the '339 patent are, in general, directed to determining weighted or adjusted distances of the "remote unit" (e.g., MS 140) from one or more "transceivers" (e.g., base stations 122). The distances are determined using signal strength measurements of wireless signals transmitted between the "remote unit" and the "transceivers." However, adjustments are in the signal strengths according to various signal transmission anomalies (e.g., co-channel interference), impairments and/or errors. Additionally, a signal RF propagation model may be utilized, and a likelihood of the "remote unit" being in the designated coverage areas (cells) of particular transceivers (e.g., base stations 122) is determined using probabilistic techniques such as posteriori probabilities. Accordingly, the Bruckert '339 patent is fully incorporated by reference herein and may contain essential material for the present invention.

U.S. Pat. No. 5,570,412 ('412 patent) filed Sept. 28, 1994 having an issue date of Oct. 29, 1996 with inventors LeBlanc et. al. provides further embodiments of wireless location estimators that may be used as First Order Models 1224. The location estimating techniques of the LeBlanc '412 patent are described with reference to FIG. 8 and succeeding figures therein. At a high level, wireless location techniques of the '412 patent can be characterized by the following quote therefrom:

"The location processing of the present invention focuses on the ability to predict and model RF contours using actual RF measurements, then performing data reduction techniques such as curve fitting technique, Bollinger Bands, and Genetic Algorithms, in order to locate a mobile unit and disseminate its location."

Accordingly, the LeBlanc '412 patent is fully incorporated by reference herein and may contain essential material for the present invention.

U.S. Pat. No. 5,293,645 ('645 patent) filed Oct. 4, 1991 having an issue date of Mar. 8, 1994 with inventor Sood. provide further embodiments of wireless location estimators that may be used as First Order Models 1224. In particular, the '645 patent describes wireless location estimating techniques using triangulations or other geographical intersection techniques. Further, one such technique is described in column 6, line 42 through column 7, line 7. Accordingly, the Sood '645 patent is fully incorporated by reference herein and may contain essential material for the present invention.

U.S Pat. No. 5,293,642 ('642 patent) filed Dec. 19, 1990 having an issue date of Mar. 8, 1994 with inventor Lo provide further embodiments of wireless location estimators that may be used as First Order Models 1224. In particular, the '642 patent determines a corresponding probability density function (pdf) about each of a plurality of base stations in communication with the target MS 140. That is, upon receiving wireless signal measurements from the transmissions between the target MS 140 and base stations 122, for each BS 122, a corresponding pdf is obtained from prior measurements of a particular wireless signal characteristic at locations around the base station. Subsequently, a most likely location estimation is determined from a joint probability density function of the individual base station probability density functions. Further description can be found in the Description Of The Preferred Embodiment section of the '642 patent. Accordingly, the Lo '642 patent is incorporated by reference herein and may contain essential material for the present invention.

Hybrid First Order Models
Time Difference of Arrival and Timing Advance FOM

A first order model 1224 denoted the Yost model herein. The Yost model includes a location estimator that uses a combination of Time Difference of Arrival (TDOA) and Timing Advance (TA) location determining techniques for determining the location of a target MS 140, wherein there are minor modifications to a telecommunication network such as a CMRS. The hybrid wireless location technique utilized by this location estimator uses TDOA measurements and TA measurements to obtain substantially independent location estimates of the target MS 140, wherein the TDOA measurements determine hyperbolae MS loci, about base stations 122 communicating (uni or bi-directionally) with the target MS, and the TA measurements determine circles about the base stations 122. Accordingly, an enhanced location estimate of the MS 140 can be obtained by using a least squares (or other statistical technique), wherein the least-squares technique determines a location for the MS between the various curves (hyperbolae and circles) that best approximates a point of intersection. Note that TA is used in all Time Division Multiple Access (TDMA) systems as one skilled in the art will understand, and measurements of TA can provide a measurement of the distance of the MS from a TDMA communication station in communication with the target MS 140. The Yost model is disclosed in U.S. Pat. No. 5,987,329 (329 Patent) filed Jul. 30, 1997 and issued Nov. 16, 1999 having Yost and Panchapakesan as inventors, this patent being fully incorporated herein fully by reference to thereby further describe the Yost model. The following quote from the '329 Patent describes an important aspect of the Yost model:

"Furthermore, the combination of TA and TDOA allows resolution of common ambiguities suffered by either technique separately. For example, in FIG. 5 a situation involving three base stations 24 (A, B and C as described, the latter being visible in the figure) is represented along with the resultant two hyperbolas AB and AC (and redundant hyperbola BC) for a TDOA position determination of the mobile M. FIG. 5 is a magnified view of the mobile terminal M location showing the nearby base stations and the nearby portions at the curves. It should be understood that, in this case, using TDOA alone, there are two possible solutions, where the hyperbolae cross. The addition of the TA circles (dashed curves) will allow the ambiguous solutions, which lie at different TA from all three base stations, to be clearly resolved without the need for additional base station 24 measurements."

As an aside note that a timing advance (TA) first order model may be provided as a separate FOM independent from the TDOA portion of the Yost model. Thus, if an embodiment of the present invention includes both a TA FOM and a TDOA FOM, then the multiple location estimator architecture of the present invention may substantially include the Yost model whenever the TA FOM and TDOA FOM are both activated for a same location instance of a target MS 140. However, it is an aspect of the present invention to also activate such a TA FOM and a TDOA FOM asynchronously from one another.

Satellite and Terrestrial Base Station Hybrid FOM

A first order model 1224, denoted the Sheynblat model (FOM) herein, is disclosed in U.S. Pat. No. 5,999,124 (denoted the '124 patent herein) filed Apr. 22, 1998 and issued Dec. 7, 1999 having Sheynblat as the inventor, this patent being fully incorporated herein by reference The Sheynblat FOM provides a location estimator for processing target MS 140 location related information obtained from: (a) satellite signals of a satellite positioning system (denoted SPS in the '124 patent) (e.g., GPS or GLONASS, LEO positioning satellites, and/or MEO positioning satellites), and (b) communication signals transmitted in the terrestrial wireless cellular network of BSs 122 for a radio coverage area, e.g., coverage area 120 (FIG. 4), wherein there is two-way wireless communication between the target MS 140 and the BSs. In one embodiment of the Sheynblat FOM, the location related information obtained from the satellite signals includes a representation of a time of travel of SPS satellite signals from a SPS satellite to a corresponding SPS receiver operatively coupled to (and co-located with) the target MS 140 (such "time of travel" is referred to as a pseudorange to the SPS satellite), Additionally for this embodiment, the location related information obtained from the communication signals in the wireless cellular network includes time of travel related information for a message in the communication signals between a BS 122 transceiver and the target MS 140 (this second "time of travel" related information is referred to as a cellular pseudorange). Accordingly, various combinations of pseudoranges to SPS satellites, and cellular pseudoranges can be used to determine a likely location of the target MS 140. As an example, if the target MS 140 (enhanced with a SPS receiver) can receive SPS satellite signals from one satellite, and additionally, the target MS is also in wireless communication (or can be in wireless communication) with two BSs 122, then three pseudoranges may be obtained and used to determine the position of the target MS by, e.g., triangulation. Of course, other combinations are possible for determining a location of the target MS 140, e.g., pseudoranges to two SPS satellites and one cellular pseudorange. Additionally, various techniques may be used to mitigate the effects of multipath on these pseudoranges. For example, since it is typical for the target MS 140 to detect (or be detected by) a plurality of BSs 122, a corresponding plurality of cellular pseudoranges may be obtained, wherein such cellular pseudoranges may be used in a cluster analysis technique to disambiguate MS locations identified by the satellite pseudoranges. Moreover, the determination of a location hypothesis is performed, in at least one embodiment, at a site remote from the target MS 140, such as the location center/gateway 142, or another site that communicates with the location center/gateway for supplying a resulting MS location to the gateway. Alternatively, the target MS 140 may perform the calculations to determine its own location. Note that this alternative technique may be particularly useful when the target MS 140 is a mobile base station 148.

MS Status Repository Embodiment

The MS status repository 1338 is a run-time storage manager for storing location hypotheses from previous activations of the location engine 139 (as well as the output target MS location estimate(s)) so that a target MS may be tracked using target MS location hypotheses from previous location engine 139 activations to determine, for example, a movement of the target MS between evaluations of the target MS location. Thus, by retaining a moving window of previous location hypotheses used in evaluating positions of a target MS, measurements of the target MS's velocity, acceleration, and likely next position may be determined by the location hypothesis analyzer 1332. Further, by providing accessibility to recent MS location hypotheses, these hypotheses may be used to resolve conflicts between hypotheses in a current activation for locating the target MS; e.g., MS paths may be stored here for use in extrapolating a new location Mobile Base Station Location Subsystem Description Mobile Base Station Subsystem Introduction Any collection of mobile electronics (denoted mobile location unit) that is able to both estimate a location of a target MS 140 and communicate with the base station network may be utilized by the present invention to more accurately locate the target MS. Such mobile location units may provide greater target MS location accuracy by, for example, homing in on the target MS and by transmitting additional MS location information to the location center 142. There are a number of embodiments for such a mobile location unit contemplated by the present invention. For example, in a minimal version, such the electronics of the mobile location unit may be little more than an onboard MS 140, a sectored/directional antenna and a controller for communicating between them. Thus, the onboard MS is used to communicate with the location center 142 and possibly the target MS 140, while the antenna monitors signals for homing in on the target MS 140. In an enhanced version of the mobile location unit, a GPS receiver may also be incorporated so that the location of the mobile location unit may be determined and consequently an estimate of the location of the target MS may also be determined. However, such a mobile location unit is unlikely to be able to determine substantially more than a direction of the target MS 140 via the sectored/directional antenna without further base station infrastructure cooperation in, for example, determining the transmission power level of the target MS or varying this power level. Thus, if the target MS or the mobile location unit leaves the coverage area 120 or resides in a poor communication area, it may be difficult to accurately determine where the target MS is located. None-the-less, such mobile location units may be sufficient for many situations, and in fact the present invention contemplates their use. However, in cases where direct communication with the target MS is desired without constant contact with the base station infrastructure, the present invention includes a mobile location unit that is also a scaled down version of a base station 122. Thus, given that such a mobile base station or MBS 148 includes at least an onboard MS 140, a sectored/directional antenna, a GPS receiver, a scaled down base station 122 and sufficient components (including a controller) for integrating the capabilities of these devices, an enhanced autonomous MS mobile location system can be provided that can be effectively used in, for example, emergency vehicles, air planes and boats. Accordingly, the description that follows below describes an embodiment of an MBS 148 having the above mentioned components and capabilities for use in a vehicle.

As a consequence of the MBS 148 being mobile, there are fundamental differences in the operation of an MBS in comparison to other types of BS's 122 (152). In particular, other types of base stations have fixed locations that are precisely determined and known by the location center, whereas a location of an MBS 148 may be known only approximately and thus may require repeated and frequent re-estimating. Secondly, other types of base stations have substantially fixed and stable communication with the location center (via possibly other BS's in the case of LBSs 152) and therefore although these BS's may be more reliable in their in their ability to communicate information related to the location of a target MS with the location center, accuracy can be problematic in poor reception areas. Thus, MBSs may be used in areas (such as wilderness areas) where there may be no other means for reliably and cost effectively locating a target MS 140 (i.e., there may be insufficient fixed location BS's coverage in an area).

Figure 11:
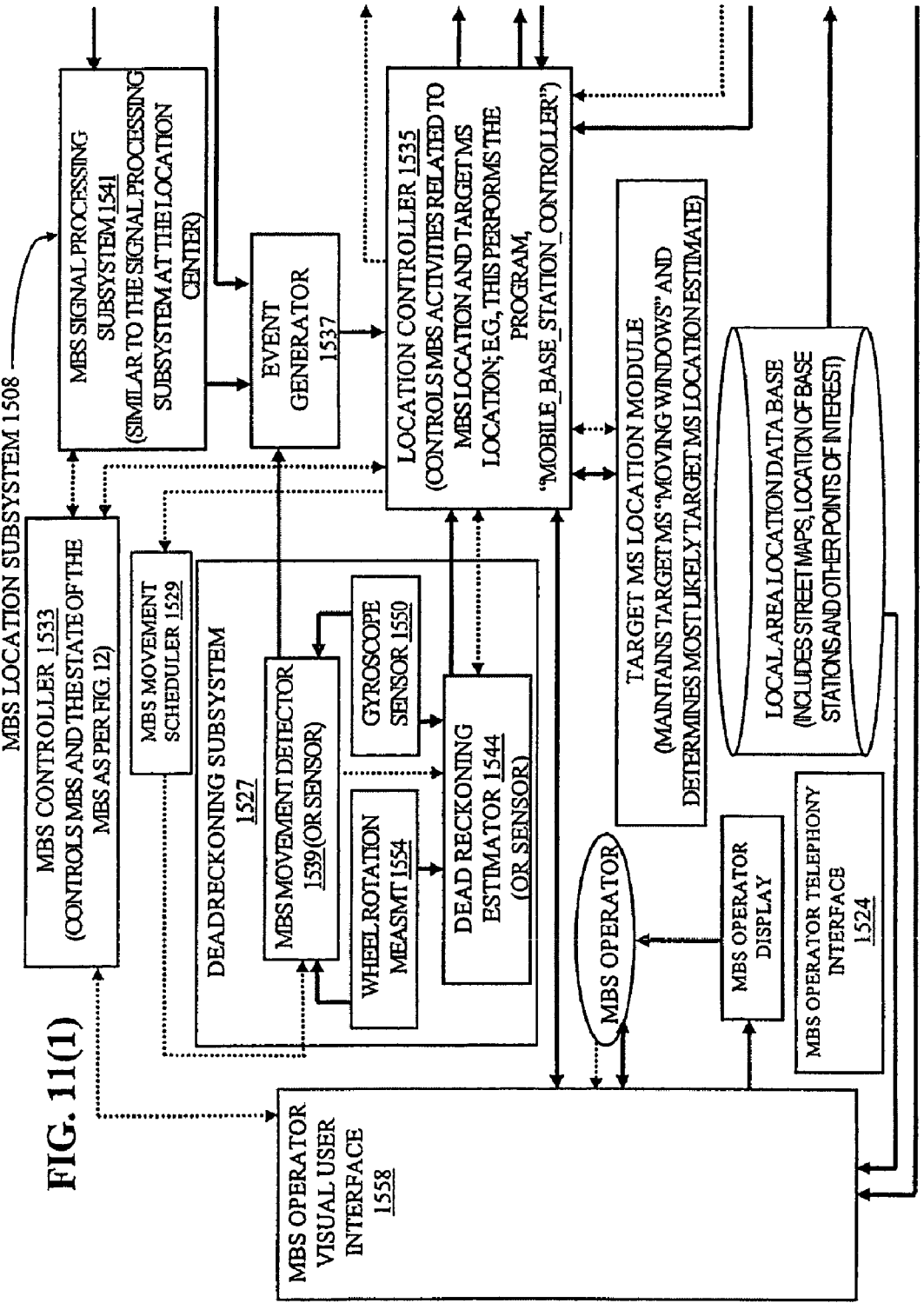
FIG. 11 is a high level block diagram of the mobile base station (MBS).
Figure 11:
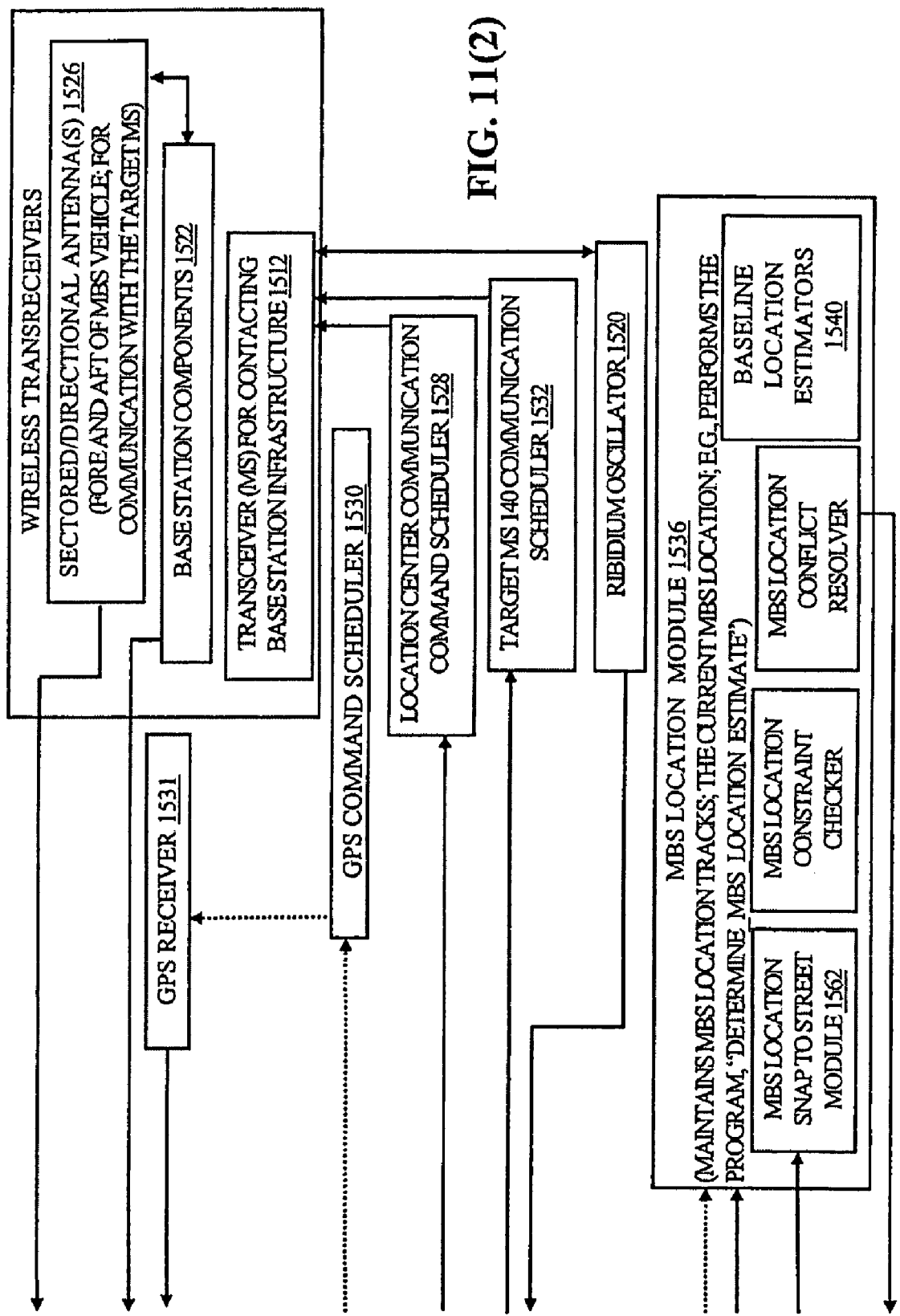
Figure 12:
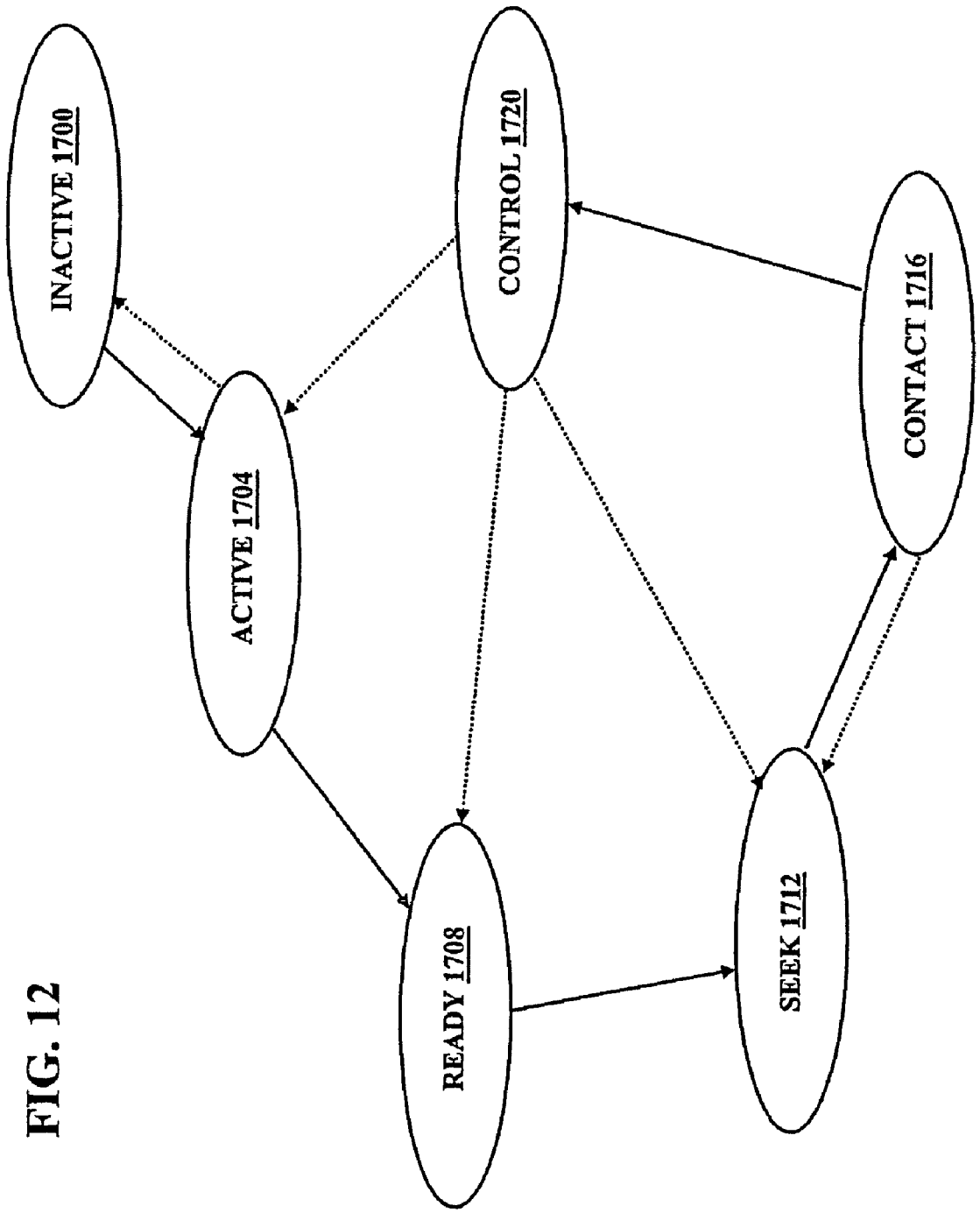
FIG. 12 is a high level state transition diagram describing computational states the Mobile Base station enters during operation.

FIG. 11 provides a high level block diagram architecture of one embodiment of the MBS location subsystem 1508. Accordingly, an MBS may include components for communicating with the fixed location BS network infrastructure and the location center 142 via an on-board transceiver 1512 that is effectively an MS 140 integrated into the location subsystem 1508. Thus, if the MBS 148 travels through an area having poor infrastructure signal coverage, then the MBS may not be able to communicate reliably with the location center 142 (e.g., in rural or mountainous areas having reduced wireless telephony coverage). So it is desirable that the MBS 148 must be capable of functioning substantially autonomously from the location center. In one embodiment, this implies that each MBS 148 must be capable of estimating both its own location as well as the location of a target MS 140.

Additionally, many commercial wireless telephony technologies require all BS's in a network to be very accurately time synchronized both for transmitting MS voice communication as well as for other services such as MS location. Accordingly, the MBS 148 will also require such time synchronization. However, since an MBS 148 may not be in constant communication with the fixed location BS network (and indeed may be off-line for substantial periods of time), on-board highly accurate timing device may be necessary. In one embodiment, such a device may be a commercially available ribidium oscillator 1520 as shown in FIG. 11.

Since the MBS 148, includes a scaled down version of a BS 122 (denoted 1522 in FIG. 11), it is capable of performing most typical BS 122 tasks, albeit on a reduced scale. In particular, the base station portion of the MBS 148 can:

(a) raise/lower its pilot channel signal strength, (b) be in a state of soft hand-off with an MS 140, and/or (c) be the primary BS 122 for an MS 140, and consequently be in voice communication with the target MS (via the MBS operator telephony interface 1524) if the MS supports voice communication. Further, the MBS 148 can, if it becomes the primary base station communicating with the MS 140, request the MS to raise/lower its power or, more generally, control the communication with the MS (via the base station components 1522). However, since the MBS 148 will likely have substantially reduced telephony traffic capacity in comparison to a standard infrastructure base station 122, note that the pilot channel for the MBS is preferably a nonstandard pilot channel in that it should not be identified as a conventional telephony traffic bearing BS 122 by MS's seeking normal telephony communication. Thus, a target MS 140 requesting to be located may, depending on its capabilities, either automatically configure itself to scan for certain predetermined MBS pilot channels, or be instructed via the fixed location base station network (equivalently BS infrastructure) to scan for a certain predetermined MBS pilot channel.

Moreover, the MBS 148 has an additional advantage in that it can substantially increase the reliability of communication with a target MS 140 in comparison to the base station infrastructure by being able to move toward or track the target MS 140 even if this MS is in (or moves into) a reduced infrastructure base station network coverage area. Furthermore, an MBS 148 may preferably use a directional or smart antenna 1526 to more accurately locate a direction of signals from a target MS 140. Thus, the sweeping of such a smart antenna 1526 (physically or electronically) provides directional information regarding signals received from the target MS 140. That is, such directional information is determined by the signal propagation delay of signals from the target MS 140 to the angular sectors of one of more directional antennas 1526 on-board the MBS 148.

Before proceeding to further details of the MBS location subsystem 1508, an example of the operation of an MBS 148 in the context of responding to a 911 emergency call is given. In particular, this example describes the high level computational states through which the MBS 148 transitions, these states also being illustrated in the state transition diagram of FIG. 12. Note that this figure illustrates the primary state transitions between these MBS 148 states, wherein the solid state transitions are indicative of a typical "ideal" progression when locating or tracking a target MS 140, and the dashed state transitions are the primary state reversions due, for example, to difficulties in locating the target MS 140.

Accordingly, initially the MBS 148 may be in an inactive state 1700, wherein the MBS location subsystem 1508 is effectively available for voice or data communication with the fixed location base station network, but the MS 140 locating capabilities of the MBS are not active. From the inactive state 1700 the MBS (e.g., a police or rescue vehicle) may enter an active state 1704 once an MBS operator has logged onto the MBS location subsystem of the MBS, such logging being for authentication, verification and journaling of MBS 148 events. In the active state 1704, the MBS may be listed by a 911 emergency center and/or the location center 142 as eligible for service in responding to a 911 request. From this state, the MBS 148 may transition to a ready state 1708 signifying that the MBS is ready for use in locating and/or intercepting a target MS 140. That is, the MBS 148 may transition to the ready state 1708 by performing the following steps:

(1a) Synchronizing the timing of the location subsystem 1508 with that of the base station network infrastructure. In one embodiment, when requesting such time synchronization from the base station infrastructure, the MBS 148 will be at a predetermined or well known location so that the MBS time synchronization may adjust for a known amount of signal propagation delay in the synchronization signal.

(1b) Establishing the location of the MBS 148. In one embodiment, this may be accomplished by, for example, an MBS operator identifying the predetermined or well known location at which the MBS 148 is located.

(1c) Communicating with, for example, the 911 emergency center via the fixed location base station infrastructure to identify the MBS 148 as in the ready state.

Thus, while in the ready state 1708, as the MBS 148 moves, it has its location repeatedly (re)-estimated via, for example, GPS signals, location center 142S location estimates from the base stations 122 (and 152), and an on-board deadreckoning subsystem 1527 having an MBS location estimator according to the programs described hereinbelow. However, note that the accuracy of the base station time synchronization (via the ribidium oscillator 1520) and the accuracy of the MBS 148 location may need to both be periodically recalibrated according to (1a) and (1b) above.

Assuming a 911 signal is transmitted by a target MS 140, this signal is transmitted, via the fixed location base station infrastructure, to the 911 emergency center and the location center 142, and assuming the MBS 148 is in the ready state 1708, if a corresponding 911 emergency request is transmitted to the MBS (via the base station infrastructure) from the 911 emergency center or the location center, then the MBS may transition to a seek state 1712 by performing the following steps:

(2a) Communicating with, for example, the 911 emergency response center via the fixed location base station network to receive the PN code for the target MS to be located (wherein this communication is performed using the MS-like transceiver 1512 and/or the MBS operator telephony interface 1524).

(2b) Obtaining a most recent target MS location estimate from either the 911 emergency center or the location center 142.

(2c) Inputting by the MBS operator an acknowledgment of the target MS to be located, and transmitting this acknowledgment to the 911 emergency response center via the transceiver 1512.

Subsequently, when the MBS 148 is in the seek state 1712, the MBS may commence toward the target MS location estimate provided. Note that it is likely that the MBS is not initially in direct signal contact with the target MS. Accordingly, in the seek state 1712 the following steps may be, for example, performed:

(3a) The location center 142 or the 911 emergency response center may inform the target MS, via the fixed location base station network, to lower its threshold for soft hand-off and at least periodically boost its location signal strength. Additionally, the target MS may be informed to scan for the pilot channel of the MBS 148. (Note the actions here are not, actions performed by the MBS 148 in the "seek state"; however, these actions are given here for clarity and completeness.)

(3b) Repeatedly, as sufficient new MS location information is available, the location center 142 provides new MS location estimates to the MBS 148 via the fixed location base station network.

(3c) The MBS repeatedly provides the MBS operator with new target MS location estimates provided substantially by the location center via the fixed location base station network.

(3d) The MBS 148 repeatedly attempts to detect a signal from the target MS using the PN code for the target MS.

(3e) The MBS 148 repeatedly estimates its own location (as in other states as well), and receives MBS location estimates from the location center.

Assuming that the MBS 148 and target MS 140 detect one another (which typically occurs when the two units are within 0.25 to 3 miles of one another), the MBS enters a contact state 1716 when the target MS 140 enters a soft hand-off state with the MBS. Accordingly, in the contact state 1716, the following steps are, for example, performed:

(4a) The MBS 148 repeatedly estimates its own location.

(4b) Repeatedly, the location center 142 provides new target MS 140 and MBS location estimates to the MBS 148 via the fixed location base infrastructure network.

(4c) Since the MBS 148 is at least in soft hand-off with the target MS 140, the MBS can estimate the direction and distance of the target MS itself using, for example, detected target MS signal strength and TOA as well as using any recent location center target MS location estimates.

(4d) The MBS 148 repeatedly provides the MBS operator with new target MS location estimates provided using MS location estimates provided by the MBS itself and by the location center via the fixed location base station network.

When the target MS 140 detects that the MBS pilot channel is sufficiently strong, the target MS may switch to using the MBS 148 as its primary base station. When this occurs, the MBS enters a control state 1720, wherein the following steps are, for example, performed:

(5a) The MBS 148 repeatedly estimates its own location.

(5b) Repeatedly, the location center 142 provides new target MS and MBS location estimates to the MBS 148 via the network of base stations 122 (152).

(5c) The MBS 148 estimates the direction and distance of the target MS 140 itself using, for example, detected target MS signal strength and TOA as well as using any recent location center target MS location estimates.

(5d) The MBS 148 repeatedly provides the MBS operator with new target MS location estimates provided using MS location estimates provided by the MBS itself and by the location center 142 via the fixed location base station network.

(5e) The MBS 148 becomes the primary base station for the target MS 140 and therefore controls at least the signal strength output by the target MS.

Note, there can be more than one MBS 148 tracking or locating an MS 140. There can also be more than one target MS 140 to be tracked concurrently and each target MS being tracked may be stationary or moving.

MBS Subsystem Architecture

An MBS 148 uses MS signal characteristic data for locating the MS 140. The MBS 148 may use such signal characteristic data to facilitate determining whether a given signal from the MS is a "direct shot" or an multipath signal. That is, in one embodiment, the MBS 148 attempts to determine or detect whether an MS signal transmission is received directly, or whether the transmission has been reflected or deflected. For example, the MBS may determine whether the expected signal strength, and TOA agree in distance estimates for the MS signal transmissions. Note, other signal characteristics may also be used, if there are sufficient electronics and processing available to the MBS 148; i.e., determining signal phase and/or polarity as other indications of receiving a "direct shot" from an MS 140.

In one embodiment, the MBS 148 (FIG. 11) includes an MBS controller 1533 for controlling the location capabilities of the MBS 148. In particular, the MBS controller 1533 initiates and controls the MBS state changes as described in FIG. 12. Additionally, the MBS controller 1533 also communicates with the location controller 1535, wherein this latter controller controls MBS activities related to MBS location and target MS location. The location controller 1535 receives data input from an event generator 1537 for generating event records to be provided to the location controller 1535. For example, records may be generated from data input received from: (a) the vehicle movement detector 1539 indicating that the MBS 148 has moved at least a predetermined amount and/or has changed direction by at least a predetermined angle, or (b) the MBS signal processing subsystem 1541 indicating that the additional signal measurement data has been received from either the location center 142 or the target MS 140. Note that the MBS signal processing subsystem 1541, in one embodiment, is similar to the signal processing subsystem 1220 of the location center 142. may have multiple command schedulers. In particular, a scheduler 1528 for commands related to communicating with the location center 142, a scheduler 1530 for commands related to GPS communication (via GPS receiver 1531), a scheduler 1529 for commands related to the frequency and granularity of the reporting of MBS changes in direction and/or position via the MBS dead reckoning subsystem 1527 (note that this scheduler is potentially optional and that such commands may be provided directly to the deadreckoning estimator 1544), and a scheduler 1532 for communicating with the target MS(s) 140 being located. Further, it is assumed that there is sufficient hardware and/or software to appear to perform commands in different schedulers substantially concurrently.

In order to display an MBS computed location of a target MS 140, a location of the MBS must be known or determined. Accordingly, each MBS 148 has a plurality of MBS location estimators (or hereinafter also simply referred to as location estimators) for determining the location of the MBS. Each such location estimator computes MBS location information such as MBS location estimates, changes to MBS location estimates, or, an MBS location estimator may be an interface for buffering and/or translating a previously computed MBS location estimate into an appropriate format. In particular, the MBS location module 1536, which determines the location of the MBS, may include the following MBS location estimators 1540 (also denoted baseline location estimators):

(a) a GPS location estimator 1540$a$ (not individually shown) for computing an MBS location estimate using GPS signals, (b) a location center location estimator 1540$b$ (not individually shown) for buffering and/or translating an MBS estimate received from the location center 142, (c) an MBS operator location estimator 1540$c$ (not individually shown) for buffering and/or translating manual MBS location entries received from an MBS location operator, and (d) in some MBS embodiments, an LBS location estimator 1540$d$ (not individually shown) for the activating and deactivating of LBSs 152. Note that, in high multipath areas and/or stationary base station marginal coverage areas, such low cost location base stations 152 (LBS) may be provided whose locations are fixed and accurately predetermined and whose signals are substantially only receivable within a relatively small range (e.g., 2000 feet), the range potentially being variable. Thus, by communicating with the LBS's 152 directly, the MBS 148 may be able to quickly use the location information relating to the location base stations for determining its location by using signal characteristics obtained from the LBSs 152.

Note that each of the MBS baseline location estimators 1540, such as those above, provide an actual MBS location rather than, for example, a change in an MBS location. Further note that it is an aspect of the present invention that additional MBS baseline location estimators 1540 may be easily integrated into the MBS location subsystem 1508 as such baseline location estimators become available. For example, a baseline location estimator that receives MBS location estimates from reflective codes provided, for example, on streets or street signs can be straightforwardly incorporated into the MBS location subsystem 1508.

Additionally, note that a plurality of MBS location technologies and their corresponding MBS location estimators are utilized due to the fact that there is currently no single location technology available that is both sufficiently fast, accurate and accessible in substantially all terrains to meet the location needs of an MBS 148. For example, in many terrains GPS technologies may be sufficiently accurate; however, GPS technologies: (a) may require a relatively long time to provide an initial location estimate (e.g., greater than 2 minutes); (b) when GPS communication is disturbed, it may require an equally long time to provide a new location estimate; (c) clouds, buildings and/or mountains can prevent location estimates from being obtained; (d) in some cases signal reflections can substantially skew a location estimate. As another example, an MBS 148 may be able to use triangulation or trilateralization technologies to obtain a location estimate; however, this assumes that there is sufficient (fixed location) infrastructure BS coverage in the area the MBS is located. Further, it is well known that the multipath phenomenon can substantially distort such location estimates. Thus, for an MBS 148 to be highly effective in varied terrains, an MBS is provided with a plurality of location technologies, each supplying an MBS location estimate.

In fact, much of the architecture of the location engine 139 could be incorporated into an MBS 148. For example, in some embodiments of the MBS 148, the following FOMs 1224 may have similar location models incorporated into the MBS:

(a) a variation of the TCSO FOM 1224 wherein TOA signals from communicating fixed location BS's are received (via the MBS transceiver 1512) by the MBS and used for providing a location estimate;

(b) a variation of the artificial neural net based FOMs 1224 (or more generally a location learning or a classification model) may be used to provide MBS location estimates via, for example, learned associations between fixed location BS signal characteristics and geographic locations;

(c) an LBS location FOM 1224 for providing an MBS with the ability to activate and deactivate LBS's to provide (positive) MBS location estimates as well as negative MBS location regions (i.e., regions where the MBS is unlikely to be since one or more LBS's are not detected by the MBS transceiver);

(d) one or more MBS location reasoning agents and/or a location estimate heuristic agents for resolving MBS location estimate conflicts and providing greater MBS location estimate accuracy. For example, modules similar to the analytical reasoner module 1416 and the historical location reasoner module 1424.

However, for those MBS location models requiring communication with the base station infrastructure, an alternative embodiment is to rely on the location center 142 to perform the computations for at least some of these MBS FOM models. That is, since each of the MBS location models mentioned immediately above require communication with the network of fixed location BS's 122 (152), it may be advantageous to transmit MBS location estimating data to the location center 142 as if the MBS were another MS 140 for the location center to locate, and thereby rely on the location estimation capabilities at the location center rather than duplicate such models in the MBS 148. The advantages of this approach are that:

(a) an MBS is likely to be able to use less expensive processing power and software than that of the location center;

(b) an MBS is likely to require substantially less memory, particularly for data bases, than that of the location center.

As will be discussed further below, in one embodiment of the MBS 148, there are confidence values assigned to the locations output by the various location estimators 1540. Thus, the confidence for a manual entry of location data by an MBS operator may be rated the highest and followed by the confidence for (any) GPS location data, followed by the confidence for (any) location center location 142 estimates, followed by the confidence for (any) location estimates using signal characteristic data from LBSs. However, such prioritization may vary depending on, for instance, the radio coverage area 120. In an one embodiment of the present invention, it is an aspect of the present invention that for MBS location data received from the GPS and location center, their confidences may vary according to the area in which the MBS 148 resides. That is, if it is known that for a given area, there is a reasonable probability that a GPS signal may suffer multipath distortions and that the location center has in the past provided reliable location estimates, then the confidences for these two location sources may be reversed.

In one embodiment of the present invention, MBS operators may be requested to occasionally manually enter the location of the MBS 148 when the MBS is stationary for determining and/or calibrating the accuracy of various MBS location estimators.

There is an additional important source of location information for the MBS 148 that is incorporated into an MBS vehicle (such as a police vehicle) that has no comparable functionality in the network of fixed location BS's. That is, the MBS 148 may use deadreckoning information provided by a deadreckoning MBS location estimator 1544 whereby the MBS may obtain MBS deadreckoning location change estimates. Accordingly, the deadreckoning MBS location estimator 1544 may use, for example, an on-board gyroscope 1550, a wheel rotation measurement device (e.g., odometer) 1554, and optionally an accelerometer (not shown). Thus, such a deadreckoning MBS location estimator 1544 periodically provides at least MBS distance and directional data related to MBS movements from a most recent MBS location estimate. More precisely, in the absence of any other new MBS location information, the deadreckoning MBS location estimator 1544 outputs a series of measurements, wherein each such measurement is an estimated change (or delta) in the position of the MBS 148 between a request input timestamp and a closest time prior to the timestamp, wherein a previous deadreckoning terminated. Thus, each deadreckoning location change estimate includes the following fields:

(a) an "earliest timestamp" field for designating the start time when the deadreckoning location change estimate commences measuring a change in the location of the MBS;

(b) a "latest timestamp" field for designating the end time when the deadreckoning location change estimate stops measuring a change in the location of the MBS; and (c) an MBS location change vector.

That is, the "latest timestamp" is the timestamp input with a request for deadreckoning location data, and the "earliest timestamp" is the timestamp of the closest time, T, prior to the latest timestamp, wherein a previous deadreckoning output has its a timestamp at a time equal to T.

Further, the frequency of such measurements provided by the deadreckoning subsystem 1527 may be adaptively provided depending on the velocity of the MBS 148 and/or the elapsed time since the most recent MBS location update. Accordingly, the architecture of at least some embodiments of the MBS location subsystem 1508 must be such that it can utilize such deadreckoning information for estimating the location of the MBS 148.

In one embodiment of the MBS location subsystem 1508 described in further detail hereinbelow, the outputs from the deadreckoning MBS location estimator 1544 are used to synchronize MBS location estimates from different MBS baseline location estimators. That is, since such a deadreckoning output may be requested for substantially any time from the deadreckoning MBS location estimator, such an output can be requested for substantially the same point in time as the occurrence of the signals from which a new MBS baseline location estimate is derived. Accordingly, such a deadreckoning output can be used to update other MBS location estimates not using the new MBS baseline location estimate.

It is assumed that the error with dead reckoning increases with deadreckoning distance. Accordingly, it is an aspect of the embodiment of the MBS location subsystem 1508 that when incrementally updating the location of the MBS 148 using deadreckoning and applying deadreckoning location change estimates to a "most likely area" in which the MBS 148 is believed to be, this area is incrementally enlarged as well as shifted. The enlargement of the area is used to account for the inaccuracy in the deadreckoning capability. Note, however, that the deadreckoning MBS location estimator is periodically reset so that the error accumulation in its outputs can be decreased. In particular, such resetting occurs when there is a high probability that the location of the MBS is known. For example, the deadreckoning MBS location estimator may be reset when an MBS operator manually enters an MBS location or verifies an MBS location, or a computed MBS location has sufficiently high confidence.

Thus, due to the MBS 148 having less accurate location information (both about itself and a target MS 140), and further that deadreckoning information must be utilized in maintaining MBS location estimates, a first embodiment of the MBS location subsystem architecture is somewhat different from the location engine 139 architecture. That is, the architecture of this first embodiment is simpler than that of the architecture of the location engine 139. However, it important to note that, at a high level, the architecture of the location engine 139 may also be applied for providing a second embodiment of the MBS location subsystem 1508, as one skilled in the art will appreciate after reflecting on the architectures and processing provided at an MBS 148. For example, an MBS location subsystem 1508 architecture may be provided that has one or more first order models 1224 whose output is supplied to, for example, a blackboard or expert system for resolving MBS location estimate conflicts, such an architecture being analogous to one embodiment of the location engine 139 architecture.

Furthermore, it is also an important aspect of the present invention that, at a high level, the MBS location subsystem architecture may also be applied as an alternative architecture for the location engine 139. For example, in one embodiment of the location engine 139, each of the first order models 1224 may provide its MS location hypothesis outputs to a corresponding "location track," analogous to the MBS location tracks described hereinbelow, and subsequently, a most likely MS current location estimate may be developed in a "current location track" (also described hereinbelow) using the most recent location estimates in other location tracks. Thus, the location estimating models of the location center 139 and those of the MBS 148 are may be interchanged depending on the where it is deemed most appropriate for such each such model to reside. Additionally, note that in different embodiments of the present invention, various combinations of the location center location architecture and the mobile station architecture may be utilized at either the location center or the MBS 148. Thus, by providing substantially all location estimating computational models at the location center 142, the models described here for locating the MBS 148 (and equivalently, its incorporated MS 140) can be used for locating other MSs 140 that are capable of supporting transmission of wireless signal measurements that relate to models requiring the additional electronics available at the MBS 140 (e.g., GPS or other satellite signals used for location).

Further, note that the ideas and methods discussed here relating to MBS location estimators 1540 and MBS location tracks, and, the related programs hereinbelow are sufficiently general so that these ideas and methods may be applied in a number of contexts related to determining the location of a device capable of movement and wherein the location of the device must be maintained in real time. For example, the present ideas and methods may be used by a robot in a very cluttered environment (e.g., a warehouse), wherein the robot has access: (a) to a plurality of "robot location estimators" that may provide the robot with sporadic location information, and (b) to a deadreckoning location estimator.

Each MBS 148, additionally, has a location display (denoted the MBS operator visual user interface 1558 in FIG. 11) where area maps that may be displayed together with location data. In particular, MS location data may be displayed on this display as a nested collection of areas, each smaller nested area being the most likely area within (any) encompassing area for locating a target MS 140. Note that the MBS controller algorithm below may be adapted to receive location center 142 data for displaying the locations of other MBSs 148 as well as target MSs 140.

Further, the MBS 148 may constrain any location estimates to streets on a street map using the MBS location snap to street module 1562. For example, an estimated MBS location not on a street may be "snapped to" a nearest street location. Note that a nearest street location determiner may use "normal" orientations of vehicles on streets as a constraint on the nearest street location. Particularly, if an MBS 148 is moving at typical rates of speed and acceleration, and without abrupt changes direction. For example, if the deadreckoning MBS location estimator 1544 indicates that the MBS 148 is moving in a northerly direction, then the street snapped to should be a north-south running street. Moreover, the MBS location snap to street module 1562 may also be used to enhance target MS location estimates when, for example, it is known or suspected that the target MS 140 is in a vehicle and the vehicle is moving at typical rates of speed. Furthermore, the snap to street location module 1562 may also be used in enhancing the location of a target MS 140 by either the MBS 148 or by the location engine 139. In particular, the location estimator 1344 or an additional module between the location estimator 1344 and the output gateway 1356 may utilize an embodiment of the snap to street location module 1562 to enhance the accuracy of target MS 140 location estimates that are known to be in vehicles. Note that this may be especially useful in locating stolen vehicles that have embedded wireless location transceivers (MSs 140), wherein appropriate wireless signal measurements can be provided to the location center 142.

MBS Data Structure Remarks

Figure 13:
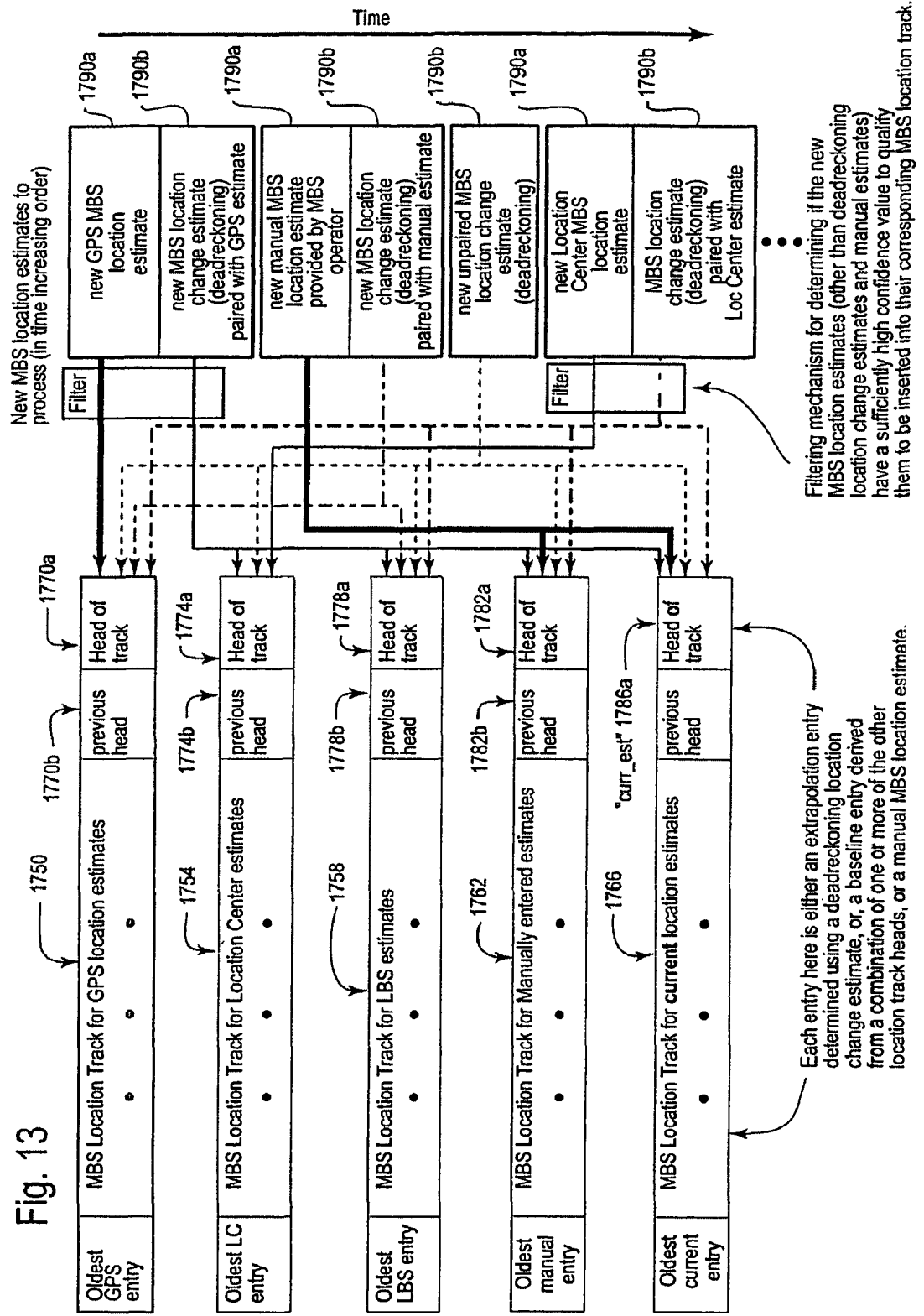
FIG. 13 is a high level diagram illustrating the data structural organization of the Mobile Base station capability for autonomously determining a most likely MBS location from a plurality of potentially conflicting MBS location estimating sources.
Figure 14:
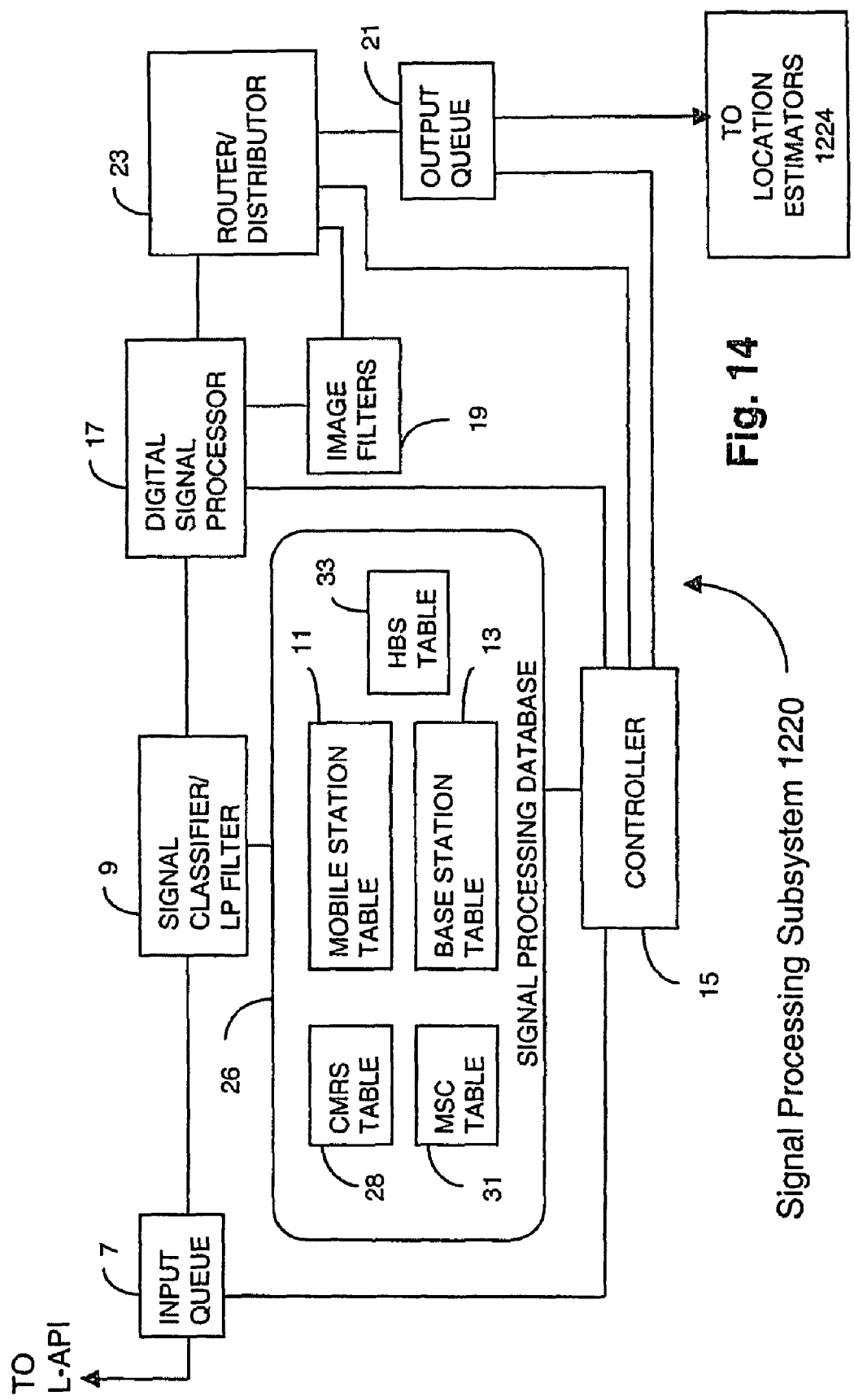
FIG. 14 illustrates the primary components of the signal processing subsystem.
Figure 15:
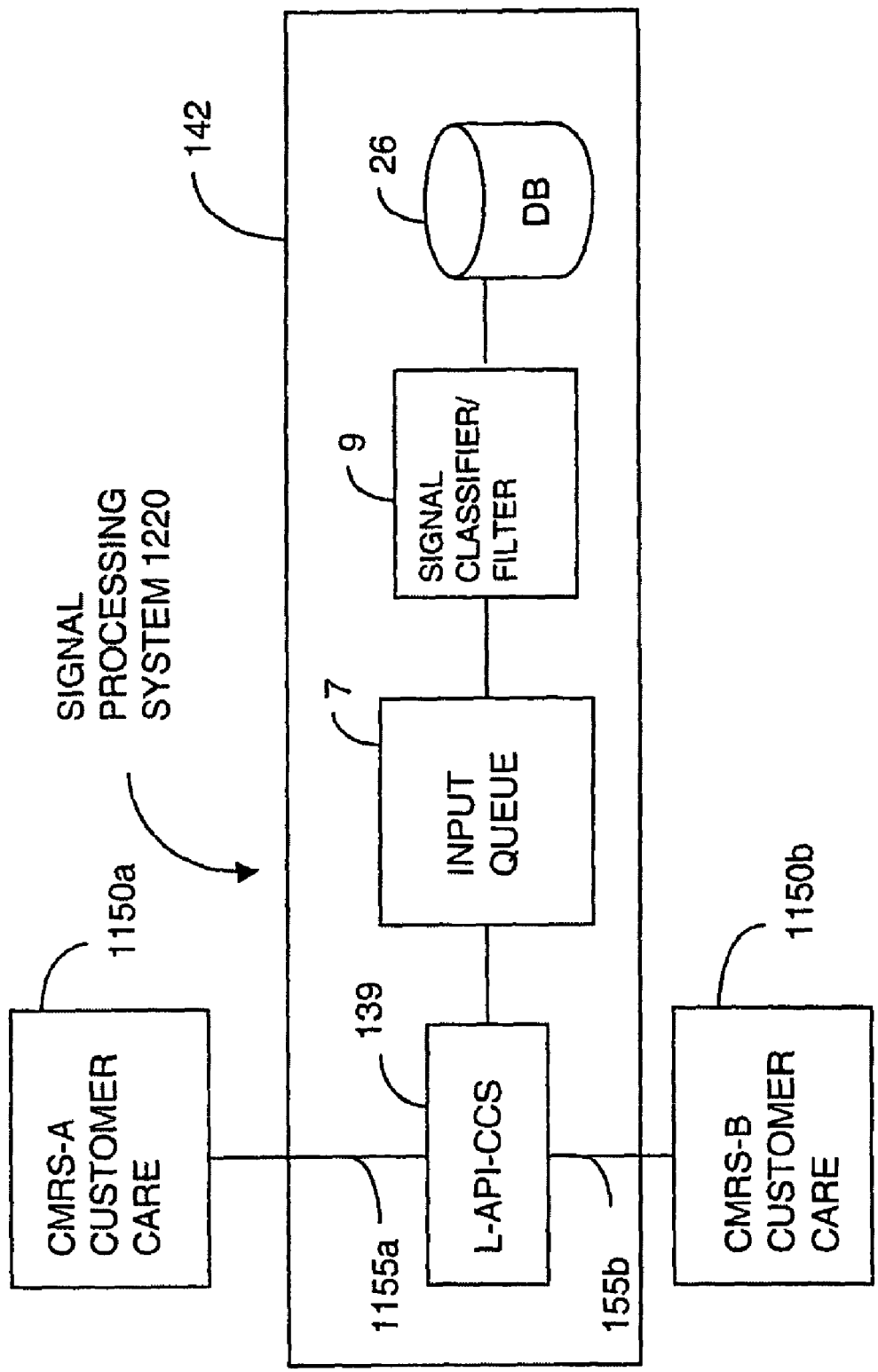
FIG. 15 illustrates how automatic provisioning of mobile station information from multiple CMRS occurs.

Assuming the existence of at least some of the location estimators 1540 that were mentioned above, the discussion here refers substantially to the data structures and their organization as illustrated in FIG. 13.

The location estimates (or hypotheses) for an MBS 148 determining its own location each have an error or range estimate associated with the MBS location estimate. That is, each such MBS location estimate includes a "most likely MBS point location" within a "most likely area". The "most likely MBS point location" is assumed herein to be the centroid of the "most likely area." In one embodiment of the MBS location subsystem 1508, a nested series of "most likely areas" may be provided about a most likely MBS point location. However, to simplify the discussion herein each MBS location estimate is assumed to have a single "most likely area". One skilled in the art will understand how to provide such nested "most likely areas" from the description herein. Additionally, it is assumed that such "most likely areas" are not grossly oblong; i.e., area cross sectioning lines through the centroid of the area do not have large differences in their lengths. For example, for any such "most likely area", A, no two such cross sectioning lines of A through the centroid thereof may have lengths that vary by more than a factor of five.

Each MBS location estimate also has a confidence associated therewith providing a measurement of the perceived accuracy of the MBS being in the "most likely area" of the location estimate.

A (MBS) "location track" is an data structure (or object) having a queue of a predetermined length for maintaining a temporal (timestamp) ordering of "location track entries" such as the location track entries 1770a, 1770b, 1774a, 1774b, 1778a, 1778b, 1782a, 1782b, and 1786a (FIG. 13), wherein each such MBS location track entry is an estimate of the location of the MBS at a particular corresponding time.

There is an MBS location track for storing MBS location entries obtained from MBS location estimation information from each of the MBS baseline location estimators described above (i.e., a GPS location track 1750 for storing MBS location estimations obtained from the GPS location estimator 1540, a location center location track 1754 for storing MBS location estimations obtained from the location estimator 1540 deriving its MBS location estimates from the location center 142, an LBS location track 1758 for storing MBS location estimations obtained from the location estimator 1540 deriving its MBS location estimates from base stations 122 and/or 152, and a manual location track 1762 for MBS operator entered MBS locations). Additionally, there is one further location track, denoted the "current location track" 1766 whose location track entries may be derived from the entries in the other location tracks (described further hereinbelow). Further, for each location track, there is a location track head that is the head of the queue for the location track. The location track head is the most recent (and presumably the most accurate) MBS location estimate residing in the location track. Thus, for the GPS location track 1750 has location track head 1770; the location center location track 1754 has location track head 1774; the LBS location track 1758 has location track head 1778; the manual location track 1762 has location track head 1782; and the current location track 1766 has location track head 1786. Additionally, for notational convenience, for each location track, the time series of previous MBS location estimations (i.e., location track entries) in the location track will herein be denoted the "path for the location track." Such paths are typically the length of the location track queue containing the path. Note that the length of each such queue may be determined using at least the following considerations:

(i) In certain circumstances (described hereinbelow), the location track entries are removed from the head of the location track queues so that location adjustments may be made. In such a case, it may be advantageous for the length of such queues to be greater than the number of entries that are expected to be removed;

(ii) In determining an MBS location estimate, it may be desirable in some embodiments to provide new location estimates based on paths associated with previous MBS location estimates provided in the corresponding location track queue.

Also note that it is within the scope of the present invention that the location track queue lengths may be a length of one.

Regarding location track entries, each location track entry includes:

(a) a "derived location estimate" for the MBS that is derived using at least one of:

(i) at least a most recent previous output from an MBS baseline location estimator 1540 (i.e., the output being an MBS location estimate);

(ii) deadreckoning output information from the deadreckoning subsystem 1527. Further note that each output from an MBS location estimator has a "type" field that is used for identifying the MBS location estimator of the output.

(b) an "earliest timestamp" providing the time/date when the earliest MBS location information upon which the derived location estimate for the MBS depends. Note this will typically be the timestamp of the earliest MBS location estimate (from an MBS baseline location estimator) that supplied MBS location information used in deriving the derived location estimate for the MBS 148.

(c) a "latest timestamp" providing the time/date when the latest MBS location information upon which the derived location estimate for the MBS depends. Note that earliest timestamp=latest timestamp only for so called "baseline entries" as defined hereinbelow. Further note that this attribute is the one used for maintaining the "temporal (timestamp) ordering" of location track entries.

(d) A "deadreckoning distance" indicating the total distance (e.g., wheel turns or odometer difference) since the most recently previous baseline entry for the corresponding MBS location estimator for the location track to which the location track entry is assigned.

For each MBS location track, there are two categories of MBS location track entries that may be inserted into a MBS location track:

(a) "baseline" entries, wherein each such baseline entry includes (depending on the location track) a location estimate for the MBS 148 derived from: (i) a most recent previous output either from a corresponding MBS baseline location estimator, or (ii) from the baseline entries of other location tracks (this latter case being the for the "current" location track);

(b) "extrapolation" entries, wherein each such entry includes an MBS location estimate that has been extrapolated from the (most recent) location track head for the location track (i.e., based on the track head whose "latest timestamp" immediately precedes the latest timestamp of the extrapolation entry). Each such extrapolation entry is computed by using data from a related deadreckoning location change estimate output from the deadreckoning MBS location estimator 1544. Each such deadreckoning location change estimate includes measurements related to changes or deltas in the location of the MBS 148. More precisely, for each location track, each extrapolation entry is determined using: (i) a baseline entry, and (ii) a set of one or more (i.e., all later occurring) deadreckoning location change estimates in increasing "latest timestamp" order. Note that for notational convenience this set of one or more deadreckoning location change estimates will be denoted the "deadreckoning location change estimate set" associated with the extrapolation entry resulting from this set.

(c) Note that for each location track head, it is either a baseline entry or an extrapolation entry. Further, for each extrapolation entry, there is a most recent baseline entry, B, that is earlier than the extrapolation entry and it is this B from which the extrapolation entry was extrapolated. This earlier baseline entry, B, is hereinafter denoted the "baseline entry associated with the extrapolation entry." More generally, for each location track entry, T, there is a most recent previous baseline entry, B, associated with T, wherein if T is an extrapolation entry, then B is as defined above, else if T is a baseline entry itself, then T=B. Accordingly, note that for each extrapolation entry that is the head of a location track, there is a most recent baseline entry associated with the extrapolation entry.

Further, there are two categories of location tracks:

(a) "baseline location tracks," each having baseline entries exclusively from a single predetermined MBS baseline location estimator; and (b) a "current" MBS location track having entries that are computed or determined as "most likely" MBS location estimates from entries in the other MBS location tracks.

MBS Location Estimating Strategy

In order to be able to properly compare the track heads to determine the most likely MBS location estimate it is an aspect of the present invention that the track heads of all location tracks include MBS location estimates that are for substantially the same (latest) timestamp. However, the MBS location information from each MBS baseline location estimator is inherently substantially unpredictable and unsynchronized. In fact, the only MBS location information that may be considered predicable and controllable is the deadreckoning location change estimates from the deadreckoning MBS location estimator 1544 in that these estimates may reliably be obtained whenever there is a query from the location controller 1535 for the most recent estimate in the change of the location for the MBS 148. Consequently (referring to FIG. 13), synchronization records 1790 (having at least a 1790*b* portion, and in some cases also having a 1790*a* portion) may be provided for updating each location track with a new MBS location estimate as a new track head. In particular, each synchronization record includes a deadreckoning location change estimate to be used in updating all but at most one of the location track heads with a new MBS location estimate by using a deadreckoning location change estimate in conjunction with each MBS location estimate from an MBS baseline location estimator, the location track heads may be synchronized according to timestamp. More precisely, for each MBS location estimate, E, from an MBS baseline location estimator, the present invention also substantially simultaneously queries the deadreckoning MBS location estimator for a corresponding most recent change in the location of the MBS 148. Accordingly, E and the retrieved MBS deadreckoning location change estimate, C, have substantially the same "latest timestamp". Thus, the location estimate E may be used to create a new baseline track head for the location track having the corresponding type for E, and C may be used to create a corresponding extrapolation entry as the head of each of the other location tracks. Accordingly, since for each MBS location estimate, E, there is a MBS deadreckoning location change estimate, C, having substantially the same "latest timestamp", E and C will be hereinafter referred as "paired."

Wireless Location Applications

Such wireless location applications as were briefly described above in reference to the gateway 142 will now be described in further detail. Note that the following location related services are considered within the scope of the invention, and such services can, in general, be provided without use of a gateway 142, albeit, e.g., in a likely more restricted context wherein not all available wireless location estimating techniques are utilized, and/or by multiplying the number of interfaces to geolocation service providers (e.g., distinct wireless location interfaces are provided directly to each wireless location service provider utilized).

Routing Applications

Routing For Personal Services.

In one noteworthy routing application, hotels and other personal service providers, such as auto rental agencies, hotels, resorts and cruise ships may provide an inexpensive MS 140 that can be used substantially only for contacting: (i) the personal service, (ii) emergency services, and/or (iii) receiving directions to return to the personal service. Accordingly, the MS 140 may be wirelessly located during operations (ii) and (iii) via wireless communications between the MS 140 and a local commercial wireless service provider wherein a request to locate the MS 140 is provided to, e.g., the gateway 142, and the resulting MS location estimate is: provided to a public safety emergency center (e.g., E911) for dispatching emergency services, or provided to a mapping and routing system such as provided by MapInfo or disclosed in the LeBlanc et. al. patent application filed Jan. 22, 1999 and having U.S. Pat. No. 6,236,365 (which is fully incorporated herein by reference) so that the MS 140 user may be routed safely and expeditiously to a predetermined location of the personal service. Note that data representing the location of the personal service can be associated with an identification of the MS 140 so that MS activation for (iii) above results in one or more audio and/or visual presentations of directions for directing the user to return to the personal service.

Tracking At Predetermined Times/Schedules.

The MS 140 and the MS location providing wireless network (e.g., a CMRS, a PSTN 124 or the Internet 468) may also provide the MS user with the ability to explicitly request to be substantially continuously tracked, wherein the MS tracked locations are stored for access by those having permission (e.g., the user, parents and/or associates of the user). Additionally, the velocity and/or expected time of arrival at a predetermined destination may be derived from such tracking and may be provided to the user or his/her associates (e.g., employer, friends, and/or family). Further, note that this tracking and notification of information obtained therefrom may be provided via a commercial telephony or Internet enabled mobile station, or a mobile station in operable communication with a short messaging service. For example, the MS registered owner may provide permissions for those able to access such MS tracking information so that such information can be automatically provided to certain associates and/or provided on request to certain associates. Additionally, note that the MS 140 and the MS location providing wireless network may also allow the MS user to deactivate such MS tracking functionality. In one embodiment, an MS user may activate such tracking for his/her MS 140 during working hours and deactivate such tracking during non-working hours. Accordingly, an employer can then track employee's whereabouts during work hours, while the employee is able to retain his/her location privacy when not working although the employer may be still able to contact the employee in case of an emergency during the employee's non-working time. Note, that this location capability and method of obtaining location information about an MS user while assuring privacy at other times may be useful for appropriately monitoring in personnel in the military, hospitals, transportation services (e.g., for couriers, bus and taxis drivers), telecommunications personnel, emergency rescue and correctional institution personnel. Further, note that this selective MS location capability may be performed in a number of ways. For example, the MS 140 may activate and deactivate such tracking by dialing a predetermined number (e.g., by manually or speed dialing the number) for switching between activation of a process that periodically requests a wireless location of the MS 140 from, e.g., the location gateway 142. Note that the resulting MS location information may be made available to other users at a predetermined phone number, Internet address or having sufficient validation information (e.g., a password). Alternatively, the MS location providing wireless network may automatically activate such MS tracking for predetermined times of the day and for predetermined days of the week. Note that this latter embodiment may be particularly useful for both tracking employees, e.g., at large construction sites, and, e.g., determining when each employee is at his/her work site. Thus, in this embodiment, the MS location providing wireless network may provide database storage of times and days of the week for activation and deactivation of this selective MS tracking capability that is accessible via, e.g., a network service control point 104 (or other telephony network control points as one skilled in the art will understand), wherein triggers may be provided within the database for generating a network message (to, e.g., the gateway 142) requesting the commencement of tracking the MS 140 or the deactivation of such tracking. Accordingly, the resulting MS location information may be provided to an employer's tracking and payroll system so that the employer is able to determine the actual time an employee arrives at and leaves a work location site.

Register Locations For Later Routing Thereto.

In another routing related application of the present invention, an MS 140 and the MS location providing wireless network may provide the MS user with functionality to register certain locations so that data representing such locations can be easily accessed for use at a later time. For example, the MS 140 user may be staying at a hotel in an unfamiliar area. Accordingly, using the present capability of the invention, the user can request, via his/her MS 140, that his/her location at the hotel be determined and registered so that it is available at a later time for routing the user back to the hotel. In fact, the user may have personal location registrations of a plurality of locations in various cities and countries so that when traveling the user has wireless access to directions to preferred locations such as his/her hotel, preferred restaurants, shopping areas, scenic areas, rendezvous points, theatres, athletic events, churches, entertainment establishments, locations of acquaintances, etc. Note, that such personal location registration information may reside primarily on the user's subscriber network, but upon the MS user's request, his/her personal location registrations may be transmitted to another network from which the user is receiving wireless services as a roamer. Moreover, any new location registrations (or deletions) may be duplicated in the user's personal registration of the user's subscriber network. However, in some instances an MS user may wish to retain such registered locations only temporarily while the user is in a particular area; e.g., a predetermined network coverage area. Accordingly, the MS user may indicate (or such may be the default) that a new personal location registration be retained for a particular length of time, and/or until a location of the user is outside the area to which such new location registrations appear to be applicable. However, prior to deleting any such registrations, the MS user may be queried to confirm such deletions. For example, if the MS user has new location registrations for the Dallas, Tex. area, and the MS user subsequently travels to London, then upon the first wireless location performed by the MS user for location registration services, the MS user may be queried as whether to save the new Dallas, Tex. location registrations permanently, for an particular length of time (e.g. 30 days), or delete all or selected portions thereof.

Other routing related applications of the present invention are for security (e.g., tracking how do I get back to my hotel safely), and, e.g., sight seeing guided tour where there is interactivity depending on feedback from users.

Advertising Applications

Advertising may be directed to an MS 140 according to its location. In at least some studies it is believed that MS 140 users do not respond well to unsolicited wireless advertisement whether location based or otherwise. However, in response to certain user queries for locally available merchandise, certain advertisements may be viewed as more friendly. Thus, by allowing an MS user to contact, e.g., a wireless advertising portal by voice or via wireless Internet, and describe certain products or services desired (e.g., via interacting with an automated speech interaction unit), the user may be able to describe and receive (at his/her MS 140) audio and/or visual presentations of such products or services that may satisfy such a user's request. For example, a user may enter a request: "I need a Hawaiian shirt, who has such shirts near here?"

In the area of advertising, the present invention has advantages both for the MS user (as well as the wireline user), and for product and service providers that are nearby to the MS user. For instance, an MS user may be provided with (or request) a default set of advertisements for an area when the MS user enters the area, registers with a hotel in the area, or makes a purchase in the area, and/or requests information about a particular product or service in the area. Moreover, there may be different collections of advertisements for MS users that are believed to have different demographic profiles and/or purposes for being in the area. Accordingly, an MS whose location is being determined periodically may be monitored by an advertisement wizard such that this wizard may maintain a collection of the MS user's preferences, and needs so that when the MS user comes near a business that can satisfy such a preference or need, then an advertisement relating to the fulfillment of the preference or need may be presented to the MS user. However, it is an aspect of the invention that such potential advertising presentations be intelligently selected using as much information about the user as is available. In particular, in one embodiment of the invention MS user preferences and needs may be ordered according to importance. Moreover, such user preferences and needs may be categorized by temporal importance (i.e., must be satisfied within a particular time frame, e g , immediately, today, or next month) and by situational importance wherein user preferences and needs in this category are less time critical (e.g., do not have to be satisfied immediately, and/or within a specified time period), but if certain criteria are met the user will consider satisfying such a preference or need. Thus, finding a Chinese restaurant for dinner may be in the temporal importance category while purchasing a bicycle and a new pair of athletic shoes may be ordered as listed here in the situational category. Accordingly, advertisements for Chinese restaurants may be provided to the user at least partially dependent upon the user's location. Thus, once such a restaurant is selected and routing directions are determined, then the advertising wizard may examine advertisements or other available product inventories and/or services that are within a predetermined distance of the route to the restaurant for determining whether there is product or service along the route that could potentially satisfy one of the user's preferences or needs from the situational importance category. If so, then the MS user may be provided with the option of examining such product or service information and registering the locations of user selected businesses providing such products or services. Accordingly, the route to the restaurant may be modified to incorporate detours to one or more of these selected businesses. Of course, an MS user's situationally categorized preferences and needs may allow the MS user to receive unrequested advertising during other situations as well. Thus, whenever an MS user is moving, such an advertisement wizard (e.g., if activated by the user) may attempt to satisfy the MS user's preferences and needs by presenting to the user advertisements of nearby merchants that appear to be directed to such user preferences and needs.

Accordingly, for MS user preferences and needs, the wizard will attempt to present information (e.g., advertisements, coupons, discounts, product price and quality comparisons) related to products and/or services that may satisfy the user's corresponding preference or need: (a) within the time frame designated by the MS user when identified as having a temporal constraint, and/or (b) consistent with situational criteria provided by the MS user (e.g., item on sale, item is less than a specified amount, within a predetermined traveling distance and/or traveling time) when identified as having a situational constraint. Moreover, such information may be dependent on the geolocation of both the user and a merchant(s) having such products and/or services. Additionally, such information may be dependent on a proposed or expected user route (e.g., a route to work, a trip route). Thus, items in the temporal category are ordered according to how urgent must a preference or need must be satisfied, while items in the situational category may be substantially unordered and/or ordered according to desirableness (e.g., an MS user might want a motorcycle of a particular make and maximum price, but want a new car more). However, since items in the situational category may be fulfilled by substantially serendipitous circumstances detected by the wizard, various orderings or no ordering may be used. Thus, e.g., if the MS user travels from one commercial area to another, the wizard may compare a new collection of merchant products and/or services against the items on an MS user's temporal and situational lists, and at least alert the MS user that there may be new information available about a user desired service or product which is within a predetermined traveling time from where the user is. Note that such alerts may be visual (e.g., textual, or iconic) displays, or audio presentations using, e.g., synthesized speech (such as "Discounted motorcycles ahead three blocks at Cydes Cycles").

Electronic Yellow Pages.

Figure 19:
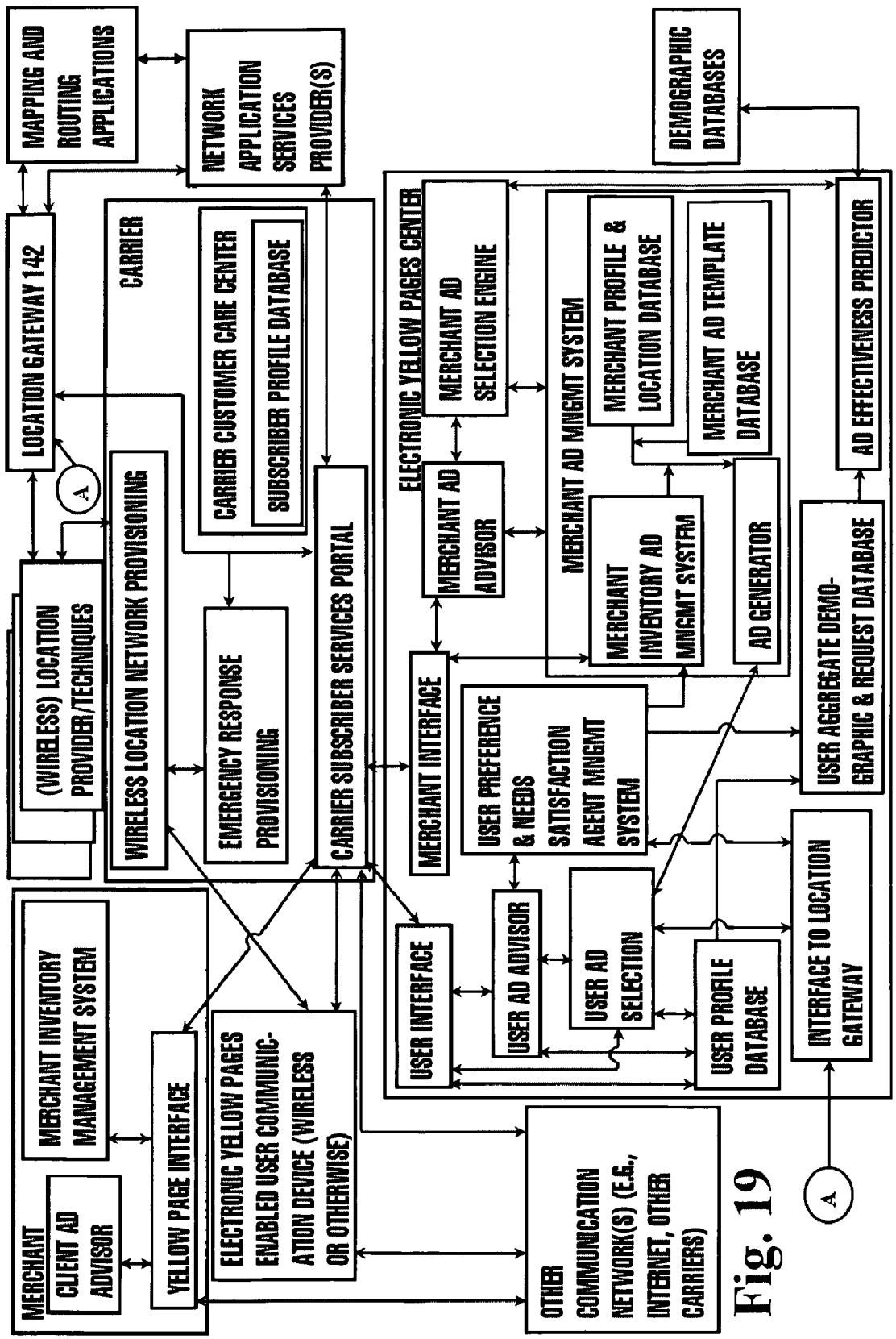
FIG. 19 is a block diagram of an electronic networked yellow pages for providing intelligent advertising services, wherein wireless location services may be utilized.

Note that the advertising aspects of the present invention may be utilized by an intelligent electronic yellow pages which can utilize the MS user's location (and/or anticipated locations; e.g., due to roadways being traversed) together with user preferences and needs (as well as other constraints) to both intelligently respond to user requests as well as intelligently anticipate user preferences and needs. A block diagram showing the high level components of an electronic yellow pages according to this aspect of the present invention is shown in FIG. 19. Accordingly, in one aspect of the present invention advertising is user driven in that the MS user is able to select advertising based on attributes such as: merchant proximity, traffic/parking conditions, the product/service desired, quality ratings, price, user merchant preferences, product/service availability, coupons and/or discounts. That is, the MS user may be able to determine an ordering of advertisements presented based on, e.g., his/her selection inputs for categorizing such attributes. For example, the MS user may request advertisements of athletic shoes be ordered according to the following values: (a) within 20 minutes travel time of the MS user's current location, (b) midrange in price, (c) currently in stock, and (d) no preferred merchants. Note that in providing advertisements according to the MS user's criteria, the electronic yellow pages may have to make certain assumptions such as if the MS user does not specify a time for being at the merchant, the electronic yellow pages may default the time to a range of times somewhat longer than the travel time thereby going on the assumption that MS user will likely be traveling to an advertised merchant relatively soon. Accordingly, the electronic yellow pages may also check stored data on the merchant (e.g., in the merchant profile & location database of FIG. 19) to assure that the MS user can access the merchant once the MS user arrives at the merchant's location (e.g., that the merchant is open for business). Accordingly, the MS user may dynamically, and in real time, vary such advertising selection parameters for thereby substantially immediately changing the advertising being provided to the user's MS. For example, the MS display may provide an area for entering an identification of a product/service name wherein the network determines a list of related or complementary products/services. Accordingly, if an MS user desires to purchase a wedding gift, and knows that the couple to be wed are planning a trip to Australia, then upon the MS user providing input in response to activating a "related products/services" feature, and then inputting, e.g., "trip to Australia" (as well as any other voluntary information indicating that the purchase is for: a gift, for a wedding, and/or a price of less than $100.00), then the intelligent yellow pages may be able to respond with advertisements for related products/services such as portable electric power converter for personal appliances that is available from a merchant local (and/or non-local) to the MS user. Moreover, such related products/services (and/or "suggestion") functionality may be interactive with the MS user. For example, there may be a network response to the MS user's above gift inquiry such as "type of gift: conventional or unconventional?". Moreover, the network may inquire as to the maximum travel time (or distance) the MS user is willing to devote to finding a desired product/service, and/or the maximum travel time (or distance) the MS user is willing to devote to visiting any one merchant. Note that in one embodiment of the electronic yellow pages, priorities may be provided by the MS user as to a presentation ordering of advertisements, wherein such ordering may be by: price Note that various aspects of such an electronic yellow pages described herein are not constrained to using the MS user's location. In general, the MS user's location is but one attribute that can be intelligently used for providing users with targeted advertising, and importantly, advertising that is perceived as informative and/or addresses current user preferences and needs. Accordingly, such electronic yellow page aspects of the present invention that are not related to a change in the MS user's location over time also apply to stationary communication stations such home computers wherein, e.g., such electronic yellow pages are accessed via the Internet. Additionally, the MS user may be able to adjust, e.g., via iconic selection switches (e.g., buttons or toggles) and icon range specifiers (e.g., slider bars) the relevancy and a corresponding range for various purchasing criteria. In particular, once a parameter is indicated as relevant (e.g., via activating a toggle switch), a slider bar may be used for indicating a relative or absolute value for the parameter. Thus, parameter values may be for:: product/service quality ratings (e.g., display given to highest quality), price (low comparable price to high comparable price), travel time (maximum estimated time to get to merchant), parking conditions.

Accordingly, such electronic yellow pages may include the following functionality:
- (a) dynamically change as the user travels from one commercial area to another when the MS user's location is periodically determined such that local merchant's are given preference;
- (b) routing instructions are provided to the MS user when a merchant is selected;
- (c) provide dynamically generated advertising that is related to an MS user's preferences or needs. For example, if an MS user wishes to purchase a new dining room set, then such an electronic yellow pages may dynamically generate advertisements (e.g., via the ad generation component of the merchant ad management system of FIG. 19) with dining room sets therein for merchants that sell them. Note that this aspect of the present invention can be accomplished by having, e.g., a predetermined collection of advertising templates (e.g., in the merchant ad template database, FIG. 19) that are assigned to particular areas of an MS user's display wherein the advertising information is selected according to the item(s) that the MS user has expressed a preference or desire to purchase, and additionally, according to the user's location, the user's preferred merchants, and/or the item's price, quality, as well as coupons, and/or discounts that may be provided. Thus, such displays may have a plurality of small advertisements that may be selected for hyperlinking to more detailed advertising information related to a product or service the MS user desires. Note that this aspect of the present invention may, in one embodiment, provide displays (and/or corresponding audio information) that is similar to Internet page displays. However, such advertising may dynamically change with the MS user's location such that MS user preferences and needs for an item(s) (including services) having higher priority are given advertisement preference on the MS display when the MS user comes within a determined proximity of the merchant offering the item. Moreover, the MS user may be able dynamically reprioritize the advertising displayed and/or change a proximity constraint so that different advertisements are displayed. Furthermore, the MS user may be able to request advertising information on a specified number of nearest merchants that provide a particular category of products or services. For example, an MS user may be able to request advertising on the three nearest Chinese restaurants that have a particular quality rating.
- (d) information about MS users' preferences and needs may be supplied to yellow page merchants regarding MS users that reside and/or travel nearby yellow page subscriber merchant locations as described hereinabove FIG. 19 (Block Diagram Of Electronic Yellow Pages).

The following is a high level description of some of the components shown in FIG. 19 of an illustrative embodiment of the electronic yellow pages of the present invention.
- a. Electronic yellow pages center: Assists both the users and the merchants in providing more useful advertising for enhancing business transactions. The electronic yellow pages center may be a regional center within the carrier, or (as shown) an enterprise separate from the carrier. The center receives input from users regarding preferences and needs which are first received by the user interface.
- b. User interface: Receives input from a user that validates the user via password, voice identification, or other biometric capability for identifying the user. Note that the identification of the user's communication device (e.g., phone number) is also provided. For a user contact, the user interface does one of: (a) validates the user thereby allowing user access to further electronic yellow page services, (b) requests additional validation information from the user, or (c) invalidates the user and rejects access to electronic yellow pages. Note that the user interface retrieves user identification information from the user profile database (described hereinbelow), and allows a validated user to add, delete, and/or modify such user identification information.
- c. User ad advisor: Provides user interface and interactions with the user. Receives an identification/description of the user's communication device for determining an appropriate user communication technique. Note that the user ad advisor may also query (any) user profile available (using the user's identity) for determining a preferred user communication technique supported by the user's communication device. For example, if the user's communication device supports visual presentations, then the user ad advisor defaults to visual presentations unless there are additional constraints that preclude providing such visual presentations. In particular, the user may request only audio ad presentations, or merely graphical pages without video. Additionally, if the user's communication device supports speech recognition, then the user ad advisor may interact with the user solely via verbal interactions. Note that such purely verbal interactions may be preferable in some circumstances such as when the user can not safely view a visual presentation; e.g., when driving. Further note that the user's communication device may sense when it is electronically connected to a vehicle and provide such sensor information to the user ad advisor so that this module will then default to only a verbal presentation unless the user requests otherwise. Accordingly, the user ad advisor includes a speech recognition unit (not shown) as well as a presentation manager (not shown) for outputting ads in a form compatible both with the functional capabilities of the user's communication device and with the user's interaction preference.

Note that the user ad advisor communicates: (a) with the user ad selection engine for selecting advertisements to be presented to the user, (b) with the user profile database for inputting thereto substantially persistent user personal information that can be used by the user ad selection engine, and for retrieving user preferences such as media preference(s) for presentations of advertisements, and (c) with the user preference and needs satisfaction agents for instantiating intelligent agents (e.g., database triggers, initiating merchant requests for a product/service to satisfy a user preference or need) of the user preference & needs satisfaction agent management system shown in FIG. 19.

Also note that in some embodiments of the present invention, the user ad advisor may also interact with a user for obtaining feedback regarding: (a) whether the advertisements presented, the merchants represented, and/or the products/services offered are deemed appropriate by the user, and (b) the satisfaction with a merchant with which the user has interactions. In particular, such feedback may be initiated and/or controlled substantially by the user preference and needs satisfaction agent management system (described hereinbelow).
- d. User profile database: A database management system for accessing and retaining user identification information, user personal information, and identification of the user's communication device (e.g., make, model, and/or software version(s) being used). Note that the user profile database may contain information about the user that is substantially persistent; e.g., preferences for: language (e.g., English, Spanish, etc.), ad presentation media (e.g., spoken, textual, graphical, and/or video), maximum traveling time/distance for user preferences and needs of temporal importance (e.g., what is considered "near" to the user), user demographic information (e.g., purchasing history, income, residential address, age, sex, ethnicity, marital status, family statistics such as number of children and their ages), and merchant preferences/preclusions (e.g., user prefers one restaurant chain over another, or the user wants no advertisements from a particular merchant).

e. User ad selection engine (also referred to as "user ad selection" in FIG. 19): This module selects advertisements that are deemed appropriate to the user's preferences and needs. In particular, this module determines the categories and presentation order of advertisements to be presented to the user. To perform this task, the user ad selection engine uses a user's profile information (from the user profile database), a current user request (via the user ad advisor), and/or the user's current geolocation (via the interface to the location gateway 142). Thus, for a user requesting the location of an Italian restaurant within ½ mile of the user's current location, in a medium price range, and accepting out of town checks, the user ad selection engine identifies the ad criteria within the user's request, and determines the advertising categories (and/or values thereof) from which advertisements are desired.

Note that the user ad selection engine can suggest advertisement categories and/or values thereof to the user if requested to do so.

Traveling & Ad Wizards.

When an MS 140 appears to be traveling an extended distance through a plurality of areas (as determined, e.g., by recent MS locations along an interstate that traverse a plurality of areas), then upon entering each new area having a new collection of location registrations (and possibly a new location registration wizard) may be provided. For example, a new default set of local location registrations may become available to the user. Accordingly, the user may be notified that new temporary location registrations are available for the MS user to access if desired. For example, such notification may be a color change on a video display indicating that new temporary registrations are available. Moreover, if the MS user has a personal profile that also is accessible by a location registration wizard, then the wizard may provide advertising for local businesses and services that are expected to better meet the MS user's tastes and needs. Thus, if such a wizard knows that the MS user prefers fine Italian food but does not want to travel more than 20 minutes by auto from his/her hotel to reach a restaurant, then advertisements for restaurants satisfying such criteria will become available to the user. However, MS users may also remain anonymous to such wizards.

Note, that by retaining MS user preferences and needs, if permission is provided, e.g., for anonymously capturing such user information, this information could be provided to merchants. Thus, merchants can get an understanding of what nearby MS user's would like to purchase (and under what conditions, e.g., an electric fan for less than $10). Note such user's may be traveling through the area, or user's may live nearby. Accordingly, it is a feature of the present invention to provide merchant's with MS user preferences and needs according to whether the MS user is a passerby or lives nearby so that the merchant can better target his/her advertising.

In one embodiment, a single wizard may be used over the coverage area of a CMRS and the database of local businesses and services changes as the MS user travels from one location registration area to another. Moreover, such a wizard may determine the frequency and when requests for MS locations are provided to the gateway 142. For example, such databases of local businesses and services may be coincident with LATA boundaries. Additionally, the wizard may take into account the direction and roadway the MS 140 is traveling so that, e.g., only businesses within a predetermined area and preferably in the direction of travel of the MS 140 are candidates to have advertising displayed to the MS user.

Figure 20A:
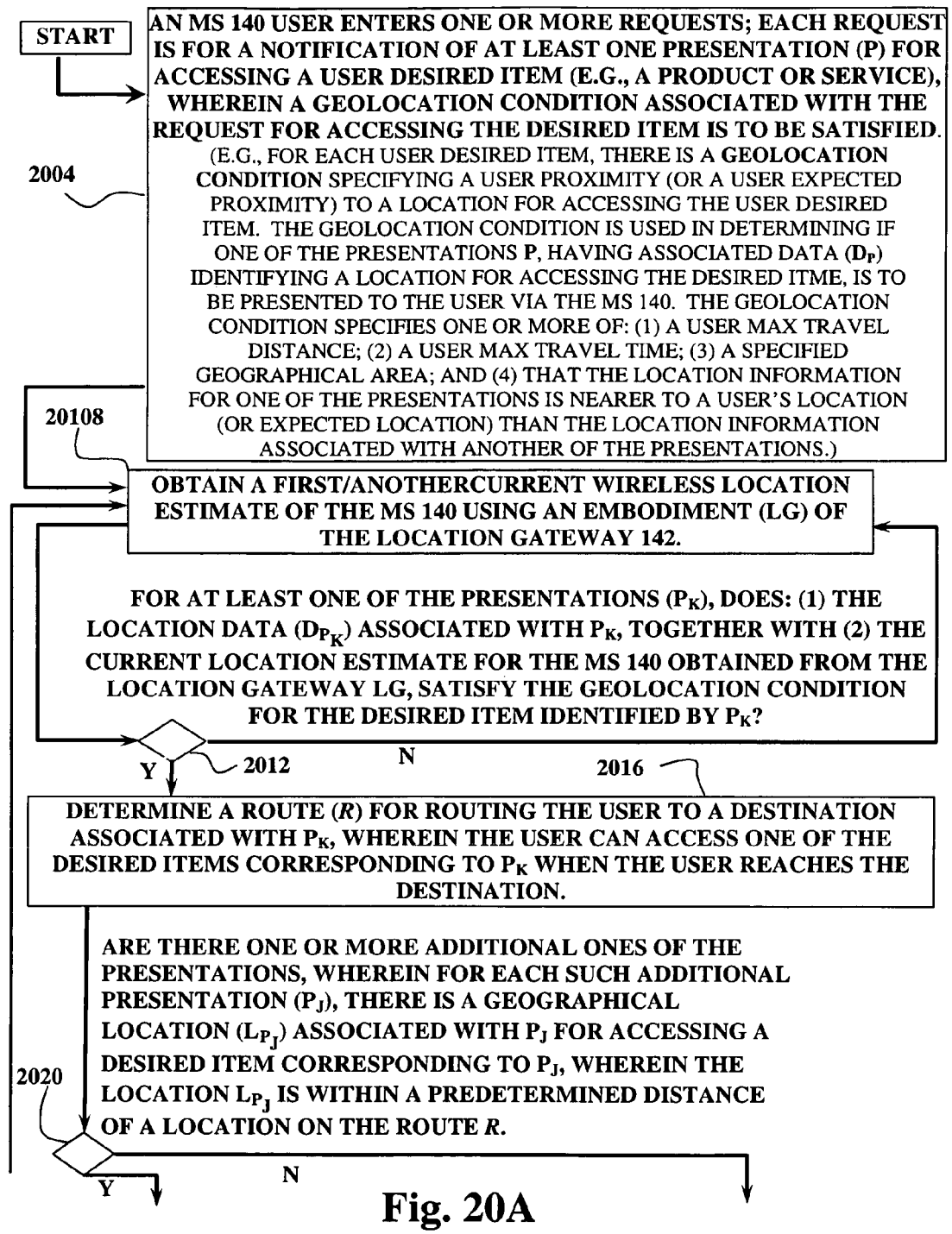
FIGS. 20A and 20B show a flowchart of the steps performed for routing a user along a route that includes a plurality of locations where the user can access a desired item (product or service) at each of the plurality of locations.
Figure 20B:
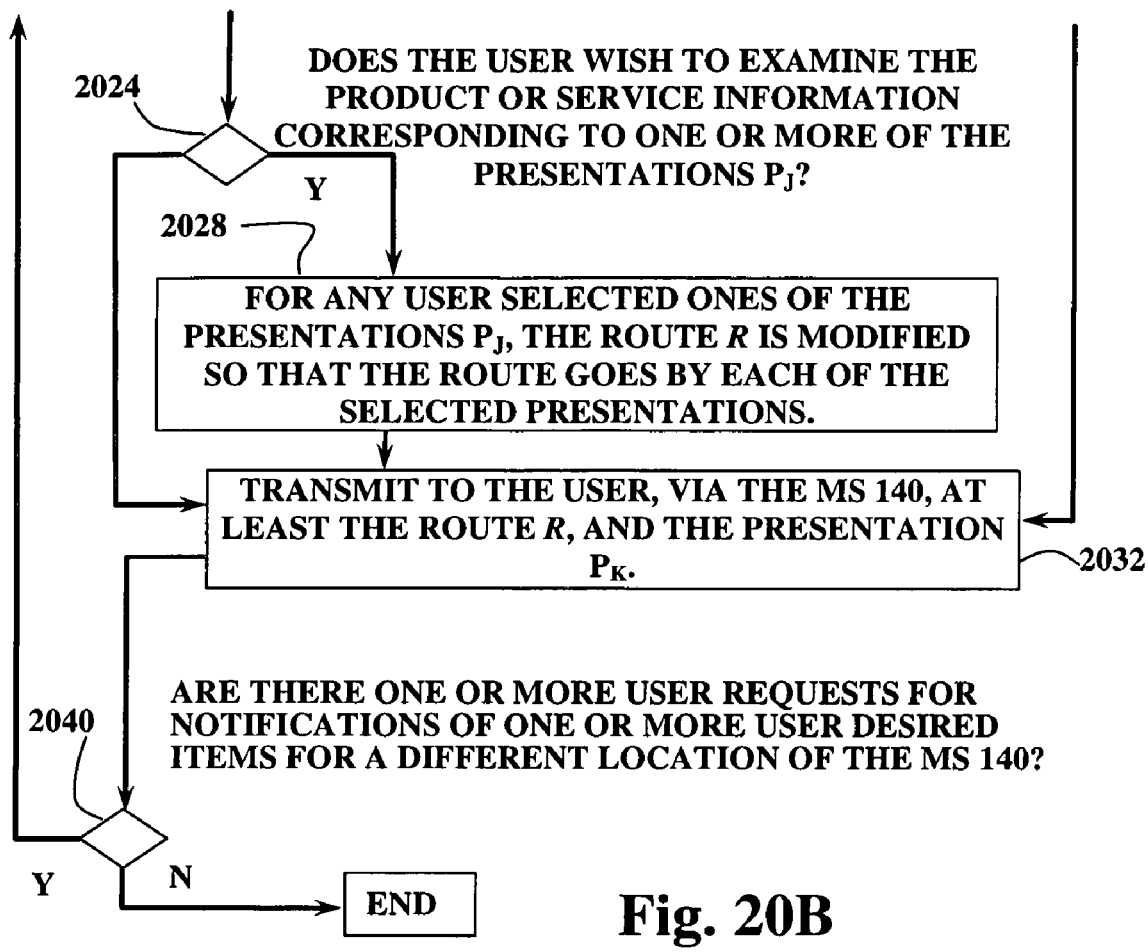

Flowcharts for Routing Applications. The flowchart of FIGS. 20A and 20B is illustrative of the steps performed when, e.g., MS user input of preferences and needs is iteratively examined at various user locations for determining the location(s) that sufficiently satisfy user specified constraints (e.g., temporal or situational constraints) so that the user is alerted or notified of products and/or services that satisfy the user's input.

Points of Interest Applications

The invention can used for sight seeing guided tours where the invention is interactive depending on feedback from users. Such interactivity being both verbal descriptions and directions to points of interest.

Security Applications

The invention may provide Internet picture capture with real time voice capture and location information for sightseeing, and/or security.

The foregoing description of preferred embodiments of the present invention has been provided for the purposes of illustration and description. It is not intended to be exhaustive or to limit the invention to the precise forms disclosed herein. Modifications and variations commensurate with the description herein will be apparent those skilled in the art and are intended to be within the scope of the present invention to the extent permitted by the relevant art. The embodiments provided are for enabling others skilled in the art to understand the invention, its various embodiments and modifications as are suited for uses contemplated. It is intended that the scope of the invention protected herein be defined by the following claims and their equivalents.

What is claimed is:

1. A method for communicating information to a plurality of mobile units, wherein for each of the mobile units, wireless signal measurements are obtained from transmissions between the mobile unit and a plurality of terrestrial communication stations, and wherein each of the mobile units is independently moveable from each of the communication stations, and each of said communications stations includes one or more of: a transmitter for transmitting wireless signals to the mobile units, and a receiver for receiving wireless signals from the mobile units, comprising:

receiving, for a first of the mobile units, a first input for determining first preference information, the first preference information for determining, for one or more of a plurality of products or services, corresponding presentation data for providing one or more corresponding presentations to the first mobile unit;

first obtaining a first estimate indicative of a location of the first mobile unit, wherein one of the location techniques (A-1) through (A-5) following is used for locating the first mobile unit;

(A-1) a first technique for locating the first mobile unit by recognizing a pattern of wireless signal transmission characteristics, wherein said pattern of characteristics is indicative of a plurality of wireless signal transmission paths between the first mobile unit and each of one or more of the communication stations, (A-2) a second technique for locating the first mobile unit, wherein at least one of the following steps (A-2-1) through (A-2-3) are performed:
  (A-2-1) determining a time difference of arrival (TDOA) from timing information of signals transmitted between the first mobile unit and the communication stations,
  (A-2-2) determining a timing advance (TA) location estimate for the first mobile unit using wireless signals communicated between the first mobile unit and at least one of the communication stations, and
  (A-2-3) determining a location of the first mobile unit using the TDOA, and the TA location estimate, (A-3) a third technique for locating the first mobile unit, wherein a first measurement for a time of travel of a signal transmitted by a wireless transmitter not supported on the earth's surface is received by the first mobile unit, wherein the first measurement is used for determining the location of the first mobile unit, (A-4) a fourth technique for locating the first mobile unit by using a value indicative of a signal strength of one or more signals communicated between the first mobile unit and the communication stations, and (A-5) a fifth technique for locating the first mobile unit by using a joint probability from location related information obtained from each of two different location providing information sources;

identifying, using the first preference information and the first estimate, an instance ($I_{1,1}$) of at least one of the plurality of products or services according to both:
(a) one or more characteristics of the instance ($I_{1,1}$) identified by the first preference information, and
(b) a result from a first condition dependent upon both of (b-i) and (b-ii) following:
  (b-i) location data identifying a corresponding geographic location ($L_1$) for accessing the instance $I_{1,1}$, and
  (b-ii) the first estimate, or a location along an expected route of the first mobile unit determined using the first estimate;

obtaining a route (R) to substantially the geographic location $L_1$;

wherein the route R is determined using a geographic location ($L_2$) providing access to an additional instance ($I_{1,2}$) of one of the plurality of the products or services, wherein the additional instance $I_{1,2}$ is determined according to one or more characteristics of the one product or service identified by the first preference information, and the geographic location $L_2$; and outputting, for the first mobile unit, a first of the presentation data ($P_{1,1}$) notifying the user of information for accessing the instance $I_{1,1}$, additional presentation data ($P_{1,2}$) providing additional information for the instance $I_{1,1}$, and the route R.

2. The method of claim 1, wherein the route R commences at substantially the first estimate.

3. The method of claim 1, wherein the route R commences at substantially the expected route of the first mobile unit determined using the first estimate.

4. The method of claim 1, wherein the first input is from the first mobile unit.

5. The method of claim 1, wherein the first preference information includes one or more of the following (a) through (k) informational items related to accessing the at least one product or service: (a) a characteristic or identification of the at least one product or service, (b) a relative location of the at least one product or service, (c) a merchant preference, (d) traffic condition, (e) a parking condition, (f) price information, (g) a merchant preference, (h) an availability of the at least one product or service, (i) coupon information, (j) discount information, (j) a quality rating, and (k) an acceptable method of payment.

6. The method of claim 5, wherein the first preference information includes at least three of the informational items.

7. The method of claim 1, wherein the first condition includes one of the following criteria: (a1) through (a3) so that: for some estimated location of the first mobile unit, or location of the first mobile unit along an expected future route,
  (a1) first mobile unit is within one of: a specified user travel distance of a location for accessing an instance of one of the one or more products or services, or within a specified geographically identified area of a location for accessing an instance of one of the one or more products or services,
  (a2) first mobile unit is within a specified expected elapsed time of travel from a location for accessing an instance of one of the one or more products or services; and
  (a3) first mobile unit is nearer to a location for accessing an instance of one of the one or more products or services than at least one other location for accessing an instance of one of the one or more products or services.

8. The method of claim 1, wherein the first presentation data $P_{1,1}$ includes an alert that the instance $I_{1,1}$ is within a predetermined traveling time from the user.

9. The method of claim 1, wherein the first presentation data $P_{1,1}$ is presented on the first mobile unit with a presentation related to a different instance of one the plurality of products or services.

10. The method of claim 1, wherein the additional presentation data $P_{1,2}$ is in response to an activation of a hyperlink provided with the first presentation data $P_{1,1}$.

11. The method of claim 1, wherein the first technique is used for locating the first mobile unit.

12. The method of claim 1, wherein the third technique is used for locating the first mobile unit.

13. The method of claim 1, wherein at least two of the first, second, third techniques are used for locating the first mobile unit.

14. The method of claim 1, wherein the fourth technique is used for locating the first mobile unit.

15. The method of claim 1, wherein at least two of the first, third, fifth techniques are used for locating the first mobile unit.

16. The method of claim 1, wherein the step of first obtaining is performed by an enterprise distinct from a wireless carrier that communicates with wireless location determining computational equipment, wherein the wireless location determining computational equipment provides locations of the mobile units to the carrier for providing to the enterprise for performing the step of first obtaining.

17. A method for communicating information to a plurality of mobile units, wherein for each of the mobile units, wireless signal measurements are obtained from transmissions between the mobile unit and a plurality of terrestrial communication stations, and wherein each of the mobile units is independently moveable from each of the communication stations, and each of said communications stations includes one or more of: a transmitter for transmitting wireless signals to the mobile units, and a receiver for receiving wireless signals from the mobile units, comprising steps (A) through (D) following performed by computational equipment:

(A) receiving, for a user of a first of the mobile units, a first input for determining preference information, the preference information for providing, for one or more of a plurality of entities, one or more corresponding presentations to the user of the first mobile unit;

(B) first obtaining a first estimate indicative of a location of the first mobile unit, wherein one or more of the location techniques (B-1) through (B-5) following are used for locating the first mobile unit;

(B-1) a first technique for locating the first mobile unit by recognizing a pattern of wireless signal transmission characteristics, wherein said pattern of characteristics is indicative of a plurality of wireless signal transmission paths between the first mobile unit and each of one or more of the communication stations, (B-2) a second technique for locating the first mobile unit, wherein at least one of the following steps (B-2-1) through (B-2-3) are performed:

(B-2-1) determining a time difference of arrival (TDOA) from timing information of signals transmitted between the first mobile unit and the communication stations, (B-2-2) determining a timing advance (TA) location estimate for the first mobile unit using wireless signals communicated between the first mobile unit and at least one of the communication stations, and (B-2-3) determining a location of the first mobile unit using the TDOA, and the TA location estimate, (B-3) a third technique for locating the first mobile unit, wherein a first measurement for a time of travel of a signal transmitted by a wireless transmitter not supported on the earth's surface is received by the first mobile unit, wherein the first measurement is used for determining the location of the first mobile unit, (B-4) a fourth technique for locating the first mobile unit by using a value indicative of a signal strength of one or more signals communicated between the first mobile unit and the communication stations, and (B-5) a fifth technique for locating the first mobile unit by using a joint probability from location related information obtained from each of two different location providing information sources;

(C) identifying, using the preference information and the first estimate, an instance of a first of the plurality of entities according to both (C-1) and (C-2) following:

(C-1) one or more characteristics of the instance corresponds with one or more characteristics of the preference information, and (C-2) a result from a first condition dependent upon both of (c-i) and (c-ii) following:

(c-i) location data identifying a corresponding geographic location ($L_i$) for traveling to the instance, and (c-ii) the first estimate, or a location along an expected route of the first mobile unit determined using the first estimate;

(D) obtaining, due to the identification of the instance, first information for presenting a route (R) for travelling substantially to the geographic location $L_1$;

wherein a determination of the route R includes accessing data for a geographic location ($L_2$) providing access to an additional instance of one of the plurality of the entities, wherein one or more characteristics of the additional instance is compared with one or more characteristics of the preference information; and wherein the first mobile unit is provided with first data for a presentation notifying the user of information for the instance, and the route R.

18. The method of claim 17, wherein the presentation includes an alert that the instance is within a predetermined traveling time from the user.

19. The method of claim 17, wherein the presentation is presented on the first mobile unit with a presentation related to a different instance of one the plurality of entities.

20. The method of claim 17 further including, prior to the step of obtaining, a step of outputting the first data to the first mobile unit.

21. The method of claim 17, wherein the presentation identifies a person or a company as included in the instance.

22. The method of claim 21, where the person or company is a merchant identified in the preference information.

23. The method of claim 17, wherein each of the mobile units is an instance of the first mobile unit.

24. The method of claim 17, wherein for a second of the mobile units different from the first mobile unit, a wireless location of the second mobile unit is obtained wherein the steps (A) through (D) are performed with the second mobile unit replacing the first mobile unit, and wherein the first condition as applied to the second mobile unit, includes the following criteria: for some estimated location of the second mobile unit, or location of the second mobile unit along an expected future route, the second mobile unit is within one of: a specified user travel distance of a location for accessing an instance of one of the plurality of entities, or within a specified geographically identified area of a location for accessing an instance of one of the plurality of entities.

25. The method of claim 17, wherein the user is provided with a hyperlink for obtaining additional presentation data providing additional information related to the instance, wherein the additional presentation data is obtained in response to an activation of the hyperlink.

26. The method of claim 17 further including a step of transmitting advertising to at least one of the mobile units according to a changing location of the at least one mobile unit.

27. The method of claim 17, wherein the first technique is used for locating the first mobile unit.

28. The method of claim 17, wherein the third technique is used for locating the first mobile unit.

29. The method of claim 17, wherein at least two of the first, second, third techniques are used for locating the first mobile unit.

30. The method of claim 17, wherein the fourth technique is used for locating the first mobile unit.

31. The method of claim 17, wherein at least two of the first, third, fifth techniques are used for locating the first mobile unit.

32. The method of claim 17, wherein the step of first obtaining is performed by an enterprise distinct from a wireless carrier that communicates with wireless location determining computational equipment, wherein the wireless location determining computational equipment provides locations of the mobile units to the carrier for providing to the enterprise for performing the step of first obtaining.

33. The method of claim 17 further including a step of receiving a request from the first mobile unit for information related to a product or service that is complementary to, or related to, another product or service previously identified by the user via the first mobile unit.

34. The method of claim 17 further including the steps of:
associating data for a fixed geographic location with data for the user so that the data for the fixed geographic location is accessible via the first mobile unit at various locations of the first mobile unit;
subsequently, receiving a request from the user for routing the user to the fixed geographic location;
accessing the data for the fixed geographic location for determining a route from the user's location to the fixed geographic location.

35. An apparatus for communicating information to a plurality of mobile units, wherein for each of the mobile units, wireless signal measurements are obtained from transmissions between the mobile unit and a plurality of terrestrial communication stations, and wherein each of the mobile units is independently moveable from each of the communication stations, and each of said communications stations includes one or more of: a transmitter for transmitting wireless signals to the mobile units, and a receiver for receiving wireless signals from the mobile units, comprising:
 a network site for obtaining a geolocation condition for determining, for one or more of a plurality of entities, corresponding presentation data for providing one or more corresponding presentations at a first of the mobile units;
 wherein the geolocation condition is satisfied, for each presentation (P) of the corresponding one or more presentations, by determining that:
  (i) for $L_{CD}$ being one of: some estimated location of the first mobile unit, or a location along an expected future route of the first mobile unit, and
  (ii) for a corresponding destination ($D_P$) associated with the presentation P wherein a user of the first mobile unit gains access to at least one of the entities corresponding to P by the user traveling to $D_P$,
 $D_p$ is one or more of (a1), (a2) and (a3) following:
  (a1) within a geographical area specified by the user;
  (a2) within a specified expected elapsed time of travel from the location $L_{CD}$; and
  (a3) nearer to $L_{CD}$ than at least one other destination for accessing another of the plurality of entities;
 a non-transient data storage that stores additional user conditions for the user that are used in determining the corresponding one or more presentations;
 an evaluator for evaluating data for each entity, E, of at least some of the entities using the additional user conditions, wherein the evaluation of the data for the entity E is dependent upon (b1) and (b2) following:
  (b1) determining whether a corresponding characteristic of E satisfies one of the additional user conditions, wherein the corresponding characteristic does not vary with locations of the first mobile unit, and
  (b2) importance measurements for prioritizing or weighting the additional user conditions;
 wherein when (c1) and (c2) following hold:
  (c1) the network site obtains a location estimate of an actual or expected future geographic location of the first mobile unit, such that the location estimate is dependent upon wireless signal transmission measurements indicative of a geolocation of the first mobile unit, wherein one of the location techniques (c1-1) through (c1-5) following is used for locating the first mobile unit;
   (c1-1) a first technique for locating the first mobile unit by recognizing a pattern of wireless signal transmission characteristics, wherein said pattern of characteristics is indicative of a plurality of wireless signal transmission paths between the first mobile unit and each of one or more of the communication stations,
   (c1-2) a second technique for locating the first mobile unit, wherein at least one of the following steps (c1-2-1) through (c1-2-3) are performed:
    (c1-2-1) determining a time difference of arrival (TDOA) from timing information of signals transmitted between the first mobile unit and the communication stations,
    (c1-2-2) determining a timing advance (TA) location estimate for the first mobile unit using wireless signals communicated between the first mobile unit and at least one of the communication stations, and
    (c1-2-3) determining a location of the first mobile unit using the TDOA, and the TA location estimate,
   (c1-3) a third technique for locating the first mobile unit, wherein a first measurement for a time of travel of a signal transmitted by a wireless transmitter not supported on the earth's surface is received by the first mobile unit, wherein the first measurement is used for determining the location of the first mobile unit,
   (c1-4) a fourth technique for locating the first mobile unit by using a value indicative of a signal strength of one or more signals communicated between the first mobile unit and the communication stations, and
   (c1-5) a fifth technique for locating the first mobile unit by using a joint probability from location related information obtained from each of two different location providing information sources; and
  (c2) for a particular one of the plurality of entities, both the geolocation condition is satisfied, and the additional user conditions are satisfactorily evaluated by the evaluator,
 then computational equipment is activated to compute a route $R_1$, wherein the route $R_1$ includes at least one direction for directing the user from substantially the location estimate to substantially the particular one of the plurality of entities, and to notify the user of information for the particular one of the plurality of entities, and the route $R_1$.

36. The apparatus of claim 35, wherein the one additional user condition includes data indicative of one of: a price, a type of payment accepted, a category of advertising, a time that a merchant is open, and a quality rating.

37. The apparatus of claim 35, wherein the additional user conditions are prioritized or weighted according to a preference of the user.

38. The apparatus of claim 35, wherein the route $R_1$ is to a point of interest that corresponds to the particular one of the plurality of entities.

39. The apparatus of claim 35, wherein for a second user of a second one of the mobile units, the evaluator uses an instance of the additional user conditions specific to the second user that are different from the additional user conditions for the user.

40. The apparatus of claim 35, wherein a network, in communication with the network site for receiving the location estimate, receives a user request from a user of one of the mobile units via at least one of the communication stations, wherein the request is for requesting a suggestion of a product or service, wherein a response to the suggestion, via the network, ia dependent upon a location of the one mobile unit.

41. The apparatus of claim 35, wherein the first technique is used for locating the first mobile unit.

42. The apparatus of claim 35, wherein the third technique is used for locating the first mobile unit.

43. The apparatus of claim 35, wherein at least two of the first, second, third techniques are used for locating the first mobile unit.

44. The apparatus of claim 35, wherein the fourth technique is used for locating the first mobile unit.

45. The apparatus of claim 35, wherein at least two of the first, third, fifth techniques are used for locating the first mobile unit.

46. The apparatus of claim 35, wherein the evaluator communicates with a wireless carrier that, in turn, communicates with wireless location determining computational equipment whereby the carrier receives the location estimate for providing to the evaluator.

* * * * *